United States Patent [19]
Ishino et al.

[11] Patent Number: 5,237,362
[45] Date of Patent: Aug. 17, 1993

[54] VARIFOCAL LENS

[75] Inventors: Tokio Ishino, Hatsukaichi; Saburo Sasaki, Tokyo; Hiroshi Terui, Tokyo; Akira Ueno, Tokyo, all of Japan

[73] Assignee: Ricoh Company, Ltd., Tokyo, Japan

[21] Appl. No.: 672,569

[22] Filed: Mar. 20, 1991

[30] Foreign Application Priority Data

| Mar. 20, 1990 | [JP] | Japan | 2-68422 |
| Mar. 27, 1990 | [JP] | Japan | 2-77359 |
| Mar. 29, 1990 | [JP] | Japan | 2-78624 |
| Jan. 28, 1991 | [JP] | Japan | 3-25199 |

[51] Int. Cl.⁵ ............................................. G03B 13/00
[52] U.S. Cl. .................................. 354/400; 354/195.12
[58] Field of Search .......................... 354/400, 195.12

[56] References Cited

U.S. PATENT DOCUMENTS 5,005,038 4/1991 Ogawa et al. ................ 354/195.12

FOREIGN PATENT DOCUMENTS 60-80812 5/1985 Japan .
62-60910 4/1987 Japan .
63-144334 6/1988 Japan .

Primary Examiner—David M. Gray
Attorney, Agent, or Firm—Fish & Richardson

[57] ABSTRACT

A photographing optical system in a varifocal lens is constructed by only a main lens at a wide angle time and a sublens moved backward from the main lens at a telescopic time. A wide angle pattern for prescribing a focusing region at the wide angle time is proximately disposed backward from a focusing starting position at the wide angle time. A telescopic pattern for prescribing a focusing region at the telescopic time is proximately disposed forward from a focusing starting position at the telescopic time. A sliding brush 16 is disposed in a front group frame for holding the main lens and is slidably moved on the wide angle and telescopic patterns to detect the respective focusing regions of the main lens at focal lengths and the focusing starting positions. A focusing position of the lens system is detected by a digital signal generator composed of a rotary encoder rotated in association with the operation of a drive motor.

12 Claims, 14 Drawing Sheets

1

VARIFOCAL LENS

BACKGROUND OF THE INVENTION

1. Field of the Invention

The present invention relates to an improvement of a varifocal lens used in a camera, etc.

2. Description of the Related Art

In the field of a camera, various kinds of varifocal lenses are used to photograph photographed objects located at long and short distances at desirable sizes and compositions.

In such varifocal lenses, there is a so-called two-focal lens having more than two groups of movable lenses. The two-focal lens is constructed such that one lens group is inserted and separated from a photographing optical path so as to provide first and second focal lengths. For example, the first focal length is set to a short focal distance for performing a standard or wide angle photographing operation. Further, for example, the second focal length is set to a long focal length for performing a telescopic photographing operation.

In a stepwise varifocal lens, a photographing optical system is constructed by e.g., a main lens system and a sublens system. The main lens system is disposed such that this main lens system is displaced along a photographing optical axis. The sublens system is disposed such that this sublens system can be inserted into a predetermined position on the photographing optical axis and can be moved from this predetermined position to an escaping position outside the photographing optical axis. For example, when the photographing operation is performed at the short focal length, only the main lens system is positioned on the photographing optical axis to provide the first focal length. In contrast to this, when the photographing operation is performed at the long focal length, the sublens system is inserted into the predetermined position on the photographing optical axis while the main lens system is displaced along the photographing optical axis, thereby providing the second focal length.

In such a varifocal lens, it is necessary to set or displace the movable lens group to starting positions for providing the respective focal lengths so as to provide the respective focal lengths or change (or switch) one of the focal lengths to the other. Further, it is necessary to displace the movable lens group so as to perform a focusing operation at each of the focal lengths.

There are various kinds of direct and peripheral known techniques relating to the varifocal lens. However, such general techniques have the following problems when the accuracy in displacement of a lens system at the time of the change in focal length (at a zooming time) and the focusing time is held at a high level, and operability is improved and a time for operating the varifocal lens is shortened and the structure of the varifocal lens is made compact.

A first problem in the above known techniques is an irrational problem in human engineering caused in the focusing operation.

Namely, in Japanese Patent Application Laying Open (KOKAI) No. 60-80812, the starting positions of a main lens system at the short and long focal lengths are set to infinite photographing positions (∞ photographing positions) at the respective focal lengths. Accordingly, when the focusing operation is performed, the main lens system must be generally started from the infinite photographing position even when the photographing operation at the short focal length on the wide angle side is performed to photograph a photographed object located at a short distance. This start of the main lens system from the infinite photographing position causes an irrational problem in human engineering.

This is probably because a cam driving mechanism is used as a switching means for changing or switching the focal lengths in the general varifocal lens. Further, this is probably because the starting positions of the focusing operations at the short and long focal lengths are set to the infinite photographing positions so as to provide simplified structure and system in the above general techniques and such a setting means is used as it is in the case of a lead screw driving system.

However, in the photographing operation at the short focal length at which the photographed object located at the short distance is often photographed, it is natural in view of human engineering to design the varifocal lens such that the main lens system is set in a position on a proximate distance side in advance and the focusing operation with respect to the photographed object at the short distance is performed from the beginning in the photographing operation.

Accordingly, no user can naturally use the varifocal lens and the above irrational problem in human engineering is caused in accordance with the general techniques.

In a second problem, when the starting positions of the main lens system at the short and long focal lengths are set to the respective infinite photographing positions or positions at most proximate distances, an operating time required to change the focal lengths is increased for reasons of the structure of the varifocal lens so that it is troublesome for a user to operate the varifocal lens.

In this case, a region for displacing the lens system in the focusing operation at one of the focal lengths exists between the infinite photographing positions at the short and long focal lengths. Accordingly, the operating time for changing the focal lengths is increased by a moving amount of the lens system for passing through this displacing region. For example, it takes about one second as a total to change the focal lengths.

When the operating time required to change the focal lengths is increased, for example, a shutter chance is lost and it is very inconvenient for a user.

In a third problem, the accuracy in movement of the main lens, etc. is greatly reduced when a means for detecting the position of a movable lens group shown in Japanese Patent Application Laying Open (KOKAI) No. 60-80812 is used to control the displacement of the main lens, etc.

The third problem is an important problem when the means for detecting the position of a movable lens group is used in a control operation for moving the main lens, etc. Further, this third problem is commonly caused in the cases of a varifocal lens having one movable lens group and a varifocal lens of a zooming type.

A fourth problem relates to the relation between a rotational speed of a motor and the maintenance of accuracy in movement of the movable lens group in the case of a driving system using this motor.

To simplify the structure of the varifocal lens of this kind as much as possible, it is advantageous to construct the varifocal lens in view of the number of constructional parts and a space for arranging the varifocal lens such that the switching operation of the focal lengths and the focusing operation at each of the focal lengths are performed by using one motor and one driving means for moving the movable lens group. In this case, this driving means is constructed by e.g., a driving means of a lead screw type.

However, in the case of the driving system using a motor, it is necessary to dispose a gear series means such as a series of reduction gears between the motor and the driving means for moving the movable lens group. Further, a gear ratio is limited by the accuracy in final stopping position of the used motor so that it takes much time to switch the focal lengths.

If the other conditions except for the above gear ratio are neglected, the accuracy in drawing-out operation of the main lens, etc. can be improved as the reduction gear ratio is increased.

However, a drawing-out time of the main lens, etc. is increased in proportion to a magnitude of the reduction gear ratio.

The increase in drawing-out time of the main lens, etc. does not cause any serious problem when the drawing-out amount of the main lens, etc. is small as in the focusing operation. However, the increase in drawing-out amount of the main lens, etc. causes a problem when the main lens, etc. are moved by a long distance as in the switching operation of the focal lengths. This is because it is preferable to reduce the switching time of the focal lengths as much as possible so as not to lost a shutter chance in the varifocal lens of this kind.

To solve this problem, it is necessary to use a motor having a very high rotational speed. However, much time and cost are required to develop such a motor of a high rotational speed type.

In Japanese Utility Model Application Laying Open (KOKAI) No. 55-91518, it is considered to constitute the varifocal lens such that two motors are basically prepared in advance and one of them is used to switch the focal lengths and the other is used to perform the focusing operation at each of the focal lengths. However, in such a case, it is necessary to arrange the two motors, and driving circuits and mechanisms, etc. attached to the respective motors so that it is not advantageous in consideration of structure and space.

In Japanese Utility Model Application Laying Open (KOKAI) Nos. 57-63334, 58-77306 and 55-91518, it is possible to construct the varifocal lens such that a circuit for supplying an electric current to a motor is electrically controlled if only a change in rotational speed of the motor is considered. However, in such a case, it is usually necessary to dispose a complicated and dedicated circuit such as a calculating circuit for control so that it is not advantageous in structure.

The above problems are commonly caused in the cases of the varifocal lens having one movable lens group and the varifocal lens of a zooming type. Therefore, it is desirable to solve the above-mentioned problems.

As mentioned above, there are various kinds of problems for providing a varifocal lens having a higher quality in the above general techniques. Accordingly, it is very desirable to take measures for inclusively solving the above-mentioned problems.

SUMMARY OF THE INVENTION

It is therefore a first object of the present invention to provide a varifocal lens for solving the above first and second problems in which a time for switching focal lengths can be shortened and the irrational problems with respect to human engineering in a focusing operation can be solved.

A second object of the present invention is to provide a varifocal lens for solving the above third problem in which it is possible to remove the influence of a clearance in mechanical transmission of a motor driving means tending to be caused in an initial setting operation for a new photograph and an operation for changing the focal lengths, and the accuracy in movement of a movable lens group can be improved by accurately setting a counting start point of a digital signal in the focusing operation.

A third object of the present invention is to provide a varifocal lens for solving the above fourth problem in which the initial setting operation for a new photograph, the switching operation of the focal lengths and the focusing operation at each of the focal lengths are commonly performed by one drive motor and one lead screw driving means. In this case, the initial setting operation and the switching operation of the focal lengths can be performed at a high speed by high speed control and the focusing operation at each of the focal lengths can be accurately performed at a low speed by low speed control by switching reduction gear ratios of a transmission gear means arranged between the drive motor and the lead screw driving means in accordance with necessity.

In a first structure of the present invention, the above first to third objects can be achieved by a varifocal lens having a photographing optical system for providing at least first and second focal lengths by displacing more than one group of movable lenses, the varifocal lens comprising a first focusing region corresponding to a photographing distance range from infinity to a most proximate distance when the photographing optical system provides the first focal length, a first focusing starting position of the movable lens group being set when the photographing optical system provides the first focal length; a second focusing region corresponding to a photographing distance range from infinity to a most proximate distance when the photographing optical system provides the second focal length, a second focusing starting position of the movable lens group being set when the photographing optical system provides the second focal length; the first and second focusing regions being arranged in series in different regions on a photographing optical axis, the first and second focusing starting positions being set to be spaced from each other on the photographing optical axis between the first and second focusing regions; an initial setting position of the movable lens group being set to one of the first and second focusing starting positions when an operating state of the varifocal lens is set to a state capable of taking a photograph; the movable lens group being able to be displaced from one of the first and second focusing starting positions to the other based on a switching signal transmitted when one of the first and second focal lengths is switched to the other; and common lens group driving means for displacing the movable lens group from one of the first and second focusing starting positions to the other and performing a focusing operation in each of the first and second focusing regions.

In a second structure of the present invention, the first and second focal lengths are respectively set to short and long focal lengths, and a focusing position corresponding to the most proximate photographing distance at the first focal length is set in proximity to the first focusing starting position, and a focusing position corresponding to the infinite photographing distance at the second focal length is set in proximity to the second focusing starting position.

In a third structure of the present invention, the photographing optical system comprises a main lens system arranged to be displaced along the photographing optical axis, and a sublens system arranged such that the sublens system can be moved into an acting position on the photographing optical axis and can be moved from this acting position to an escaping position outside the photographing optical axis, and the first optical length can be provided by locating only the main lens system on the photographing optical axis, and the second optical length can be provided by moving the sublens system to a predetermined position on the photographing optical axis while the main lens system is displaced along the photographing optical axis.

In a fourth structure of the present invention, the lens group driving means is constructed by motor driving means including one lead screw rotated by the operation of a motor.

In a fifth structure of the present invention, a first counting reference position of a focusing amount of the movable lens group in the first focusing region is set to a position most proximate to the first focusing starting position within the first focusing region; a second counting reference position of a focusing amount of the movable lens group in the second focusing region is set to a position most proximate to the second focusing starting position within the second focusing region; a clearance in mechanical transmission of the lens group driving means can be absorbed by displacing the movable lens group from the respective focusing starting positions to the respective counting reference positions of the focusing amounts; the varifocal lens further comprises digital signal generating means for generating digital signals for determining the focusing amounts of the movable lens group at the respective focal lengths, and digital signal counting means for counting the number of digital signals generated by this digital signal generating means; and a counting operation of the digital signal counting means can be started on the basis of a signal showing that the movable lens group reaches the counting reference positions at the respective focal lengths in the focusing operations in the respective focusing regions.

In a sixth structure of the present invention, the motor driving means is reversely operated after the movable lens group has once passed through the predetermined counting reference positions when one of the first and second focal lengths is switched to the other; and the movable lens group again passes reversely through the counting reference positions and the operation of the motor driving means is then stopped after the motor driving means has been operated by a predetermined amount.

In a seventh structure of the present invention, the focusing starting position and the counting reference position with respect to the first focal length are set to be equal to each other, and the focusing starting position and the counting reference position with respect to the second focal length are set to be equal to each other.

In an eighth structure of the present invention, the lens group driving means displaces the movable lens group between the two focusing starting positions and performs the respective focusing operations in the focusing regions through transmission gear means of a gear ratio changing type; the transmission gear means of a gear ratio changing type has a low speed gear series for operating the lens group driving means at a gear ratio at a low speed, a high speed gear series for operating the lens group driving means at a gear ratio at a high speed, and gear ratio changing means for switching these two gear series; the movable lens group is displaced in the focusing regions at the respective focusing lengths by using the low speed gear series of the transmission gear means; and the movable lens group is displaced from the focusing positions in the respective focusing regions to the respective focusing starting positions and is displaced between the two focusing starting positions after the transmission gear means is changed from an operating state using the low speed gear series to an operating state using the high speed gear series.

In a ninth structure of the present invention, the low and high speed gear series can be changed by using an additional rotation of a reciprocating rotation of a motor for moving a shutter in a camera provided with the varifocal lens.

In a tenth structure of the present invention, the low and high speed gear series can be changed by using a reciprocating displacement of plunger means of an electromagnetic operating type.

In the first structure of the varifocal lens in the present invention, the photographing optical system can provide at least the first and second focal lengths by displacing more than one group of movable lenses. The focusing region at the first focal length is set in a close region along the optical axis backward from the focusing starting position at the first focal length. The focusing region at the second focal length is set in a close region along the optical axis forward from the focusing starting position at the second focal length. These focusing regions at the first and second focal lengths are arranged in series with each other. The same driving means performs the initial setting operation of the movable lens group, the switching operation of the respective focal lengths, and the focusing operation in each of the focusing regions.

In the second structure of the present invention, the first and second focal lengths are respectively set to short and long focal lengths. Thus, the focusing operation can be started from a most proximate photographing position when a photographing operation is performed at the short focal length. Further, the focusing operation can be started from an infinite photographing position when the photographing operation is performed at the long focal length. Accordingly, it is possible to take a photograph in accordance with the respective focal lengths in view of human engineering. Further, the distance on the optical axis between the starting positions at the short and long focal lengths can be reduced as much as possible so that it is possible to greatly reduce a time required to switch the focal lengths.

In the third structure of the present invention, the photographing optical system is composed of the main lens system and the sublens system. The first focal length is provided by only the main lens system. The second focal length is provided by moving the sublens system from the escaping position outside the photographing optical axis to the acting position on the photographing optical axis while the main lens system is displaced along the photographing optical axis.

In the fourth structure of the present invention, the above photographing optical system is operated by motor driving means including one lead screw rotated by the operation of a motor.

In the fifth structure of the present invention, a counting starting point of the focusing amount of the movable lens group at each of the focal lengths is set in a position separated from each of the starting positions every focal length. A clearance in mechanical transmission of the motor driving means with respect to the movable lens group is removed while the movable lens group is displaced from each of the starting positions to the counting starting point. Thus, it is possible to accurately set the focusing amount (i.e., a displacing amount) of the movable lens group at each of the focal lengths.

In the sixth structure of the present invention, the clearance in mechanical transmission of the movable lens group displaced toward the counting starting point at each of the focal lengths is removed by the features of a displacing direction of the movable lens group.

In the seventh structure of the present invention, the starting position and the counting starting point at each of the focal lengths are set to be equal to each other. Namely, the distance between this starting position and the counting starting position is set to be zero. Thus, the structure of the varifocal lens is simplified and a moving distance of the movable lens group can be reduced at the switching time of the focal lengths.

In the eighth structure of the present invention, the low speed gear series of the transmission gear means is used to accurately displace the movable lens group in the focusing operation at each of the focal lengths required to accurately displace the movable lens group. The transmission gear means is changed from the low speed gear series to the high speed gear series in the movements of the movable lens group when the movable lens group is returned from the focusing position in each of the focusing regions to the starting position at each of the focal lengths and the switching operation of the focal lengths is performed. Thus, it is possible to reduce a time for moving the movable lens group.

In the ninth structure of the present invention, the low and high speed gear series of the transmission gear means can be changed by using an additional rotation of a reciprocating rotation of the motor for moving a shutter in a camera.

In the tenth structure of the present invention, the low and high speed gear series of the transmission gear means can be changed by using a reciprocating displacement of the plunger means of an electromagnetic operating type easily controlled in operation and having a high degree of freedom with respect to design of arrangement.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a varifocal lens in the present invention will next be described in detail with reference to the accompanying drawings.

A technique for moving a movable lens group using one driving means of a lead screw type is already proposed in e.g., Japanese Patent Application Laying Open (KOKAI) No. 60-80812 and Japanese Utility Model Application Laying Open (KOKAI) No. 62-60910, etc.

Figure 1:
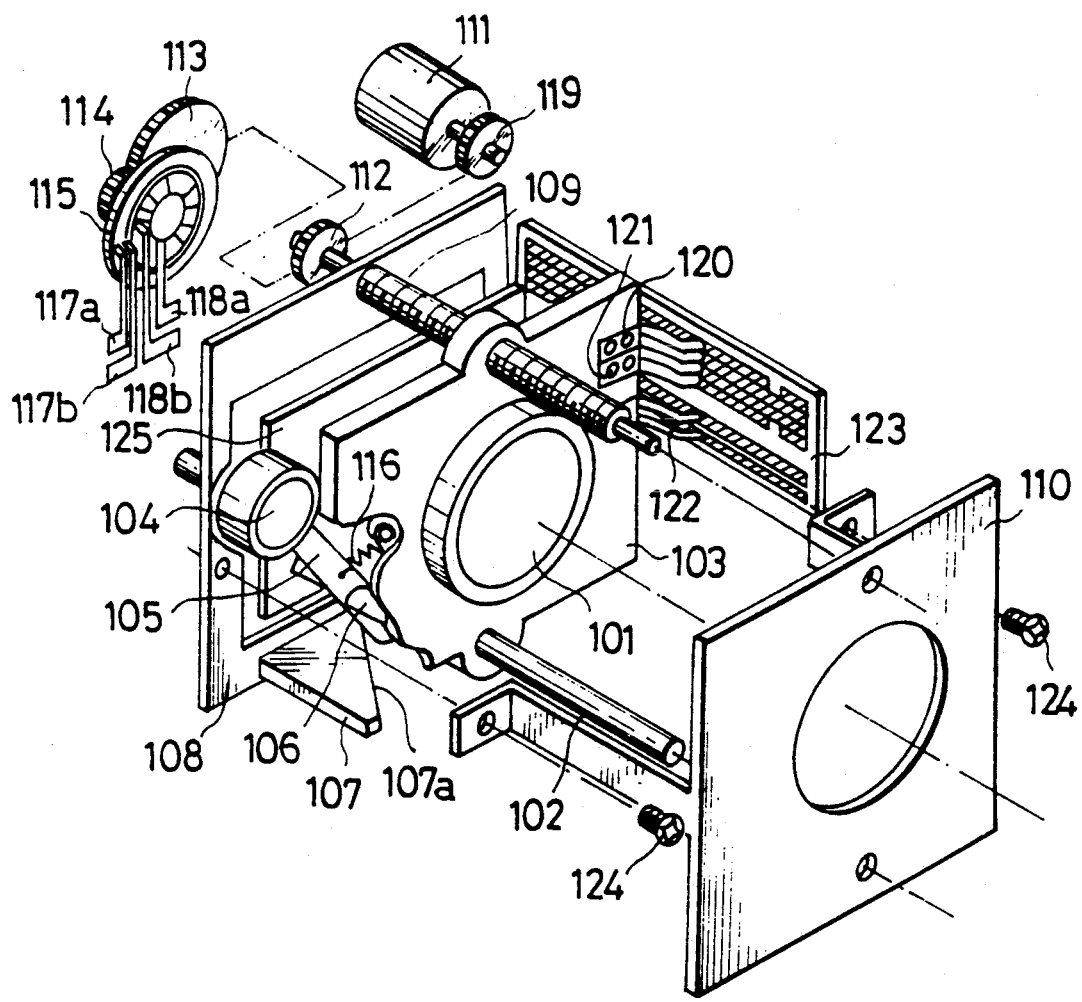
FIG. 1 is a perspective view for explaining the structure of a general varifocal lens in which focal lengths are changed by inserting and separating a sublens group from a photographing optical path and a moving position of each of lens groups every focal length is prescribed by a focal length detecting member.

In the technique shown in Japanese Patent Application Laying Open (KOKAI) No. 60-80812, a varifocal lens is constructed as shown in FIG. 1.

In FIG. 1, the varifocal lens has a main lens 101, a body tube base plate 103 for holding this main lens 101, and a support bar 102 for supporting the body tube base plate 103 such that this body tube base plate 103 can be slidably moved along a photographing optical axis. The varifocal lens also has a sublens 104 and a holder 105 for holding this sublens 104 such that this sublens 104 can be rotated toward the photographing optical axis backward from the main lens 101. The varifocal lens also has a bar 106 for supporting this holder 105, a cam projecting portion 107, a rear base plate 108, a driving bar 109, a front base plate 110, and a motor 111. The varifocal lens also has reduction gear series 112 to 114, a pulse plate 115, a spring 116, takeout contact pieces 117a, 117b, 118a, 118b, a pinion 119, sliding contact piece groups 120 to 122, a pattern substrate 123, a vis 124, and a pressure plate 125.

The driving bar 109 is constructed by a lead screw screwed into the body tube base plate 103 such that the body tube base plate 103 and the main lens 101 can be moved forward and backward along the photographing optical axis by rotating the motor 111 in normal and reverse directions.

When a photographing operation is performed at a short focal length, only the main lens 101 is located on the photographing optical axis by moving the body tube base plate 103 to a position near a film face, thereby providing the short focal length. When the photographing operation is performed at a long focal length, the sublens 104 is moved into a predetermined position on the photographing optical axis backward from the main lens 101 while the body tube base plate 103 is drawn-out or moved to a position far from the film face. Thus, the long focal length is provided by cooperating the main lens 101 and the sublens 104 with each other.

When a focusing operation is performed, the motor 111 is rotated in the normal and reverse directions at the short and long focal lengths so that the body tube base plate 103 is moved by a predetermined focusing amount.

Further, in this general technique, a starting position of the main lens 101 at each of the focal lengths (i.e., a position of the main lens 101 when the focal lengths are changed or switched) is set in advance. When the focusing operation is performed at the respective focal lengths, a focusing amount (i.e., a drawing-out amount) of the main lens 101 is measured from this starting position. In this case, the focusing amount of the main lens 101 includes that of the sublens 104 in accordance with necessity.

Figure 2:
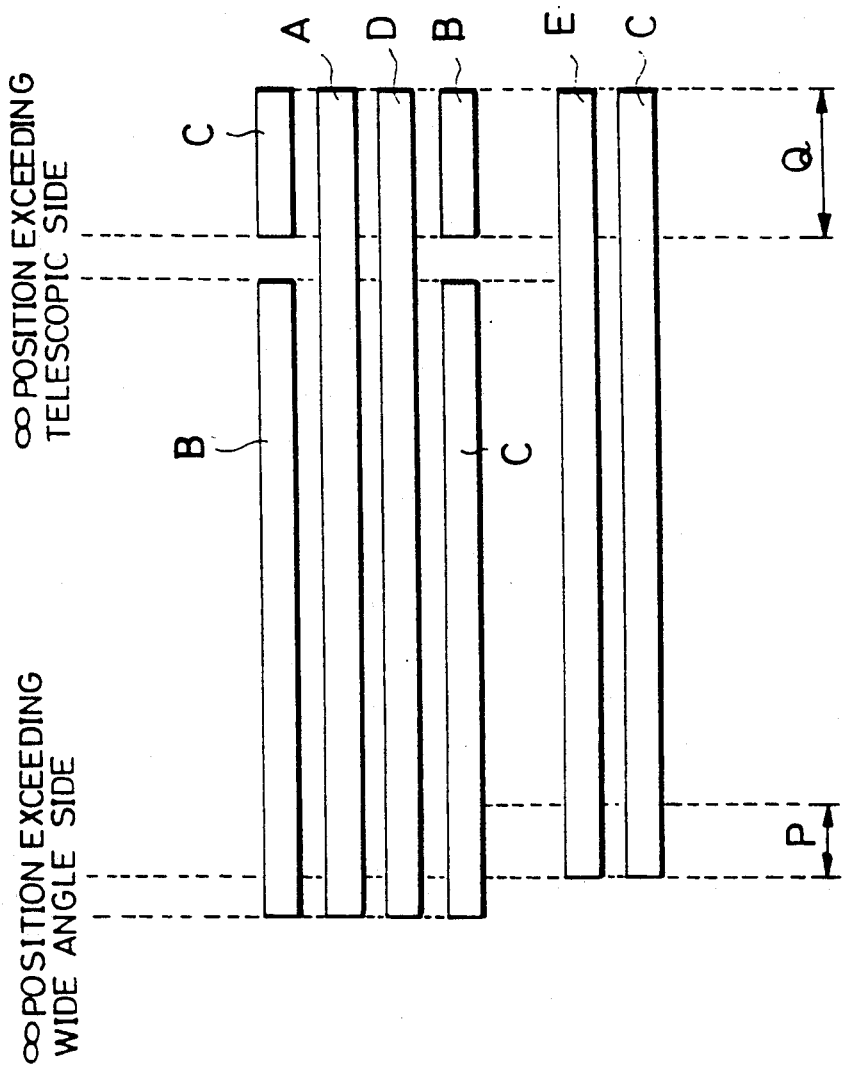
FIG. 2 is an arrangement view of switching patterns of a pattern substrate used in the general varifocal lens shown in FIG. 1.

In this general technique, as shown in FIG. 2, the varifocal lens is provided with the pattern substrate 123 having switching patterns A to E. This pattern substrate 123 and the above sliding contact piece groups 120 to 122 constitute a means for detecting a position of the movable lens group. For example, in the case of the long focal length, an infinite position ($\infty$ position) and the focusing amount of the main lens 101 at the long focal length are prescribed by positions of the sliding contact piece groups 120 to 122 with respect to the pattern substrate 123.

Starting positions of the sliding contact piece groups 120 to 122 at the respective focal lengths are set within regions of the switching patterns B and C separated from each other. After a predetermined focusing operation is completely performed, the sliding contact piece groups 120 to 122 are returned to the respective starting positions.

In the varifocal lens of this kind, the switching operation of the focal lengths and the focusing operation at each of the focal lengths are performed by the operation of a motor driving system. Such a motor driving system is generally constructed by various kinds of motor driving systems in the technical field of a camera including a video camera.

For example, Japanese Utility Model Application Laying Open (KOKAI) No. 57-63334 shows a zooming speed switching mechanism in a video camera constructed such that a zooming mechanism is electrically operated. In this video camera, zooming-up and zooming-down operations are switched in accordance with operating directions of the switching mechanism. Further, a zooming switch for switching zooming speeds at an operating stroke is disposed in the vicinity of a grip of the camera.

Further, Japanese Utility Model Application Laying Open (KOKAI) No. 58-77306 shows a zooming device provided with a seesaw switch having a plurality of opening/closing contacts which can be switched stepwise on both sides of a center of rotation. A first opening/closing contact is operated by selectively rotating this seesaw switch to determine zooming direction and speed of a zooming lens group. A second opening/closing contact is operated by rotating the seesaw switch at the next stage to change zooming speeds.

Japanese Utility Model Application Laying Open (KOKAI) No. 55-91518 shows a driving circuit for moving an electrically operated lens. In this driving circuit, zooming and focusing motors are driven by a predetermined power source to variably set a zoom ratio of a zoom lens group and a focal length of a focusing lens group, respectively. The driving circuit is provided with a variable impedance circuit having an impedance changed in accordance with the zoom ratio. An operating voltage is applied to the focusing motor from the above predetermined power source through the variable impedance circuit. Thus, a rotational speed of the focusing motor set at a telescopic time is set to be lower than that at a wide angle time.

As mentioned above, there are various kinds of direct and peripheral known techniques relating to the varifocal lens. However, such general techniques have the following problems when the accuracy in displacement of a lens system at the time of the change in focal length (at a zooming time) and the focusing time is held at a high level, and operability is improved and a time for operating the varifocal lens is shortened and the structure of the varifocal lens is made compact.

A first problem in the above known techniques is an irrational problem in human engineering caused in the focusing operation.

Namely, in the technique shown in Japanese Patent Application Laying Open (KOKAI) No. 60-80812, the starting positions of a main lens system at the short and long focal lengths are set to infinite photographing positions ($\infty$ photographing positions) at the respective focal lengths. Accordingly, when the focusing operation is performed, the main lens system must be generally started from the infinite photographing position even when the photographing operation at the short focal length on the wide angle side is performed to photograph a photographed object located at a short distance. This start of the main lens system from the infinite photographing position causes an irrational problem in human engineering.

This is probably because a cam driving mechanism is used as a switching means for changing or switching the focal lengths in the general varifocal lens. Further, this is probably because the starting positions of the focusing operations at the short and long focal lengths are set to the infinite photographing positions so as to provide simplified structure and system in the above general techniques and such a setting means is used as it is in the case of a lead screw driving system.

However, in the photographing operation at the short focal length at which the photographed object located at the short distance is often photographed, it is natural in view of human engineering to design the varifocal lens such that the main lens system is set in a position on a proximate distance side in advance and the focusing operation with respect to the photographed object at the short distance is performed from the beginning in the photographing operation.

Accordingly, no user can naturally use the varifocal lens and the above irrational problem in human engineering is caused in accordance with the general techniques.

In a second problem, when the starting positions of the main lens system at the short and long focal lengths are set to the respective infinite photographing positions or positions at most proximate distances, an operating time required to change the focal lengths is increased for reasons of the structure of the varifocal lens so that it is troublesome for a user to operate the varifocal lens.

In this case, a region for displacing the lens system in the focusing operation at one of the focal lengths exists between the infinite photographing positions at the short and long focal lengths. Accordingly, the operating time for changing the focal lengths is increased by a moving amount of the lens system for passing through this displacing region. For example, it takes about one second as a total to change the focal lengths.

When the operating time required to change the focal lengths is increased, for example, a shutter chance is lost and it is very inconvenient for a user.

In a third problem, the accuracy in movement of the main lens 101, etc. is greatly reduced when the means for detecting a position of the movable lens group shown in Japanese Patent Application Laying Open (KOKAI) No. 60-80812 is used to control the displacement of the main lens 101, etc.

When the means for detecting a position of the movable lens group is constructed as above, the following great problems (A) and (B) are caused.

(A) When moving amounts of the sliding contact piece groups 120 to 122 for providing a predetermined focusing amount of the main lens are set as counting values of a digital signal and a counting operation of the digital signal is started from the above starting positions of the sliding contact piece groups at the focal lengths, a starting position of the counting operation of the digital signal is influenced by returning positions of the sliding contact piece groups 120 to 122 at the previous photographing time. As a result, dispersion in stopping position of the sliding contact piece groups 120 to 122 is caused in a new photographing operation.

(B) When the sliding contact piece groups 120 to 122 are started from the above starting positions as they are in the focusing operation, a clearance, a backlash, etc. in engagement of a motor driving means for moving the main lens 101, etc. directly cause a clearance in mechanical transmission of the motor driving means.

These problems (A) and (B) cause great reduction of the accuracy in movement of the main lens 101, etc.

The third problem is an important problem when a means for detecting a position of the movable lens group is used in a control operation for moving the main lens 101, etc. Further, this third problem is commonly caused in the cases of a varifocal lens having one movable lens group and a varifocal lens of a zooming type. Therefore, the third problem will be further explained in detail in a second embodiment of the present invention described later.

A fourth problem relates to the relation between a rotational speed of a motor and the maintenance of accuracy in movement of the movable lens group in the case of a driving system using this motor.

To simplify the structure of the varifocal lens of this kind as much as possible, it is advantageous to construct the varifocal lens in view of the number of constructional parts and a space for arranging the varifocal lens such that the switching operation of the focal lengths and the focusing operation at each of the focal lengths are performed by using one motor and one driving means for moving the movable lens group. In this case, this driving means is constructed by e.g., a driving means of a lead screw type.

However, in the case of the driving system using a motor, it is necessary to dispose a gear series means such as a series of reduction gears between the motor and the driving means for moving the movable lens group. Further, a gear ratio is limited by the accuracy in final stopping position of the used motor so that it takes much time to switch the focal lengths.

If the other conditions except for the above gear ratio are neglected, the accuracy in drawing-out operation of the main lens 101, etc. can be improved as the reduction gear ratio is increased.

However, a drawing-out time of the main lens 101, etc. is increased in proportion to a magnitude of the reduction gear ratio.

The increase in drawing-out time of the main lens 101, etc. does not cause any serious problem when the drawing-out amount of the main lens 101, etc. is small as in the focusing operation. However, the increase in drawing-out amount of the main lens 101, etc. causes a problem when the main lens 101, etc. are moved by a long distance as in the switching operation of the focal lengths. This is because it is preferable to reduce the switching time of the focal lengths as much as possible so as not to lost a shutter chance in the varifocal lens of this kind.

To solve this problem, it is necessary to use a motor having a very high rotational speed. However, much time and cost are required to develop such a motor of a high rotational speed type.

As shown in Japanese Utility Model Application Laying Open (KOKAI) No. 55-91518 mentioned above, it is considered to constitute the varifocal lens such that two motors are basically prepared in advance and one of them is used to switch the focal lengths and the other is used to perform the focusing operation at each of the focal lengths. However, in such a case, it is necessary to arrange the two motors, and driving circuits and mechanisms, etc. attached to the respective motors so that it is not advantageous in consideration of structure and space.

As shown in Japanese Utility Model Application Laying Open (KOKAI) Nos. 57-63334, 58-77306 and 55-91518 mentioned above, it is possible to construct the varifocal lens such that a circuit for supplying an electric current to a motor is electrically controlled if only a change in rotational speed of the motor is considered. However, in such a case, it is usually necessary to dispose a complicated and dedicated circuit such as a calculating circuit for control so that it is not advantageous in structure.

The above problems are commonly caused in the cases of the varifocal lens having one movable lens group and the varifocal lens of a zooming type. Therefore, it is desirable to solve the above-mentioned problems.

As mentioned above, there are various kinds of problems for providing a varifocal lens having a higher quality in the above general techniques. Accordingly, it is very desirable to take measures for inclusively solving the above-mentioned problems.

Varifocal lenses in first, second and third embodiments of the present invention will next be described in detail as follows.

Figure 3:
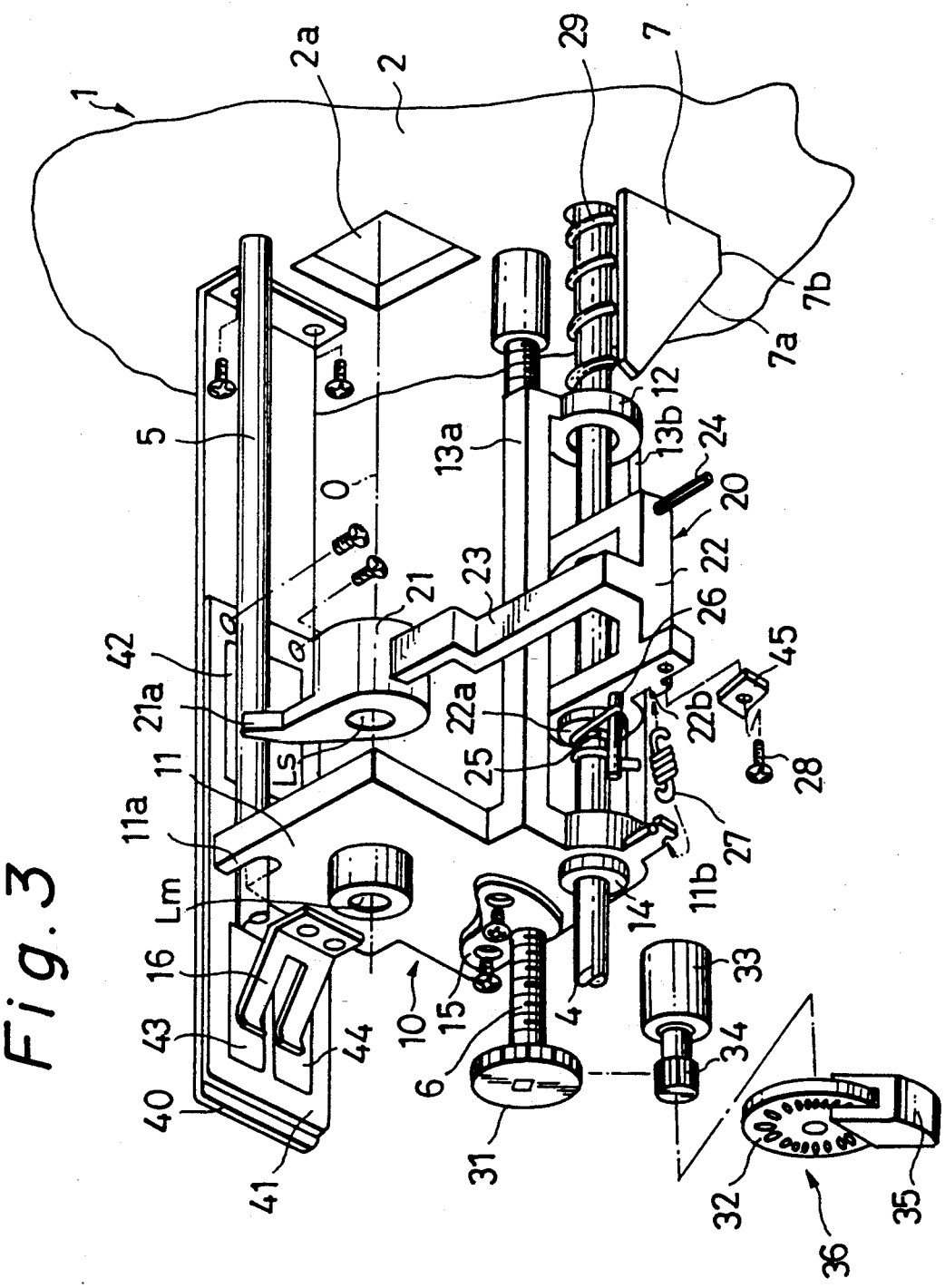
FIG. 3 is an exploded perspective view of a varifocal lens in a first embodiment of the present invention at a telescopic photographing time.

FIG. 3 is an exploded perspective view showing the construction of a varifocal lens in the first embodiment of the present invention at a telescopic photographing time.

Figure 4:
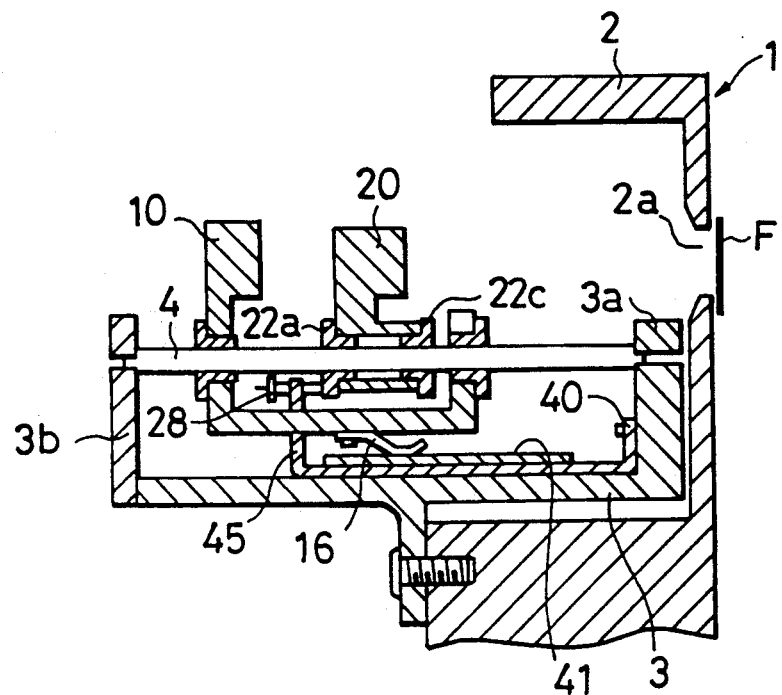
FIG. 4 is a schematic cross-sectional side view showing a main construction of the varifocal lens in the first embodiment shown in FIG. 3.
Figure 5:
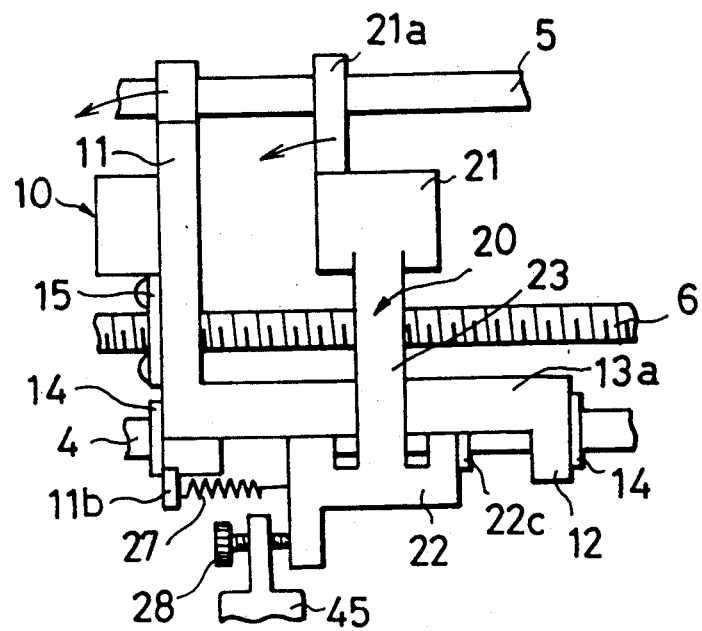
FIG. 5 is a constructional plan view of the varifocal lens arranged as shown in FIGS. 3 and 4 and seen from above.

FIG. 4 is a cross-sectional side view showing a schematic construction of the varifocal lens in the first embodiment. FIG. 5 is a plan view of the varifocal lens arranged as shown in FIGS. 3 and 4.

As shown in FIG. 3, a photographing optical system used in the varifocal lens is constructed by an optical system composed of e.g., a main lens group Lm and a sublens group Ls in the first to third embodiments of the present invention.

In this case, the main lens group Lm is arranged on a photographing optical axis O at any time. The varifocal lens is constructed such that a short focal length such as a focal length at a wide angle or standard photographing time can be provided by only displacing the main lens group Lm forward and backward on the photographing optical axis. The focal length at the wide angle photographing time is typically provided in the following description.

The sublens group Ls is movably arranged on the photographing optical axis O such that the sublens group Ls can be reciprocated between an acting or inserting position on the photographing optical axis O and an escaping attitude position (an escaping position) separated from the photographing optical axis O. The sublens group Ls is located in the escaping position when the main lens group Lm provides the focal length at the wide angle time.

While the main lens group Lm is displaced forward on the side of a photographed object along the photographing optical axis O, the sublens group Ls is inserted into the inserting position on the optical axis backward from the main lens group Lm, i.e., on the optical axis on the side of an optical aperture, thereby providing a long focal length. This long focal length is called a focal length at a telescopic time in the following description.

A body tube 1 of the varifocal lens has the main lens group Lm and the sublens group Ls of the photographing optical system therein. A body 2 of the body tube 1 has an exposure aperture 2a in a position on the photographing optical axis O.

A lens tube frame 3 is attached to an inside portion of the tube body 2 by a suitable means. The lens tube frame 3 has wall portions 3a and 3b projected upward at both ends thereof.

A common pole 4, a rotation preventing pole 5 and a driving lead screw 6 extend on the photographed object side around the exposure aperture 2a in parallel with the photographing optical axis O. The poles 4, 5 and the lead screw 6 are disposed between the two wall portions 3a and 3b in a state in which the poles 4, 5 and the lead screw 6 surround the exposure aperture 2a.

The common pole 4 is disposed as a kind of guide member for slidably supporting a front group frame 10 described later and slidably and rotatably supporting a rear group frame 20. The rotation preventing pole 5 is disposed as a member for preventing useless rotations of the front group frame 10 on the photographing optical axis O and the rear group frame 20 after the rear group frame 20 is inserted onto the photographing optical axis O.

The driving lead screw 6 is disposed as a member for displacing the front group frame 10 and the rear group frame 20 in accordance with a predetermined axial movement. For example, the driving lead screw 6 is constructed by a lead screw member having a double thread screw.

For example, at least the driving lead screw 6 and the common pole 4 are desirably made of a suitable material having a low thermal expansion coefficient such as a metallic material. At least the driving lead screw 6 and the common pole 4 are preferably made of a material having a thermal expansion coefficient equal or approximate to that of a positioning base 40 described later. It is possible to integrally form the lens tube frame 3 and the tube body 2 in accordance with necessity.

A cam plate member 7 has a pushing-down acting face 7a inclined with respect to an axial direction of the common pole 4 and a holding acting face 7b parallel to this axial direction. The cam plate member 7 is projected in parallel with the common pole 4 in the right-hand wall portion 3a of the lens tube frame 3 in the vicinity of a right-hand end portion of the common pole 4.

The above main lens group Lm and the above sublens group Ls are constructed such that the main lens group and the sublens group are respectively held by the front group frame 10 and the rear group frame 20.

In this case, as shown in FIG. 5, the front group frame 10 is constructed by a frame body 11, an auxiliary frame portion 12 and double stays 13a, 13b for connecting the frame body 11 and the auxiliary frame portion 12 to each other in upper and lower positions thereof. Two T-W nuts 14 are adhered and fixed to a lower portion of the frame body 11 and the auxiliary frame portion 12. The two T-W nuts 14 are slidably fitted accurately to the above-mentioned common pole 4.

A notch portion 11a is formed in an upper corner portion of the frame body 11 and is accurately engaged with the above rotation preventing pole 5. The rotation of the front group frame 10 around the common pole 4 is prevented by this notch portion 11a. Accordingly, a position of the frame body 11 is fixed by the common pole 4 and the rotation preventing pole 5.

A driving lead nut 15 is attached to the lower portion of the frame body 11 of the front group frame 10 as well as one of the T-W nuts 14. The driving lead nut 15 is attached to the frame body 11 such that a position of this driving lead nut 15 can be adjusted in a planar direction of the frame body 11 so as not to cause any interference in position between the front group frame 10 and the driving lead screw 6.

A constructional material of the front group frame 10 is preferably composed of a resin material in consideration of cost. The T-W nuts 14 and the driving lead nut 15 may be integrally formed with the front group frame 10 if high accuracy and durability can be obtained with respect to these members.

A clearance in mechanical transmission such as a clearance in engagement, a backlash, etc. tends to be caused between the driving lead screw 6 and the driving lead nut 15. Therefore, the accuracy in engagement between the driving lead screw 6 and the driving lead nut 15 is preferably maintained.

An electric sliding brush 16 has sliding leg portions formed in a two-forked shape. The sliding brush 16 is attached to the frame body 11 of the front group frame 10 through a suitable insulating material.

The two-forked sliding brush 16 is constructed such that one sliding leg portion of this sliding brush 16 is slid while the one sliding leg portion intermittently comes in press-contact with a wide angle pattern 42 and a telescopic pattern 43 of a positioning switch substrate 41 described later. The two-forked sliding brush 16 is also constructed such that the other sliding leg portion is slid while the other sliding leg portion comes in press-contact with a ground pattern 44 at any time.

As shown in FIG. 5, the rear group frame 20 is constructed by an end portion 21 for holding the sublens group Ls, a base portion 22 formed in a two-forked shape, and a stay 23 for connecting the end portion 21 and the base portion 22 to each other. The rear group frame 20 is arranged with respect to the common pole 4 such that the base portion 22 is located between the frame body 11 of the front group frame 10 and the auxiliary frame portion 12.

A positioning projection 21a is partially formed in the end portion 21 and can be engaged with an outer circumferential face of the above rotation preventing pole 5. When this positioning projection 21a is engaged with the rotation preventing pole 5, a position of the rear group frame 20 can be accurately set at the telescopic time. Namely, the sublens group Ls can be accurately set in the acting position on the photographing optical axis O at the telescopic photographing time.

T-W nuts 22a and 22c are fixedly disposed in the base portion 22 of the rear group frame 20. The rear group frame 20 is rotatably and slidably fitted to the common pole 4 through these T-W nuts 22a and 22c.

An inserting/separating pin 24 and a moving projection 26 are disposed to displace the rear group frame 20 to the escaping position in a switching operation from a telescopic photographing mode to a wide angle photographing mode. The inserting/separating pin 24 and the moving projection 26 are disposed in the base portion 22 of the rear group frame 20.

When the front group frame 10 is displaced on the side of the exposure aperture 2a in the switching operation from the telescopic photographing mode to the wide angle photographing mode, the moving projection 26 is disposed as a kind of associating member for pushing and moving the rear group frame 20 toward the exposure aperture 2a by the front group frame 10 through the moving projection 26.

When the rear group frame 20 is pushed by the front group frame 10 and is then displaced toward the exposure aperture 2a, the above inserting/separating pin 24 is engaged with the above cam plate member 7 to change a position of the rear group frame 20 at an acting time thereof to a position thereof at an escaping time.

The inserting/separating pin 24 and the cam plate member 7 are relatively moved as follows.

Namely, when the rear group frame 20 is pushed by the front group frame 10 and is displaced on the side of the exposure aperture 2a, the pushing-down acting face 7a of the cam plate member 7 pushes this inserting/separating pin 24 down and rotates the rear group frame 20 in the clockwise direction. Thereafter, the rear group frame 20 can be held in its escaping position as it is by the action of the holding acting face 7b of the cam plate member 7.

Accordingly, when the switching operation is performed from the telescopic photographing mode to the wide angle photographing mode, the sublens group Ls in the inserting position at the telescopic time shown in FIG. 3 begins to be escaped outside the photographing optical axis O from a time point at which the inserting/separating pin 24 is pushed down by the pushing-down acting face 7a of the cam plate member 7. After the inserting/separating pin 24 comes in contact with the holding acting face 7b, the sublens group Ls is located in the escaping position and this escaping position is held as it is.

Figure 6:
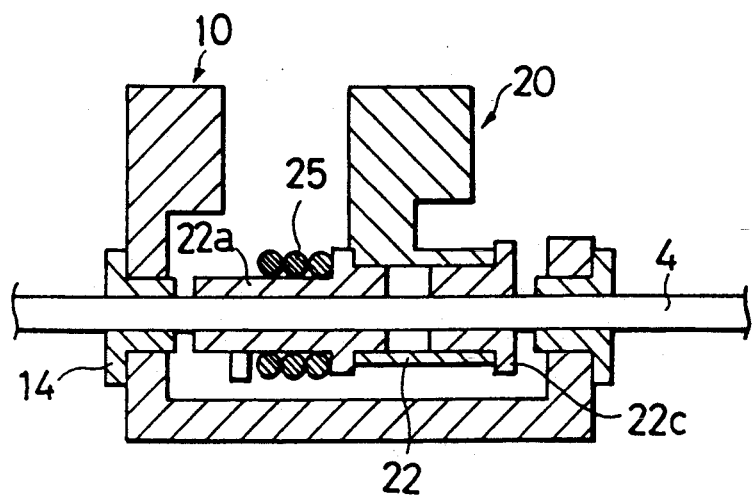
FIG. 6 is a partial cross-sectional view showing one modified embodiment of the varifocal lens shown in FIG. 3 near a base portion of a rear group frame.

It is possible to use a T-W nut 22a described later instead of the moving projection 26. In this case, for example, the T-W nut 22a located on the photographed object side is extended and projected as shown in FIG. 6.

A constructional material of the rear group frame 20 is preferably composed of a synthetic resin material. The T-W nuts 22a and 22c may be integrally formed with the rear group frame 20 if high accuracy and durability of these nuts can be obtained.

A spiral spring 25 is wound around the common pole 4 to rotate the rear group frame 20 in the counterclockwise direction using biasing rotational force of this spring. One end of the spiral spring 25 is engaged with the lower stay 13b of the front group frame 10. The other end of the spiral spring 25 is engaged with the moving projection 26 of the rear group frame 20.

A biasing member 27 having a tension action is constructed by a connection spring formed in the shape of e.g., a coil. The connection spring 27 is arranged along the photographing optical axis O between a projection 11b of the front group frame 10 and a projection 22b of the rear group frame 20. When the front group frame 10 is displaced on the photographed object side, the rear group frame 20 can be integrally displaced on the same side by the action of the connection spring 27.

An adjusting screw 28 is disposed as follows to determine a position of the rear group frame 20 in the direction of the optical axis at the telescopic time.

Namely, in the varifocal lens shown in FIG. 3, relative positions of the main lens group Lm and the sublens group Ls in the telescopic photographing mode are determined in advance from an optical viewpoint. Accordingly, the position of the rear group frame 20 in the direction of the optical axis at the lens inserting time must be set by a mechanical stopper. The adjusting screw 28 is disposed as this mechanical stopper.

For example, the adjusting screw 28 is screwed into a support end portion 45 (see FIG. 4) having a rising shape in a positioning base 40 described later. The position of a front end portion of the adjusting screw 28 at a right-hand end thereof in FIG. 4 can be adjusted by a rotating amount of this adjusting screw. When the rear group frame 20 is displaced by the action of the connection spring 27 on the photographed object side together with the front group frame 10, the front end portion of the adjusting screw 28 comes in contact with the rear group frame 20 and can compulsorily stop the rear group frame 20 in this contact position. This contact position is called a restricting position in the following description.

Thus, only the rear group frame 20 is stopped in the restricting position even when the front group frame 10 is greatly displaced on the photographed object side, thereby accurately providing an optical designing position. Further, the biasing force of the connection spring 27 is continuously applied to the rear group frame 20 in a stopping state, thereby stabilizing the stopping position of the rear group frame 20.

When the above lens tube frame 3 is formed by a material having a thermal expansion coefficient substantially equal to that of the positioning base 40, the above support end portion 45 can be formed in a suitable position of the lens tube frame 3. A compression spring 29 is disposed to stably hold the front group frame 10 in its position at the wide angle time. The compression spring 29 is wound around the common pole 4 between the lens tube frame 3 and the auxiliary frame portion 12 of the front group frame 10 (see FIG. 3).

The main lens group Lm and the sublens group Ls are independently held by the front group frame 10 and the rear group frame 20 respectively supported in a cantilever shape. Further, the front group frame 10 and the rear group frame 20 can be relatively moved together by the action of one or plural biasing members in the direction of the optical axis. The one or plural biasing members are constructed by the connection spring 27 in the first embodiment shown in FIG. 3. In the case of such a varifocal lens, it is necessary to consider a problem about eccentricity of the sublens group Ls with respect to the main lens group Lm.

Namely, there are slight fitting clearances between the respective lens frames for holding the lens groups Lm, Ls and a support shaft member for supporting these lens frames such that the lens frames can be displaced. In the first embodiment shown in FIG. 3, these lens frames are constructed by the front group frame 10 and the rear group frame 20 and the support shaft member is constructed by the common pole 4.

Therefore, the respective lens frames are shifted by these fitting clearances in accordance with an extending direction of the above biasing member, thereby causing eccentricity. This eccentricity is caused as inclinations of the respective lens frames with respect to the optical axis, or parallel shifts of the lens frames. Therefore, the main lens group Lm and the sublens group Ls are inclined with respect to the optical axis, or are shifted from the optical axis in parallel therewith.

Figure 7:
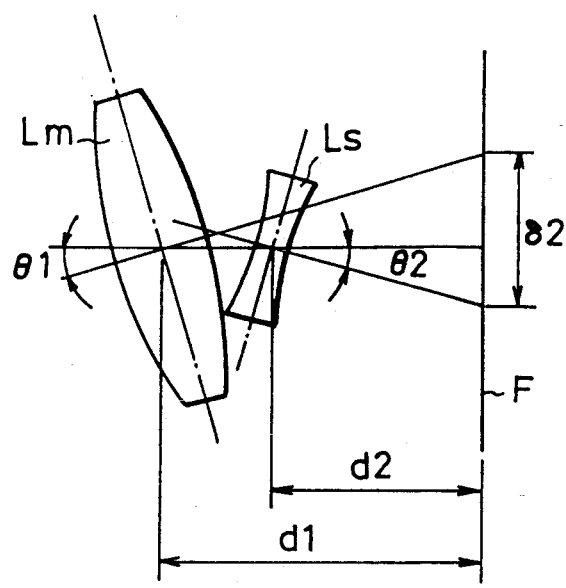
FIG. 7 is a view for explaining one example of inclining states of a main lens group and a sublens group with respect to a photographing optical axis.
Figure 8:
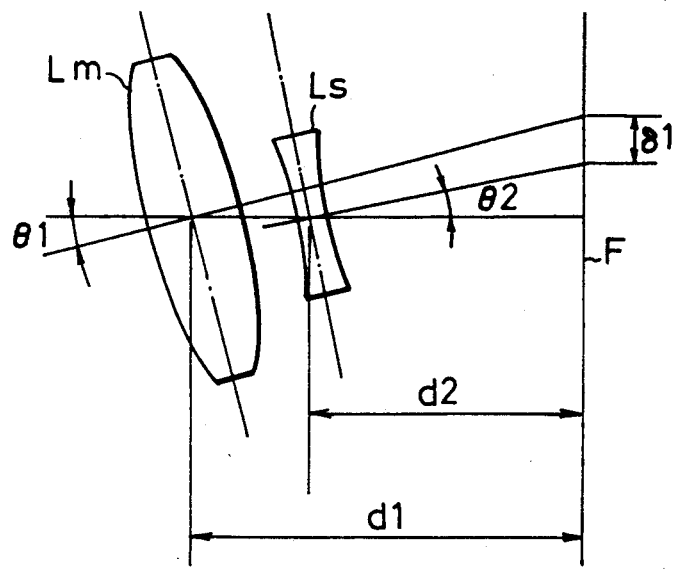
FIG. 8 is a view for explaining another example of the inclining states of the main lens group and the sublens group with respect to the photographing optical axis.

For example, when the main lens group and the sublens group are inclined with respect to the optical axis, there are two cases shown in FIGS. 7 and 8. In the case shown in FIG. 7, the main lens group Lm and the sublens group Ls are inclined in directions opposite to each other. In the case shown in FIG. 8, the main lens group Lm and the sublens group Ls are inclined in the same direction. In the case of the parallel shifts, the main lens group Lm and the sublens group Ls are inclined in the same direction as a result when one of the lens groups Lm, Ls is shifted from the optical axis in parallel therewith and parallel shifting amounts of the lens groups Lm, Ls are different from each other.

Accordingly, in the entire photographing optical system, there is a difference in degree of reduction of image forming performance caused by the above eccentricity between the two cases in which the two lens groups Lm, Ls are inclined in the opposite directions and are inclined in the same direction.

In the case in which the two lens groups Lm, Ls are inclined in the opposite directions, an image length changing amount $\delta 2$ on a film face F is provided as follows as shown in FIG. 7.

$$\delta 2 = d1 \cdot \tan\theta 1 + d2 \cdot \tan\theta 2$$

In contrast to this, in the case in which the two lens groups Lm, Ls are inclined in the same direction, an image length changing amount $\delta 1$ on the film face F is provided as follows as shown in FIG. 8.

$$\delta 1 = |d1 \cdot \tan\theta 1 - d2 \cdot \tan\theta 2|$$

Accordingly, the reduction degree of the image forming performance in the latter case showing the same direction is smaller than that in the former case showing the opposite directions.

Accordingly, when the inclinations of the respective lens groups Lm, Ls are prevented or restricted by using a biasing means, it is advantageous to incline the two lens groups Lm, Ls in the same direction. When the lens groups Lm, Ls are inclined by the biasing means in the same direction, it is generally necessary to use at least two springs in the biasing means. However, the structure of such a biasing means having plural springs becomes complicated in the case of a varifocal lens having a small limited space for the biasing means and the cost of the varifocal lens is increased.

Therefore, in this embodiment, this biasing means is constructed by the single connection spring 27. Further, relative engaging positions of the connection spring 27 with respect to the common pole 4 and the adjusting screw 28 are set such that the respective lens groups Lm, Ls are inclined by the above fitting clearances in the same direction.

Namely, in this embodiment, the single connection spring 27 is disposed between the projection 11b formed in the frame body 11 of the front group frame 10 and the projection 22b formed in the base portion 22 of the rear group frame 20. As shown in FIG. 5, an engaging end portion of the connection spring 27 on the side of the front group frame 10 is located on a flat face outside the common pole 4 seen from this common pole 4. An engaging end portion of the connection spring 27 on the side of the rear group frame 20 is located on an approximately intermediate flat face between the common pole 4 and the adjusting screw 28.

When both the engaging end portions of the connection spring 27 are set as above, biasing tensile force of the connection spring 27 is caused by displacing the front group frame 10 on the photographed object side and is applied to the front group frame 10 and the rear group frame 20 supported in the cantilever shape as follows.

Namely, the biasing force of the connection spring 27 is applied to the front group frame 10 such that the front group frame 10 is rotated around the common pole 4 as a fulcrum in the counterclockwise direction shown by an arrow in FIG. 5. Simultaneously, the biasing force of the connection spring 27 is applied to the rear group frame 20 such that the rear group frame 20 is rotated around the front end portion of the adjusting screw 28 as a fulcrum in the counterclockwise direction shown by an arrow in FIG. 5.

As a result, both the front group frame 10 and the rear group frame 20 are rotated in the counterclockwise direction when there are fitting clearances between the common pole 4 and the front group frame 10 and between the common pole 4 and the rear group frame 20. Thus, both the main lens group Lm and the sublens group Ls are inclined in the same direction.

Accordingly, the image length changing amount δ1 on the film face F caused by these inclinations are provided as follows as mentioned above.

$$\delta 1 = |d1 \cdot \tan \theta 1 - d2 \cdot \tan \theta 2|$$

Thus, the image forming performance of the photographing optical system is preferably maintained.

The above-mentioned flat faces with respect to the connection spring 27 are set as one example. Accordingly, the positions of both the engaging end portions of the connection spring 27 can be set on another faces if the same effects can be obtained.

A driven gear 31 is fixedly attached to a left-hand end portion of the above driving lead screw 6. The driven gear 31 is connected to a driving gear 34 of a DC motor 33 described later through an unillustrated reduction gear mechanism suitably constructed for this driven gear.

Similar to the driving gear 34, a rotary encoder 32 is fixedly attached to an output shaft of the DC motor 33. The encoder 32 constitutes a digital signal generating means 36 in combination with a photo-interrupter 35 disposed in a fixed portion of the tube body 2. For example, the DC motor 33 is constructed by a motor having a core. The DC motor 33 can be rotated in normal and reverse directions by a driving electric current supplied from a motor current-supplying circuit 60 described later.

Driving rotational forces of the DC motor 33 in the normal and reverse directions are transmitted to the driving lead screw 6 through the driving gear 34 fixedly attached to an output shaft of the DC motor 33 and the above driven gear 31 including a suitable reduction gear mechanism. The front group frame 10 can be displaced by these driving rotational forces forward and backward along the photographing optical axis O.

The digital signal generating means 36 composed of the encoder 32 and the photo-interrupter 35 is a means for detecting the number of rotations of the DC motor 33 or a rotational angle thereof as a digital pulse signal. In the following description, the number of rotations of the DC motor 33 is briefly detected as the number of digital pulse signals. The number of rotations of the driving lead screw 6 is restricted on the basis of a counting value of the digital signal detected by the digital signal generating means 36.

A microcomputer 55 as a digital signal counting means counts the number of digital signals by receiving the pulse signal generated by the digital signal generating means 36. A counting value of the microcomputer 55 is compared with set and comparative reference values respectively set within the microcomputer 55 when an initial setting operation in each of the photographing modes, the switching operation of the focal lengths and the focusing operation at each of the focal lengths are performed.

The positioning base 40 is made of a suitable material having a low thermal expansion coefficient such as a metallic material. A right-hand end portion of the positioning base 40 is fixed to the wall portion 3a of the lens tube frame 3 proximate to the exposure aperture 2a. A left-hand end portion 45 of the positioning base 40 is constructed by a free end portion constituting a support end portion of the above adjusting screw 28 (see FIG. 4).

It is preferable to reduce a distance between the right-hand end portion of the positioning base 40 and the exposure aperture 2a (or the film face F) as much as possible. In this case, it is also preferable to reduce a thickness of the wall portion 3a of the lens tube frame 3 as much as possible.

An inside face of the positioning base 40 is arranged in parallel with the photographing optical axis O or the common pole 4. The positioning switch substrate 41 is fixed onto this inside face of the positioning base 40 and is formed by a suitable insulating material such as synthetic resin.

Figure 9:
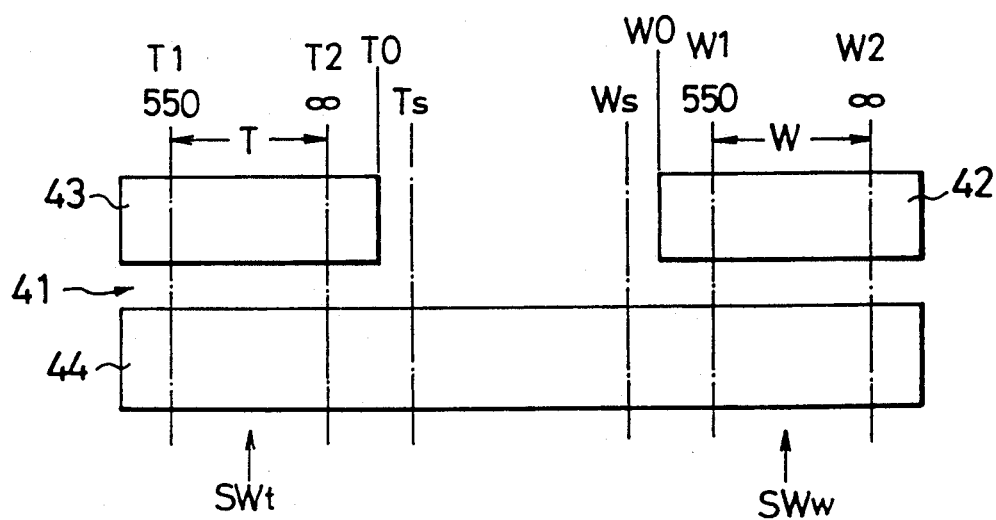
FIG. 9 is a view for showing the relative arrangement of a wide angle pattern, a telescopic pattern and a ground pattern constituting a wide angle positioning switch and a telescopic positioning switch.
Figure 10:
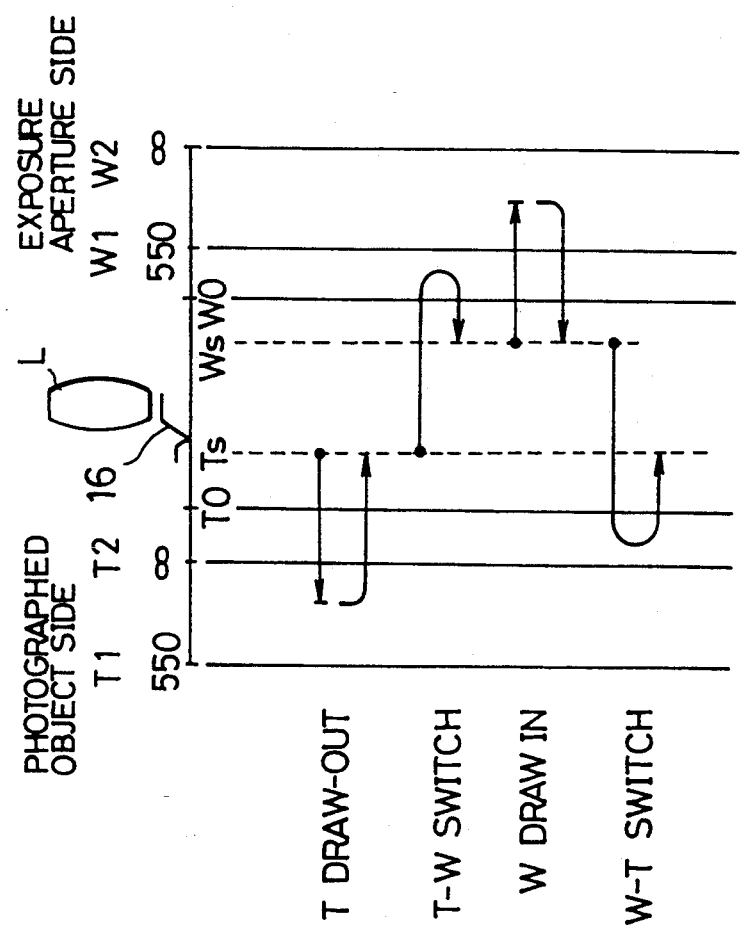
FIG. 10 is an explanatory view for showing one example of wide angle and telescopic switching controls in the varifocal lens.

Three conductive patterns composed of the wide angle pattern 42, the telescopic pattern 43 and the ground pattern 44 are formed in the positioning switch substrate 41 in an arrangement state shown in FIGS. 9 and 10. These conductive patterns are formed as electric members for setting the main lens group Lm and the front group frame 10 in predetermined positions at the wide angle and telescopic times.

The wide angle pattern 42 and the telescopic pattern 43 are disposed on the same line in parallel with the ground pattern 44 along the optical axis O. An insulating clearance portion as an insulating region is formed between the wide angle pattern 42 and the telescopic pattern 43 along the optical axis O.

The one sliding leg portion of the above sliding brush 16 selectively comes in contact with the wide angle pattern 42 and the telescopic pattern 43. Simultaneously, the other sliding leg portion comes in contact with the ground pattern 44 at any time.

Figure 11:
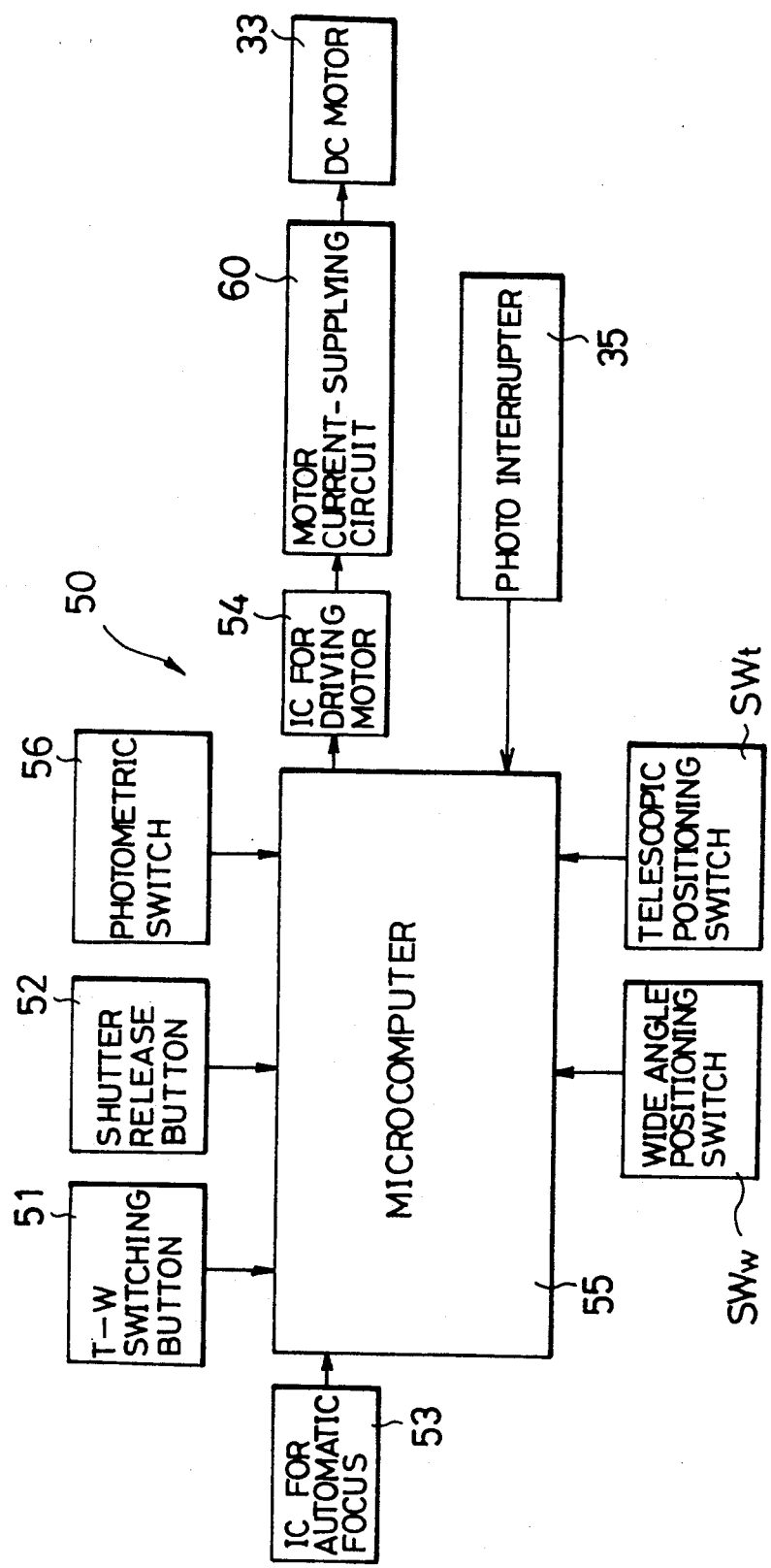
FIG. 11 is a block diagram showing a control section of the varifocal lens shown in FIG. 3.

As a result, the wide angle pattern 42 and the ground pattern 44 are short-circuited through both the sliding leg portions of the sliding brush 16. A wide angle positioning switch $SW_w$ shown in FIG. 11 is constructed by the sliding brush 16, the wide angle pattern 42 and the ground pattern 44. The telescopic pattern 43 and the ground pattern 44 are also short-circuited through both the sliding leg portions of the sliding brush 16. A telescopic positioning switch $SW_t$ shown in FIG. 11 is constructed by the sliding brush 16, the telescopic pattern 43 and the ground pattern 44.

When one of the sliding leg portions of the sliding brush 16 is located on the wide angle and telescopic patterns 42 and 43, each of the two positioning switches $SW_w$ and $SW_t$ constructed by the sliding brush 16 and the three conductive patterns 42 to 44 outputs a turning-on signal having a low voltage. When the one sliding leg portion of the sliding brush 16 is separated from a left-hand edge portion W0 of the wide angle pattern 42 and a right-hand edge portion T0 of the telescopic pattern 43, the above respective short-circuiting states are released and each of the switches SW$_w$ and SW$_t$ outputs a turning-off signal having a high voltage.

Accordingly, when the one sliding leg portion of the sliding brush 16 is located in the above insulating region, the two positioning switches SW$_w$ and SW$_t$ output the turning-off signals.

FIG. 11 is a block diagram showing one example of a control section used in the varifocal lens in the first embodiment of the present invention.

This control section 50 is constructed by a T-W switching button 51, a shutter release button 52, an integrated circuit (IC) 53 for automatic focus (AF), an integrated circuit (IC) 54 for driving the DC motor and the microcomputer 55. The control section 50 is also constructed by respective functional means such as a photometric switch 56, the motor current-supplying circuit 60, etc., and switching means including the above two positioning switches SW$_w$, SW$_t$.

For example, the T-W switching button 51 is constructed by a suitable member manually operated. The shutter release button 52 is constructed by e.g., a manually operated member in which an operating stroke is divided into first and second stage releasing strokes.

The integrated circuit 53 for automatic focus detects a photographing distance at each of the focal lengths by a suitable unillustrated means of e.g., an infrared ray emitting type for photoelectrically measuring the photographing distance. The integrated circuit 53 for automatic focus then outputs a detected value of the photographing distance to the microcomputer 55 as automatic focusing distance information.

The integrated circuit 54 for driving the DC motor is constructed such that the DC motor 33 can be rotated in the normal or reverse direction on the basis of a command from the microcomputer 55. A suitable delay circuit is disposed within the integrated circuit 54. This delay circuit is not used when the focal operation at each of the focal lengths is controlled. This delay circuit is used on the basis of the command from the microcomputer 55 only when the switching operation of the focal lengths is controlled. For example, the photometric switch 56 is turned on in association with the first stage releasing stroke of the shutter release button 52.

The microcomputer 55 is constructed by a central processing unit including suitable unillustrated memory, calculating and comparing circuits. The microcomputer 55 controls a normal sequential photographing operation. Further, the microcomputer 55 can rotate the DC motor 33 in the normal or reverse direction and stop the rotation of the DC motor 33 based on signals from the respective functional means 51 to 56 and the turning-on and turning-off signals of the two positioning switches SW$_w$ and SW$_t$.

Namely, firstly, the microcomputer 55 controls the initial setting operation for setting operable states of the front group frame 10 and the rear group frame 20 when a new photographing operation is performed. Secondly, the microcomputer 55 controls the switching operation of the focal lengths from the wide angle mode to the telescopic mode, or the telescopic mode to the wide angle mode. Thirdly, the microcomputer 55 controls the focusing operation at each of the focal lengths.

The memory circuit of the microcomputer 55 stores information of the photographing modes in advance at the previous photographing time. This information is composed of information as to whether the previous photographing operation is performed in the wide angle or telescopic photographing mode.

One example of a method for controlling the initial setting operation in the first embodiment of the present invention will first be described.

In FIG. 9, when the focusing operation at each of the focal lengths is performed, the front group frame 10 is first selectively set in starting positions Ws and Ts as positions for starting the focusing operations at the focal lengths in the respective photographing modes. Then, the front group frame 10 is displaced from the selected starting position to a predetermined focusing position to be performed.

Namely, in the wide angle photographing mode, the front group frame 10 begins to be displaced or moved from the starting position Ws as a first focusing starting position at the wide angle time. In the telescopic photographing mode, the front group frame 10 begins to be displaced from the starting position Ts as a second focusing starting position at the telescopic time.

As shown in FIG. 9, the starting position Ws at the wide angle time is set near the exposure aperture 2a within the above insulating region in advance. The starting position Ts at the telescopic time is set near the photographed object within the insulating region in advance.

Focusing regions W and T at the respective focal lengths are set as follows with respect to the starting positions Ws and Ts.

Namely, the focusing region W at the wide angle time is set on the wide angle pattern 42 in a state in which a most proximate distance corresponding position W1 and an infinite distance corresponding position W2 are sequentially located toward the exposure aperture 2a from the starting position Ws at the wide angle time. The focusing region T at the telescopic time is set on the telescopic pattern 43 in a state in which an infinite distance corresponding position T2 and a most proximate distance corresponding position T1 are sequentially located toward the photographed object from the starting position Ts at the telescopic time. Accordingly, arrangements of the focusing regions W and T at the wide angle and telescopic times are opposite to each other.

Accordingly, as shown in FIG. 9, the most proximate distance corresponding position W1 at the wide angle time and the infinite distance corresponding position T2 at the telescopic time are set in proximity to each other such that the respective starting positions Ws and Ts are located between the most proximate distance corresponding position W1 and the infinite distance corresponding position T2. Accordingly, the distance between the most proximate distance corresponding position W1 at the wide angle time and the infinite distance corresponding position T2 at the telescopic time can be set to be very short in comparison with the general varifocal lens.

When an operable state of the varifocal lens is set to perform the new photographing operation, the front group frame 10 and the main lens group Lm are initially set in one of the starting positions Ws and Ts.

As mentioned above, the photographing mode information at the previous photographing time is stored into the microcomputer 55. Accordingly, the front group frame 10 is stopped in a position for completing the focusing operation at the previous photographing time as it is if no varifocal lens is operated. Therefore, when the new photographing operation is started, it is necessary to return the front group frame 10 to one of the starting positions Ws and Ts.

In this case, there are two control methods for moving the front group frame 10 to one of the starting positions Ws and Ts at the respective focal lengths in accordance with two cases using manual and automatic controls. In the case of the automatic control, there is a case in which a turning-on signal of a power switch on the side of the varifocal lens or a camera is used as a signal for performing the initial setting operation. The power switch on the side of the varifocal lens or the camera is simply called the power switch on the camera side in the following description. In the case of the automatic control, there is another case in which a winding-up completing signal transmitted at the completing time of a winding-up operation (i.e., a shutter charging operation) of a film on the camera side is used as an automatic returning signal. This another case is considered to be most general.

In both the cases using the manual and automatic controls, the operation of the front group frame 10 is controlled such that the front group frame is moved to one of the starting positions Ws and Ts in accordance with the position of the sliding brush 16 when the previous photographing operation is completed.

In the following description, it is assumed that the front group frame 10 is initially set in the starting position Ws at the wide angle time using the turning-on signal of the power switch on the camera side when the previous photographing operation is performed in the wide angle photographing mode. In this case, a basic method for controlling the operation of the varifocal lens will next be described.

(a) When the sliding brush 16 is located in a position corresponding to the start position Ws at the wide angle time, the microcomputer 55 controls the operation of the DC motor 33 such that no DC motor 33 is rotated even when the turning-on signal of the power switch on the camera side is inputted to the microcomputer 55.

(b) When the sliding brush 16 is located in a position at the completing time of the focusing operation on the wide angle pattern 42 including the left-hand edge portion WO, the microcomputer 55 controls the operation of the DC motor 33 such that the DC motor 33 is rotated to move the front group frame 10 in the telescopic direction (in the direction of the photographed object) based on the turning-on signal of the power switch on the camera side.

When the DC motor 33 is rotated to move the front group frame 10 toward the photographed object in the telescopic direction and the sliding brush 16 is separated from the left-hand edge portion WO of the wide angle pattern 42, the wide angle positioning switch $SW_w$ outputs a turning-off signal to the microcomputer 55. The microcomputer 55 controls the operation of the DC motor 33 based on this turning-off signal such that the supply of an electric current to the DC motor 33 is interrupted. As a result, the front group frame 10 is returned to the starting position Ws at the wide angle time. This returning state is shown by a lower moving line with respect to W DRAW-IN at a third stage from an uppermost position in FIG. 10.

In contrast to this, when the previous photographing operation is performed in the telescopic photographing mode and the front group frame 10 is initially set to the starting position Ts at the telescopic time using the turning-on signal of the power switch on the camera side, the microcomputer 55 controls the operation of the DC motor 33 in a control method similar to the above method for controlling the initial setting operation with respect to the items (a) and (b). This operating state is shown by a lower moving line with respect to T DRAW-OUT at an uppermost stage in FIG. 10.

Namely, in this control method, in the control operation with respect to the items (a) and (b), "the starting position Ws at the wide angle time" is changed to "the starting position Ts at the telescopic time". "The wide angle pattern 42" is changed to "the telescopic pattern 43". "The left-hand edge portion WO" is changed to "the right-hand edge portion TO". "The telescopic direction (the direction of the photographed object)" is changed to "the wide angle direction (on the side of the exposure aperture 2a)". Further, "the wide angle positioning switch $SW_w$" is changed to "the telescopic positioning switch $SW_t$". The initial setting operation is controlled in accordance with these changes.

There is a case in which the front group frame 10 is automatically returned to one of the starting positions Ws and Ts from the photographing completing position at the previous time by using a winding-up completing signal transmitted at the completing time of the winding-up operation of the film on the camera side. In this case, the winding-up completing signal is used instead of the above turning-on signal of the power switch on the camera side.

Namely, the above control operation with respect to the items (a) and (b) is executed when the front group frame 10 is automatically returned to the starting position Ws at the wide angle time. A control operation similar to the control operation with respect to the items (a) and (b) is executed when the front group frame 10 is automatically returned to the starting position Ts at the telescopic time.

In the following description, the automatic returning operation is included in the initial setting operation to avoid a complicated explanation about the operation of the varifocal lens when it is not necessary to especially distinguish these operations from each other.

For example, a suitable unillustrated manual returning switch is disposed in advance when the front group frame 10 is manually moved from the photographing completing position at the previous time to one of the starting positions Ws and Ts. The control operation with respect to the items (a) and (b) and the above control operation similar thereto can be executed by using a manual returning signal from this manual returning switch.

One example of the switching control of the focal lengths in the first embodiment of the present invention will next be described.

When one focal length is changed or switched to the other, one photographing mode is switched to the other by using the T-W switching button 51 so as to move the front group frame 10 from a starting position at the one focal length to a starting position at the other focal length. In the first embodiment, this switching control is executed on the basis of the following operations.

For example, a basic control method for switching the wide angle photographing mode to the telescopic photographing mode will next be described.

(c) When the T-W switching button 51 is switched from the wide angle photographing mode to the telescopic photographing mode, the microcomputer 55 controls the operation of the DC motor 33 based on a switching signal of the T-W switching button 51 such that the DC motor 33 is rotated to move the front group frame 10 in the telescopic direction (in the direction of the photographed object).

Thus, the front group frame 10 is moved by this rotation of the DC motor 33 from the starting position Ws at the wide angle time in the direction of the photographed object. The sliding brush 16 exceeds the starting position Ts at the telescopic time and then comes in contact with the right-hand edge portion T0 of the telescopic pattern 43. At this time, the telescopic positioning switch $SW_t$ outputs a turning-on signal to the microcomputer 55. The microcomputer 55 controls the operation of the DC motor 55 based on this turning-on signal such that the DC motor 33 is reversely rotated to move the front group frame 10 in the wide angle direction.

Thus, the front group frame 10 and the sliding brush 16 are reversely moved on the side of the exposure aperture 2a by the reverse rotation of the DC motor 33. When the sliding brush 16 is separated from the right-hand edge portion T0 of the telescopic pattern 43, the telescopic positioning switch $SW_t$ outputs a turning-off signal to the microcomputer 55. The microcomputer 55 controls the operation of the DC motor 33 based on this turning-off signal so as to interrupt the supply of an electric current to the DC motor 33.

As a result, the front group frame 10 is moved to the starting position Ts at the telescopic time from the telescopic pattern 43 and is stopped in this starting position Ts. This stopping state is shown by a moving line with respect to W-T SWITCH at a lowermost stage in FIG. 10.

In contrast to this, when the telescopic photographing mode is switched to the wide angle photographing mode, the microcomputer 55 controls the operation of the DC motor 33 by a control method similar to that with respect to the above item (c). This switching state is shown by a moving line with respect to T-W SWITCH at a second stage in FIG. 10.

Similar to the case of the initial setting control operation mentioned above, in the control method with respect to the item (c), "the starting position Ws at the wide angle time" is changed to "the starting position Ts at the telescopic time". "The wide angle pattern 42" is changed to "the telescopic pattern 43". "The left-hand edge portion W0" is changed to "the right-hand edge portion T0". "The telescopic direction (the direction of the photographed object)" is changed to "the wide angle direction (on the side of the exposure aperture 2a)". Further, "the wide angle positioning switch $SW_w$" is changed to "the telescopic positioning switch $SW_t$". The microcomputer 55 controls the operation of the DC motor 33 in accordance with these changes.

Finally, the focusing control at each of the focal lengths in the first embodiment will next be described.

In this case, a calculating circuit of the microcomputer 55 has a calculating function for performing the focusing operation at each of the focal lengths in advance.

This calculating function is provided to convert a focusing amount of the main lens group Lm required to perform the photographing operation to the number of rotations of the DC motor 33. This focusing amount of the main lens group Lm corresponds to displacing amounts of the front group frame 10 and the sliding brush 16. In the first embodiment shown in FIG. 11, this converted focusing amount can be calculated on the basis of automatic focusing (AF) distance information from the integrated circuit 53 for automatic focus.

The focusing amount converted as the number of rotations of the DC motor 33 is set as a digital comparative reference value in the focusing operation. For example, this reference value is set as the number of rotations of the DC motor 33 counted from a time point at which the front group frame 10 is slightly moved from the starting position Ws at the wide angle time in the direction of a wide angle photographing region. In the embodiment shown in FIG. 9, this reference value is set as the number of rotations of the DC motor 33 counted from a time point at which the sliding brush 16 comes in contact with the left-hand edge portion W0 of the wide angle pattern 42 and the wide angle positioning switch $SW_w$ outputs the turning-on signal.

The left-hand edge portion W0 of the wide angle pattern 42 and the right-hand edge portion T0 of the telescopic pattern 43 are set as counting reference positions or counting starting points when the focusing operation is controlled. For example, the above comparative reference value can be temporarily stored into a comparing circuit of the microcomputer 55 every photographing operation.

The focusing control operation is performed in a state in which the front group frame 10 is located in one of the starting positions Ws and Ts.

(d) When the shutter release button 52 is first pushed in the focusing operation, the photometric switch 56 is turned on at the first releasing stroke of the shutter release button 52. Thus, the integrated circuit 53 for automatic focus measures a photographing distance at this time and outputs automatic focusing distance information indicative of this photographing distance to the microcomputer 55.

The microcomputer 55 receives this automatic focusing distance information from the integrated circuit 53 for automatic focus and performs a calculating operation for converting a focusing amount of the main lens group Lm suitable for the photographing distance at this time to the number of rotations of the DC motor 33. Then, the microcomputer 55 temporarily stores the number of rotations of the DC motor 33 into the comparing circuit as a comparative reference value.

When this storing operation is completed, the front group frame 10 begins to be displaced from one of the starting positions Ws and Ts in a predetermined direction. For example, when the front group frame 10 is located in the starting position Ws at the wide angle time, the front group frame 10 is displaced from this starting position Ws toward the exposure aperture 2a.

The microcomputer 55 begins to count the number of pulse signals from the digital signal generating means 36 as the number of rotations of the DC motor 33 when the sliding brush 16 comes in contact with the left-hand edge portion W0 of the wide angle pattern 42 by the displacement of the front group frame 10 and the turning-on signal from the wide angle positioning switch $SW_w$ is inputted to the microcomputer 55.

The supply of an electric current to the DC motor 33 is interrupted when a counting value of the number of digital pulse signals generated by the digital signal generating means 36 and counted by the microcomputer 55 is in conformity with the above comparative reference value. Namely, the displacing amount of the front group frame 10 from a position thereof for outputting the turning-on signal from the wide angle positioning switch $SW_w$ is controlled to be determined by the comparative reference value within the microcomputer 55. It is also possible to set this comparative reference value as the number of rotations of the DC motor 33 counted from the starting position Ws at the wide angle time.

When the front group frame 10 is located in the starting position Ts at the telescopic time, the focusing amount of the main lens group Lm suitable for the photographing distance is converted to the number of rotations of the DC motor 33 counted from the right-hand edge portion T0 of the telescopic pattern 43. The number of rotations of the DC motor 33 is set and stored as the comparative reference value at the telescopic time. Thereafter, the focusing amount of the main lens group Lm is controlled in accordance with the above focusing control at the wide angle time.

There are a free rotating method and a brake applying method for stopping the rotation of the motor rotating at a high speed. In the free rotating method, the rotation of the motor is naturally stopped by interrupting the supply of an electric current to the motor. In the brake applying method, the rotation of the motor is compulsorily stopped by applying braking force to the motor.

In these methods, while the rotation of the motor is really stopped after a signal for stopping the rotation of the motor is transmitted from a control means, the motor is rotated by a certain number of rotations in accordance with free-running rotation even when the used DC motor is operated with high accuracy.

There is great dispersion in the number of rotations of the motor in the free-running rotation even when there is no cogging, i.e., no periodic torque change peculiar to the DC motor having a core. A final stopping position of the motor is greatly influenced by this dispersion.

Figure 12:
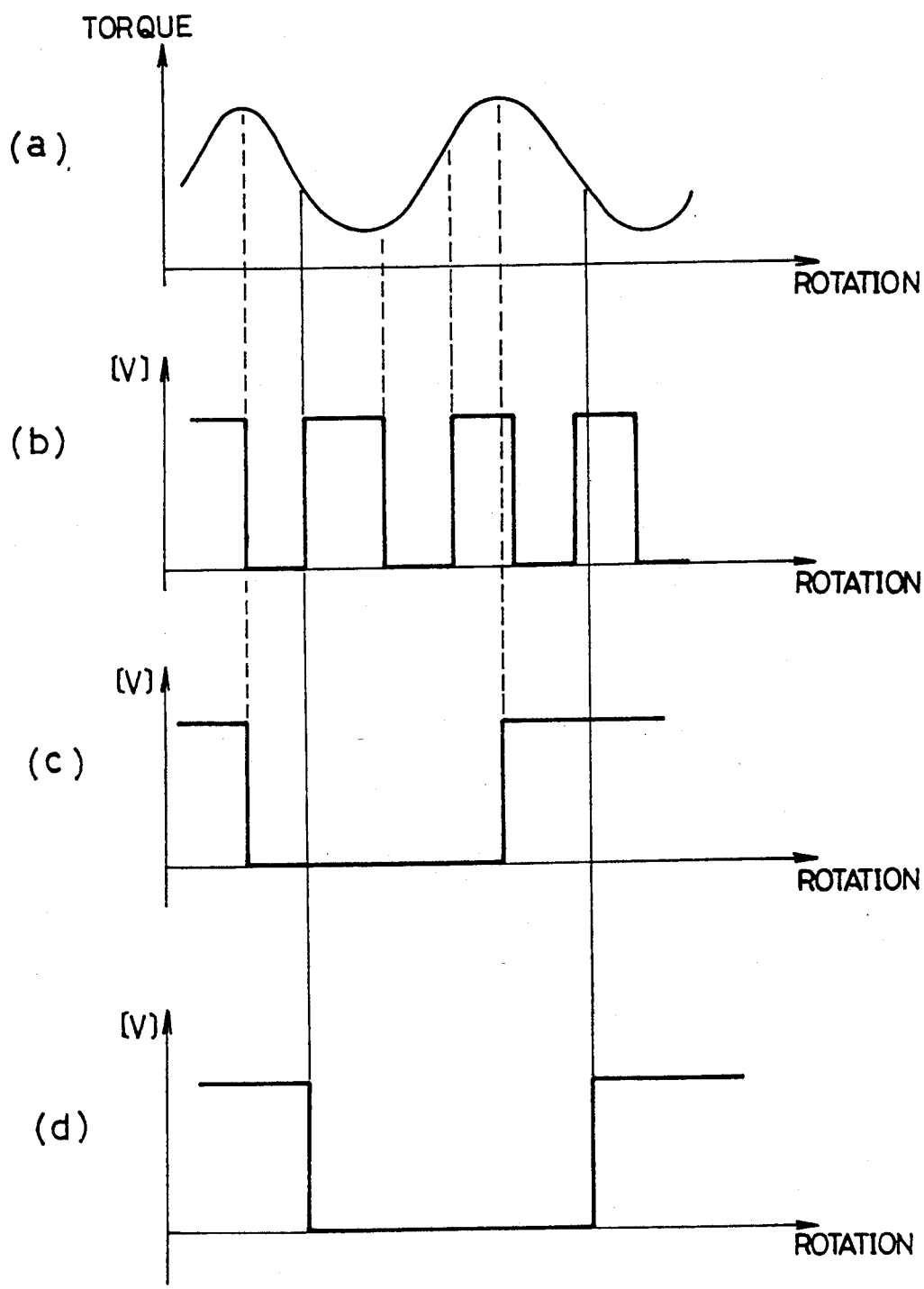
FIG. 12 is a characteristic graph for explaining rotating states of a motor in which item (a) shows a change in free-running rotational torque of the motor caused by cogging, item (b) a final stopping position of the motor provided by the change in free-running rotational torque, and items (c) and (d) show final stopping positions of a DC motor in the present invention provided by the change in free-running rotational torque.

Namely, as shown in FIG. 12, in the case of a pulse generated in a random state in which there is no synchronization point within one period with respect to the change in free-running rotational torque caused by cogging, there is dispersion in final stopping position of the motor by the relation between the free-running rotational torque and load when the stopping signal is outputted to the motor after an arbitrary number of pulses.

The original performance of the motor is adversely affected by this dispersion in final stopping position so that the accuracy in control of the operation of the motor is greatly reduced. Accordingly, the accuracies in the initial setting operation, the switching operation of the focal lengths and the focusing operation are greatly reduced when these operations are controlled by using the number of rotations of the motor. Accordingly, when the number of rotations of the motor is used to control such operations, it is necessary to prevent a bad influence caused by the dispersion in stopping position of the motor.

Therefore, in this embodiment, the DC motor 33 and the digital signal generating means 36 are operated in synchronization with each other such that a cogging period Tm of the DC motor 33 and a pulse signal generating period Tp of the digital signal generating means 36 have the following relation.

$$(\tfrac{1}{2})\cdot Tp = n\cdot Tm$$

In this relation, n is a natural number.

For example, when there are six coggings of the DC motor 33 per one rotation thereof, a slit of the encoder 32 is designed such that pulse signals can be generated multiple times of value 6 such as 12 times per one rotation of the DC motor 33.

In such a structure, when the supply of an electric current to the DC motor 33 is interrupted, the DC motor 33 is stopped in free-running rotational torque positions shown by items (c) and (d) of FIG. 12 when the above relation is satisfied. Accordingly, it is possible to accurately stop the motor in the final stopping position without the dispersion in stopping position of the motor caused by cogging in any stopping position thereof so that the above bad influence caused by this dispersion can be prevented.

This is because the stopping signal for substantially stopping the rotation of the DC motor 33 is generated in the same free-running rotational torque position at any time when a half pulse period (Tp/2) of the period Tp is a multiple of the cogging period Tm. It is not necessary to set the free-running rotational torque position of the DC motor 33 to a peak position of cogging torque.

There is a slight difference until the rotation of the DC motor 33 is really stopped after the stopping signal for stopping the supply of an electric signal to the DC motor 33 is generated even when the DC motor 33 and the digital signal generating means 36 are operated in synchronization with each other such that the cogging period Tm of the DC motor 33 and the pulse signal generating period Tp of the digital signal generating means 36 satisfy the above relation. The DC motor 33 is slightly rotated by an overrunning amount for this slight time.

Therefore, in the above initial setting control and the switching control of the focal lengths, the sliding brush 16 and the front group frame 10 are not necessarily stopped in the respective preset starting positions Ws and Ts accurately even when the stopping signal is transmitted from the microcomputer 55 to the DC motor 33 at a predetermined timing.

Namely, a slight clearance corresponding to the overrunning amount is caused between the starting position Ws at the wide angle time and the left-hand edge portion W0 of the wide angle pattern 42 in which the stopping signal for stopping the rotation of the DC motor 33 is generated. Further, a slight clearance corresponding to the overrunning amount is caused between the starting position Ts at the telescopic time and the right-hand edge portion T0 of the telescopic pattern 43 in which the stopping signal for stopping the rotation of the DC motor 33 is generated.

When these slight clearances are not allowable in view of the accuracy in operation of the varifocal lens, the varifocal lens is constructed as follows.

Namely, as mentioned above, in the cases of the controls of the initial setting operation at the wide angle time and the switching operation of the focal lengths from the telescopic photographing mode to the wide angle photographing mode, the sliding brush 16 is actually stopped in a position separated by a distance corresponding to the overrunning amount from the left-hand edge portion W0 of the wide angle pattern 42. Further, in the cases of the controls of the initial setting operation at the telescopic time and the switching operation of the focal lengths from the wide angle photographing mode to the telescopic photographing mode, the sliding brush 16 is actually stopped in a position separated by a distance corresponding to the overrunning amount from the right-hand edge portion T0 of the telescopic pattern 43.

Accordingly, when the starting positions Ws and Ts at the wide angle and telescopic times are set in positions separated by the distances corresponding to the overrunning amount from the respective edge portions W0 and T0 in advance, it is possible to stop the sliding brush 16 in the preset starting positions Ws and Ts with high accuracy even in the cases of the controls of the initial setting operation and the switching operation of the focal lengths.

Therefore, in this embodiment, the relative position between the starting position Ws at the wide angle time and the left-hand edge portion W0 of the wide angle pattern 42 is set in consideration of the overrunning amount. Further, the relative position between the starting position Ts at the telescopic time and the right-hand edge portion T0 of the telescopic pattern 43 is set in consideration of the overrunning amount.

The varifocal lens constructed above in the first embodiment of the present invention is operated as follows with reference to the flow chart shown in FIG. 13.

As mentioned above, when the previous photographing operation is completely performed, the front group frame 10 and the sliding brush 16 are located in one of the starting positions Ws and Ts, or are located on one of the wide angle and telescopic patterns 42 and 43.

In this state, when a power switch of the varifocal lens, etc. is turned on, the microcomputer 55 controls the above initial setting operation with respect to the items (a) and (b), or the initial setting operation using a control method similar to that with respect to the items (a) and (b) in accordance with a photographing mode at this time. Thus, the front group frame 10 is returned to one of the starting positions Ws and Ts.

In the following description, the operation of the varifocal lens is performed as an example when the front group frame 10 is initially set in the starting position Ws at the wide angle time.

When the front group frame 10 and the sliding brush 16 are first located in the starting position Ws at the wide angle time and the power switch of the varifocal lens, etc. is turned on, the microcomputer 55 executes the above initial setting control operation with respect to the item (a) to control the operation of the front group frame 10 such that the position of the front group frame 10 is held as it is.

When the sliding brush 16 is located on the wide angle pattern 42 including the left-hand edge portion W0, the microcomputer 55 executes the above initial setting control operation with respect to the item (b) such that the front group frame 10 is returned to the starting position Ws at the wide angle time.

When the microcomputer 55 executes the control operation with respect to the item (b), the DC motor 33 is rotated to move the front group frame 10 in the telescopic direction. Driving rotational force of the DC motor 33 is transmitted to the front group frame 10 through the driving lead screw 6 and the driving lead nut 15. Thus, the front group frame 10 is moved in the telescopic direction, i.e., in the direction of the photographed object.

When the front group frame 10 is moved in the telescopic direction and the sliding brush 16 is moved to a position outside the left-hand edge portion W0 of the wide angle pattern 42, the wide angle positioning switch $SW_w$ outputs a turning-off signal to the microcomputer 55. At this time, the microcomputer 55 gives a command for interrupting the supply of an electric current to the DC motor 33 from the motor current-supplying circuit 60.

As a result, the supply of an electric current to the DC motor 33 from the motor current-supplying circuit 60 is interrupted, but the DC motor 33 is continuously rotated as it is in accordance with the free-running rotation. The rotation of the DC motor 33 is stopped in the free-running rotation torque positions shown by items (c) and (d) in FIG. 12 when the cogging period Tm of the DC motor 33 and the pulse signal generating period Tp of the digital signal generating means 36 satisfy the following synchronization relation.

$$(\tfrac{1}{2}) \cdot Tp = n \cdot Tm$$

In this relation, n is a natural number. This stopping state is shown by a lower moving line with respect to W DRAW-IN at the third stage in FIG. 10. In this case, the stopping position of the DC motor 33 is constant at any time, but is separated by the above distance corresponding to the overrunning amount from the left-hand edge portion W0 of the wide angle pattern 42.

Accordingly, as mentioned above, if the starting position Ws at the wide angle time is set in advance to the free-running rotation torque position of the DC motor 33, the front group frame 10 can be stopped in the free-running rotation torque position of the DC motor 33 at any time even when the front group frame 10 is located on the wide angle pattern 42 in any position thereof at the completing time of the previous photographing operation.

As mentioned above, the starting position Ws at the wide angle time is set near the exposure aperture 2a in comparison with the starting position Ts at the telescopic time. Therefore, when the front group frame 10 is set in the starting position Ws at the wide angle time, the front group frame 10 is arranged on the photographing optical axis O on a side near the exposure aperture 2a in comparison with the position of the front group frame 10 shown in FIG. 4. The rear group frame 20 is arranged in the escaping position outside the photographing optical axis O backward from the front group frame 10 against the biasing force of the compression spring 29.

In this state, the rear group frame 20 is pushed by the front group frame 10 on the side of the exposure aperture 2a through the moving projection 26 or the T-W nut 22a. Thus, the inserting/separating pin 24 disposed in the base portion 22 of the rear group frame 20 is pushed down by the pushing-down acting face 7a of the cam plate member 7. Accordingly, the rear group frame 20 is rotated against the biasing rotational force of the spiral spring 25 in the clockwise direction. Further, the rear group frame 20 is held by the holding acting face 7b of the cam plate member 7 in a rotating state.

As a result, only the front group frame 10 is located on the photographing optical axis O near the exposure aperture 2a. The rear group frame 20 is arranged in a position escaped from the photographing optical axis O. In such an optical arrangement of the front and rear group frames, the axial position of the front group frame 10 is stabilized by the biasing force of the compression spring 29. Namely, the focal length at the wide angle time is provided by the relation in position between the main lens group Lm and the sublens group Ls.

In contrast to this, the operation of the varifocal lens is controlled as follows when the front group frame 10 is initially set in the starting position Ts at the telescopic time.

When the front group frame 10 and the sliding brush 16 are located in the starting position Ts at the telescopic time and the power switch of the varifocal lens, etc. is turned on, the microcomputer 55 executes a control operation using a control method similar to that with respect to the item (a). Namely, in this control operation, the operation of the front group frame 10 is controlled such that the position of the front group frame 10 is held as it is.

When the sliding brush 16 is located on the telescopic pattern 43 including the right-hand edge portion T0, the microcomputer 55 executes a control operation similar to the initial setting control operation with respect to the item (b). In this control operation, the front group frame 10 is moved to the starting position Ts at the telescopic time.

Namely, the DC motor 33 is rotated to move the front group frame 10 in the wide angle direction. The front group frame 10 is displaced in the wide angle direction through the driving lead screw 6 and the driving lead nut 15. When the sliding brush 16 is separated from the right-hand edge portion T0 of the telescopic pattern 43, the supply of an electric current to the DC motor 33 is interrupted and the operation of the front group frame 10 is controlled such that the front group frame 10 is returned to the starting position Ts at the telescopic time.

In this case, similar to the case of the initial setting control operation with respect to the starting position Ws at the wide angle time, the rotation of the DC motor 33 is stopped in the free-running rotation torque position thereof. Further, a clearance corresponding to the above overrunning amount is caused between the stopping position of the DC motor 33 and the right-hand edge portion T0 of the telescopic pattern 43. Further, the starting position Ts at the telescopic time is set in advance to the free-running rotation torque position of the DC motor 33. Further, the front group frame 10 is stopped in this free-running rotation torque position at any time. Such an operating state is shown by a lower moving line with respect to T DRAW-OUT at the uppermost stage in FIG. 10.

At this time, the relation in optical position between the front group frame 10 and the rear group frame 20 is set as shown in FIG. 4 and is different from the optical position relation in the case of the above initial setting operation with respect to the starting position Ws at the wide angle time.

Namely, when the front group frame 10 is initially set in the starting position Ts at the telescopic time, the main lens group Lm is set in a predetermined position on the photographing optical axis O on the side of the photographed object. The sublens group Ls is set in a predetermined position on the photographing optical axis O backward from the predetermined position of the main lens group Lm. The focal length at the telescopic time is provided by this position relation between the main lens group and the sublens group.

Thus, the initial setting operation is electrically completed with respect to the front group frame 10. Further, the initial setting operation is optically completed with respect to the front group frame 10 and the rear group frame 20. Namely, a step S1 in the flow chart shown in FIG. 13 is completed.

The focusing operation at each of the focal lengths in the photographing modes will next be described as an example when the varifocal lens is set in the wide angle photographing mode.

Figure 13:
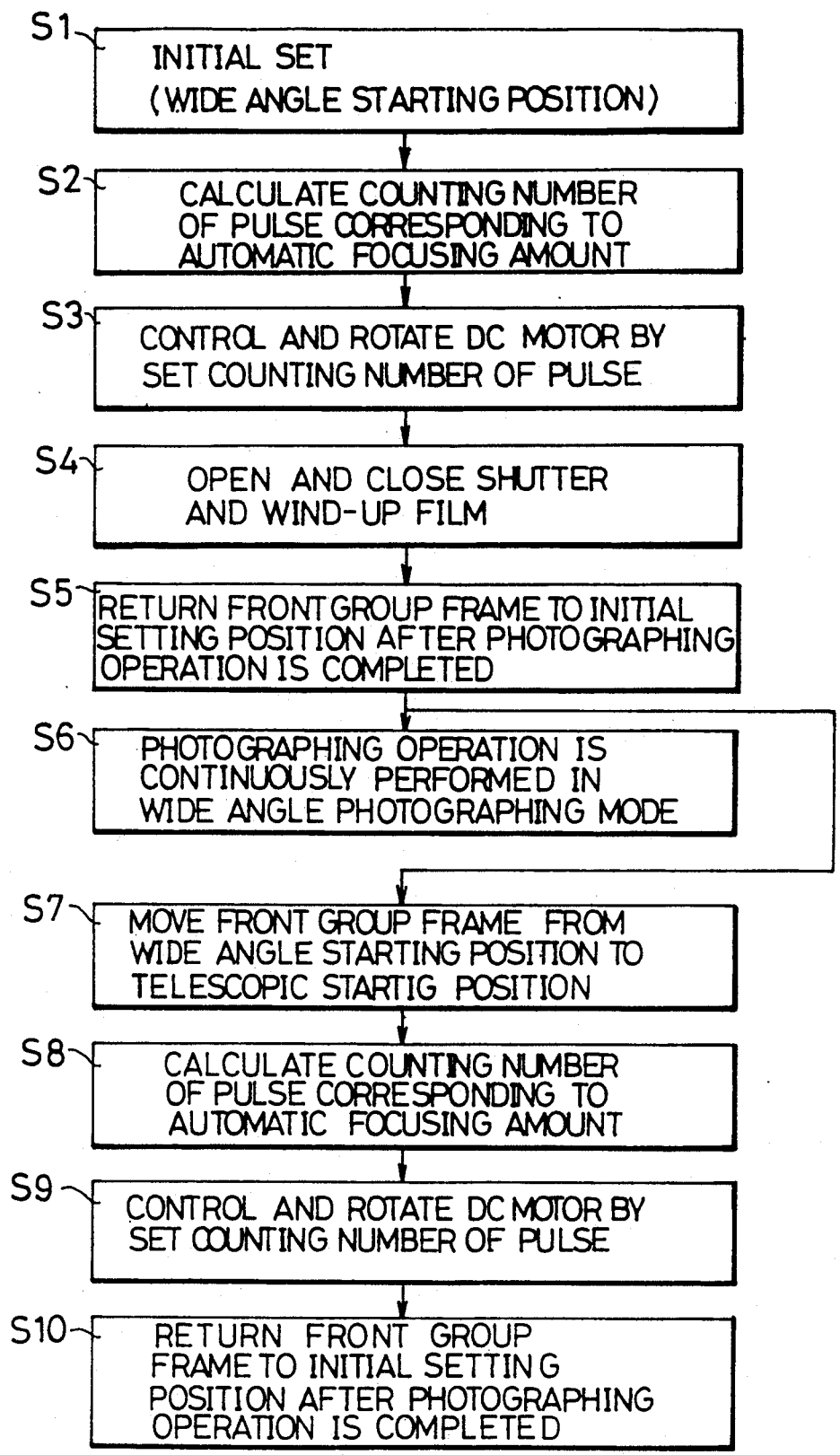
FIG. 13 is a flow chart of operations of the varifocal lens when a photographing operation is performed by switching a wide angle photographing mode to a telescopic photographing mode.

As mentioned above, in the wide angle photographing mode, the front group frame 10 is set in the starting position Ws at the wide angle time and the rear group frame 20 is located in the escaping position as shown by the step S1 in FIG. 13.

In this state, the shutter release button 52 is pushed to turn on the photometric switch 56 in association with a first stage releasing operation of the shutter release button 52. Thus, an unillustrated photometric device measures brightness of the photographed object. Further, a photographing distance at this time is outputted as automatic focusing distance information to the microcomputer 55 from the integrated circuit 53 for automatic focus in a device for measuring the photographing distance.

Then, the microcomputer 55 calculates a focusing amount of the main lens group Lm based on this automatic focusing distance information. This focusing amount of the main lens group Lm corresponds to a displacing amount of the front group frame 10. This focusing amount is temporarily stored into a memory circuit as a comparative reference value.

In this case, as mentioned above, the comparative reference value shows the number of rotations of the DC motor 33 counted from a position as a reference in which the wide angle positioning switch $SW_w$ outputs the turning-on signal. Namely, this position is a position in which the sliding brush 16 comes in contact with the left-hand edge portion W0 of the wide angle pattern 42. This operating state is shown in a step S2 in FIG. 13.

When a second stage releasing operation of the shutter release button 52 is performed in this state, the DC motor 33 is rotated by the operation of the microcomputer 55 to move the front group frame 10 in the wide angle direction through the integrated circuit 54 for driving the motor. Thus, the front group frame 10 is displaced toward the exposure aperture 2a from the starting position Ws at the wide angle time through the driving lead screw 6 and the driving lead nut 15.

At this time, the rotary encoder 32 of the digital signal generating means 36 is also rotated by the rotation of the DC motor 33. However, at this stage, no command for starting a counting operation for counting the number of rotations of the DC motor 33 is given from the microcomputer 55 to the rotary encoder 32. Accordingly, no counting operation for counting the number of rotations of the DC motor 33 is performed by the digital signal generating means 36.

When the sliding brush 16 has reached a position in which the sliding brush 16 comes in contact with the left-hand edge portion W0 of the wide angle pattern 42, the wide angle positioning switch $SW_w$ outputs a turning-on signal to the microcomputer 55. At this time, the microcomputer 55 begins to count the number of pulses from the digital signal generating means 36 as the number of rotations of the DC motor 33.

Accordingly, the microcomputer 55 compares a counting value of the digital signal generating means 36 with the above comparative reference value. When these values are in conformity with each other, the microcomputer 55 gives a command for interrupting the supply of an electric current to the DC motor 33 from the motor current-supplying circuit 60.

As a result, as shown by an upper moving line with respect to W DRAW-IN at the third stage in FIG. 10, the DC motor 33 is accurately stopped in its free-running rotation torque position as mentioned above. Thus, the sliding brush 16 and the front group frame 10 are stopped in predetermined focusing positions within a focusing region W at the wide angle time formed on the wide angle pattern 42. This state is shown in a step S3 in FIG. 13.

The rear group frame 20 is displaced toward the exposure aperture 2a by the displacing operation of the front group frame 10. At this time, the rear group frame 20 is simply displaced along the holding acting face 7b in an escaping position in which the inserting/separating pin 24 comes in press-contact with the holding acting face 7b of the cam plate member 7. Therefore, the escaping position of the rear group frame 20 is continuously maintained as it is.

As a result, the front group frame 10 and the main lens group Lm are stopped in relative positions corresponding to the automatic focusing distance information on the photographing optical axis O in a state in which the rear group frame 20 and the sublens group Ls are escaped from the photographing optical axis O.

The positioning base 40 is made of a suitable material having a low thermal expansion coefficient. Further, the distance between the film face F and a right-hand portion of the positioning base 40 is set to be small. Accordingly, the relative positions of the wide angle pattern 42 and the sliding brush 16 are accurately maintained and the accuracy in focusing operation is improved even when atmospheric temperature is changed.

Further, since only the front group frame 10 is located on the photographing optical axis O, there is practically no bad influence on image forming performance in a photographing optical system even when the front group frame 10 is inclined in the counterclockwise direction by the biasing force of the connection spring 27.

After the predetermined focusing operation has been completely performed, a normal shutter releasing operation is executed on the basis of a sequential photographing control operation of the microcomputer 55.

When a predetermined exposure operation is then completed, an opening/closing operation of a shutter and a winding-up operation of the film are performed by a known means. When the winding-up operation is completely performed, a winding-up completing signal is transmitted from the known means so that the sequential photographing operation is completed. This operating state is shown in a step S4 in FIG. 13.

When the above initial setting control operation with respect to the items (a) and (b) is constructed to be automatically executed when the winding-up completing signal of the film is transmitted, the microcomputer 55 is operated to rotate the DC motor 33 in the reverse direction when the winding-up completing signal is outputted to the microcomputer 55. Thus, the front group frame 10 stopping in the focusing position on the wide angle pattern 42 is automatically returned to the starting position Ws at the wide angle time and the sequential photographing operation is completed in this state. This state is shown in a step S5 in FIG. 13.

When the varifocal lens is constructed such that the front group frame 10 is manually returned to the starting position Ws (or Ts), the microcomputer 55 controls the operation of the front group frame 10 such that the front group frame 10 is returned to the starting position Ws at the wide angle time when the microcomputer 55 receives a manual returning signal from a manual returning switch.

When the above sequential photographing operation is completed, it is possible to stop the photographing operation as it is. However, when a user wants to take a photograph again in the wide angle photographing mode, the user pushes the shutter release button 54 again in this state.

In this case, the above-mentioned operations are repeatedly performed and the wide angle photographing operation is executed again. This state is shown in a step S6 in FIG. 13.

However, when the user wants to take a photograph by switching the varifocal lens from the wide angle photographing mode to the telescopic photographing mode, the T-W switching button 51 is switched to the telescopic photographing mode in a state in which the front group frame 10 is located in the starting position Ws at the wide angle time. In this case, when the T-W switching button 51 is switched to the telescopic photographing mode, the front group frame 10 and the rear group frame 20 are operated as follows to realize the telescopic photographing mode.

Namely, when the T-W switching button 51 is switched to the telescopic photographing mode, the microcomputer 55 controls the operation of the DC motor 33 such that the DC motor 33 is rotated to move the front group frame 10 in the telescopic direction through the motor driving integrated circuit 54.

Thus, the front group frame 10 located in the starting position Ws at the wide angle time begins to be moved in the direction of the photographed object by the actions of the driving lead screw 6 and the driving lead nut 15. The front group frame 10 is continuously moved until the sliding brush 16 exceeds the starting position Ts at the telescopic time and comes in contact with the right-hand edge portion T0 of the telescopic pattern 43.

When the sliding brush 16 comes in contact with the right-hand edge portion T0 of the telescopic pattern 43, the telescopic positioning switch $SW_t$ outputs a turning-on signal to the microcomputer 55. Thus, the microcomputer 55 controls the operation of the DC motor 33 such that the DC motor 33 is rotated in the reverse direction to move the front group frame 10 in the wide angle direction. Thus, the front group frame 10 is reversely moved toward the exposure aperture 2a.

When the front group frame 10 is moved until the sliding brush 16 is separated from the right-hand edge portion T0 of the telescopic pattern 43, the telescopic positioning switch $SW_t$ outputs a turning-off signal to the microcomputer 55. At this time, the microcomputer 55 gives a command for interrupting the supply of an electric current to the DC motor 33 from the motor current-supplying circuit 60.

When the supply of an electric current to the DC motor 33 from the motor current-supplying circuit 60 is interrupted, the rotation of the DC motor 33 is stopped in its free-running rotation torque position separated by the above overrunning amount from a rotating position of the DC motor corresponding to the right-hand edge position T0 of the telescopic pattern 43. This state is shown by a moving line with respect to W-T SWITCH at the lowermost stage in FIG. 10.

In this embodiment, as mentioned above, the starting position Ts at the telescopic time is set to the free-running rotation torque position in advance. Accordingly, the front group frame 10 is stopped in the starting position Ts at the telescopic time at any time even when the T-W switching button 51 is switched to the telescopic photographing mode.

When the front group frame 10 is moved to the starting position Ts at the telescopic time shown in FIG. 4 from the starting position Ws at the wide angle time near the exposure aperture 2a, the rear group frame 20 held in the escaping position is rotated in the counterclockwise direction by the biasing rotational force of the spiral spring 25 while the rear group frame 20 is biased and displaced by the connection spring 27 in the direction of the photographed object.

Accordingly, when the inserting/separating pin 24 is separated from the pushing-down acting face 7a of the cam plate member 7, the rear group frame 20 is rotated in the counterclockwise direction until the positioning projection 21a formed in the end portion 21 of the rear group frame 20 comes in contact with an outer circumferential face of the rotation preventing pole 5. Thus, the rear group frame 20 is located on the photographing optical axis O backward from the front group frame 10.

However, the front group frame 10 and the rear group frame 20 are further continuously moved in the direction of the photographed object irrespective of the change in position of the rear group frame 20. When the base portion 22 of the rear group frame 20 then comes in contact with an end portion of the adjusting screw 28, only the rear group frame 20 is stopped in this contact position. The front group frame 10 is further continuously moved in the direction of the photographed object. Thus, as mentioned above, the front group frame 10 is reversely moved in the position of the right-hand edge portion T0 of the telescopic pattern 43 and is then stopped in the starting position Ts at the telescopic time.

As a result, the front group frame 10 is automatically moved to the starting position Ts at the telescopic time and the rear group frame 20 is inserted onto the optical axis O backward from the front group frame 10. Thus, the main lens group Lm and the sublens group Ls are set and held in optical relative positions for providing the focal length at the telescopic time. This state is shown in a step S7 in FIG. 13.

In this state, a predetermined distance is caused between the front group frame 10 and the rear group frame 20. Accordingly, the biasing force of the connection spring 27 is naturally applied to the rear group frame 20 so that the rear group frame 20 is reliably stopped by this biasing force in a contact position between this rear group frame 20 and the adjusting screw 28.

In this state, when the first stage releasing operation of the shutter release button 52 is performed, the photometric switch 56 is turned on. Further, a photographing distance at the photographing time is outputted as automatic focusing distance information to the microcomputer 55 from the integrated circuit 53 for automatic focus. Thus, similar to the case of the wide angle time, a focusing amount of the main lens group Lm based on this automatic focusing distance information is calculated by the microcomputer 55 and is temporarily stored into a memory circuit.

In this case, similar to the case of the wide angle time, a comparative reference value is set as the number of rotations of the DC motor 33 counted from a position as a reference in which the telescopic positioning switch $SW_t$ outputs a turning-on signal. This state is shown in a step S8 in FIG. 13.

In this state, when the second stage releasing operation of the shutter release button 52 is performed, the microcomputer 55 controls the operation of the front group frame 10 such that the front group frame 10 is displaced from the starting position Ts at the telescopic time in the direction of the photographed object through the driving lead screw 6 and the driving lead nut 15. When the front group frame 10 is moved until the sliding brush 16 comes in contact with the right-hand edge portion T0 of the telescopic pattern 43, the telescopic positioning switch $SW_t$ outputs a turning-on signal to the microcomputer 55. Thus, the microcomputer 55 is operated such that the number of rotations of the DC motor 33 begins to be counted by the operation of the digital signal generating means 36.

In these sequential operation and control, the front group frame 10 is moved in a direction opposite to that at the wide angle time. Further, the sliding brush 16 is displaced on the telescopic pattern 43 from the infinite distance corresponding position T2 to the most proximate distance corresponding position T1. These sequential operation and control are completely similar to the focusing operation and control at the wide angle time except for this movement of the front group frame 10 and this displacement of the sliding brush 16. Further, similar to the case of the wide angle time, the rotation of the DC motor 33 is accurately stopped in the free-running rotation torque position.

Accordingly, in the telescopic photographing mode, the front group frame 10 and the sliding brush 16 are accurately stopped in focusing positions located within a focusing region T at the telescopic time. This state is shown by an upper moving line with respect to T DRAW-OUT at the uppermost stage in FIG. 10. The main lens group Lm and the sublens group Ls are set in relative positions on the photographing optical axis O corresponding to the automatic focusing distance information at this time. This state is shown in a step S9 in FIG. 13.

Subsequent controls of a shutter exposure operation, a shutter winding-up operation, an operation for automatically returning the front group frame 10 to the starting position Ts at the telescopic time, etc. are similar to those at the wide angle time. Further, when the front group frame 10 is manually returned to the starting position Ts, a control operation of the varifocal lens is similar to that at the wide angle time. Such a state is shown in a step S10 in FIG. 13. These control operations are omitted in the following description.

In the focusing operations at the wide angle and telescopic times, the front group frame 10 is respectively moved between the starting positions Ws, Ts and the edge portions W0, T0 of the patterns 42, 43. When no clearance in mechanical transmission of a driving system can be removed in approach runs of the front group frame 10 between the starting positions Ws, Ts and the edge portions W0, T0, it is preferable to set the respective clearances between the starting positions Ws, Ts and the edge portions W0, T0 of the patterns 42, 43 to clearances for providing approach running distances required to remove the clearance in mechanical transmission in advance.

When the telescopic photographing mode is switched to the wide angle photographing mode, the T-W switching button 51 is switched to the wide angle photographing mode in a state in which the front group frame 10 is located in the starting position Ts at the telescopic time. Such switching operation and control are opposite to the above-mentioned switching operation and control from the wide angle photographing mode to the telescopic photographing mode.

Namely, when the T-W switching button 51 is switched to the wide angle photographing mode, the microcomputer 55 is operated to rotate the DC motor 33 such that the front group frame 10 is moved in the wide angle direction. Thus, the front group frame 10 is moved toward the exposure aperture 2a from the starting position Ts at the telescopic time.

When the front group frame 10 is moved until the sliding brush 16 exceeds the starting position Ws at the wide angle time and comes in contact with the left-hand edge portion W0 of the wide angle pattern 42, the wide angle positioning switch $SW_w$ outputs a turning-on signal to the microcomputer 55. Thus, the microcomputer 55 controls the operation of the DC motor 33 such that the DC motor 33 is reversely rotated to move the front group frame 10 in the telescopic direction. Thus, the front group frame 10 is reversely moved in the direction of the photographed object.

When the front group frame 10 is moved until the sliding brush 16 is separated from the left-hand edge portion W0 of the wide angle pattern 42, the wide angle positioning switch $SW_w$ outputs a turning-off signal to the microcomputer 55. At this time, the microcomputer 55 gives a command for interrupting the supply of an electric current to the DC motor 33 from the motor current-supplying circuit 60.

When the supply of an electric current to the DC motor 33 from the motor current-supplying circuit 60 is interrupted, the rotation of the DC motor 33 is stopped in its free-running rotation torque position separated by the above overrunning amount from a rotating position of the DC motor corresponding to the left-hand edge portion W0 of the wide angle pattern 42. This state is shown by the moving line with respect to T-W SWITCH at the second stage in FIG. 10.

In this embodiment, as mentioned above, the starting position Ws at the wide angle time is set to the free-running rotation torque position in advance. Accordingly, the front group frame 10 is stopped in the starting position Ws at the wide angle time at any time even when the T-W switching button 51 is switched to the wide angle photographing mode.

As mentioned above, in this embodiment, it is possible to arbitrarily change the two photographing modes by selectively switching the T-W switching button 51 from one photographing mode to the other.

In the varifocal lens in the first embodiment mentioned above, the focusing region W at a first focal length is formed by only the main lens group Lm. This first focal length is a focal length at the wide angle time in this embodiment. The focusing region T at a second focal length is formed by both the main lens group Lm and the sublens group Ls. This second focal length is a focal length at the telescopic time in this embodiment. The focusing regions W and T are arranged in series in the direction of the optical axis O such that the starting positions Ws and Ts at the wide angle and telescopic times are located between the focusing regions W and T.

Therefore, a switching operation of the first and second focal lengths, inserting and separating operations of the sublens group Ls with respect to the photographing optical axis O, and a focusing operation at each of the focal lengths can be performed by the same driving means such as a lead screw driving system.

In the first embodiment, the most proximate distance corresponding position W1 at the wide angle time and the infinite distance corresponding position T2 at the telescopic time are set to be opposed to each other such that the two starting positions Ws and Ts are located between these corresponding positions W1 and T2. Further, the distance between the corresponding positions W1 and T2 is set to be small as much as possible within an allowable range in which a clearance in mechanical transmission can be removed. Accordingly, an operating time required to switch the wide angle and telescopic photographing modes can be reduced and set to be very short such as a time less than 0.6 seconds.

In contrast to the above case, the infinite distance corresponding position W2 at the wide angle time and the most proximate distance corresponding position T1 at the telescopic time can be set to be opposed to each other such that the two starting positions Ws and Ts are located between these corresponding positions W2 and T1. Further, the distance between the positions W2 and T1 can be set to be short. In such a case, the above effects can be similarly obtained.

In the first embodiment, the focusing operation is started from the most proximate distance corresponding position W1 in the wide angle photographing mode. In the telescopic photographing mode, the focusing operation is started from the infinite distance corresponding position T2. Accordingly, the photographing operation can be performed in accordance with the respective focal lengths in view of human engineering.

Further, in the varifocal lens in the first embodiment, a final stopping position of the DC motor can be accurately set without any dispersion therein by stabilizing the influence of cogging on the motor at any time.

In accordance with such a structure, it is possible to preferably and stably set the accuracy in stop of the rotation of the DC motor in the initial setting operation, the switching operation of the focal lengths and the focusing operation.

Further, in the varifocal lens in the first embodiment, the biasing force of the connection spring 27 is applied between the two movable lens groups composed of the front group frame 10 and the rear group frame 20. The varifocal lens is constructed such that a clearance in fitting or engagement in a motor driving means can be absorbed by the biasing force of the connection spring 27. In such a structure, the above focusing amount at each of the focal lengths can be accurately provided. Further, the variable lens groups for changing the focal lengths can be accurately stopped in restricting positions such as the position of an end portion of the adjusting screw 28 by the action of the biasing force of the connection spring 27.

Further, the varifocal lens in the first embodiment has features with respect to engaging positions of the connection spring 27 at both ends thereof. Namely, both ends of the connection spring 27 are respectively engaged with the common pole 4 and the adjusting screw 28. When there are fitting clearances between the common pole 4 and the two movable lens groups composed of the front group frame 10 and the rear group frame 20, both the two movable lens groups are inclined in the same direction by using a mutual tension action of the connection spring 27. In such a structure, it is possible to preferably maintain the image forming performance of a photographing optical system even when there are fitting clearances between the common pole 4 and the two movable lens groups.

In the first embodiment, the positioning base 40 supports a focal length detecting pattern and a focusing position detecting pattern for determining displacing positions of the movable lens groups. The focal length detecting pattern and the focusing position detecting pattern are constructed by the wide angle pattern 42, the telescopic pattern 43 and the sliding brush 16 in this embodiment. The positioning base 40 is made of a suitable material having a low thermal expansion coefficient. Further, the distance between the film face F and a right-hand end portion of the positioning base 40 is set to be small. In such a structure, it is possible to accurately set and maintain the focal length detecting pattern, the focusing position detecting pattern, and relative positions of the movable lens groups and counting reference positions at the respective focal lengths even when atmospheric temperature is changed. Further, it is possible to accurately set and maintain restricting positions of the movable lens groups for changing the focal lengths by the support end portion 45 of the positioning base 40 even when atmospheric temperature is changed.

In particular, such effects can be greatly obtained when at least the common pole 4 and the driving lead screw 6 are made of a suitable material having a low thermal expansion coefficient equal or approximate to that of the positioning base 40. In such a case, a starting position of the front group frame 10 is constantly set at any time so that the accuracy in movement of the front group frame 10 in the focusing operation can be improved.

In the above first embodiment, a means for moving the front group frame 10 is constructed by a movement transmitting means composed of the driving lead screw 6 and the driving lead nut 15.

In such a movement transmitting means, there is a clearance in engagement between the driving lead screw 6 and the driving lead nut 15 engaged with each other. Further, there is usually a backlash in a series of gears for connecting the driving gear 34 and the driven gear 31 to each other.

Accordingly, when the operation of the front group frame 10 is controlled by using the movement transmitting means causing a clearance in mechanical transmission and no means for removing the clearance is used in this control, clearances in engagement and mechanical transmission caused by the above backlash are caused so that a displacing amount of the front group frame 10 is changed and the accuracy in stopping position of the front group frame 10 is greatly reduced.

Namely, when the operation of the front group frame 10 is controlled such that the front group frame 10 is stopped in a predetermined position by stopping the rotation of the DC motor 33 at a simple stopping timing, the supply of an electric current to the DC motor 33 is interrupted when the front group frame 10 has reached the predetermined position. Therefore, as mentioned above, the rotation of the DC motor 33 is stopped after a slight time has passed from a time point at which the supply of an electric current to the DC motor is interrupted.

In this case, when a movement resistance of the front group frame 10 as a driven member is small, the front group frame 10 is continuously moved forward by its inertia after the rotation of the DC motor 33 is stopped. Thus, the front group frame 10 is straightly moved by the above clearances and backlash.

As a result, the clearance in mechanical transmission is caused by a clearance in engagement between a male thread ridge face of the driving lead screw 6 and a female thread groove face of the driving lead nut 5. Further, a clearance in mechanical transmission is also caused by the backlash between contact tooth faces of the respective gears constituting a series of connection gears.

This clearance in mechanical transmission at the stopping time of the rotation of the DC motor 33 causes a clearance in transmission of a front portion of the driven member moved forward.

In the following description, it is assumed that this clearance in transmission of the front portion is caused in the front group frame 10 moved from the starting position Ws at the wide angle time to the starting position Ts at the telescopic time to switch the focal lengths. In this case, when the DC motor 33 is rotated to move the front group frame 10 in the telescopic direction so as to perform the focusing operation at the telescopic time, a rotating amount of the DC motor 33 is first used to absorb the clearance in engagement between the driving lead screw 6 and the driving lead nut 15 and the backlash in the series of connection gears. After the driving lead screw 6 and the driving lead nut 15 have been normally engaged with each other, the driving rotational force of the DC motor 33 is transmitted to the front group frame 10 and the driving lead nut 15.

In other words, the DC motor 33 is uselessly rotated to absorb the clearance in transmission of a constructional portion backward from the DC motor when the front group frame 10 is moved from the starting position Ws at the wide angle time to the starting position Ts at the telescopic time. Further, this clearance is greatly influenced by the accuracy in manufacture of constructional members relating to the DC motor 33 so that the number of useless rotations of the DC motor 33 is unexpectedly changed and cannot be estimated.

Accordingly, in a varifocal lens in which a required moving amount of the front group frame 10 from the starting position Ws at the wide angle time to the starting position Ts at the telescopic time is set to be determined by the number of rotations of the DC motor 33 counted from the starting position Ws at the wide angle time, the number of rotations of the DC motor 33 required to provide this moving amount is reduced by the above front portion of the front group frame 10 as the driven member. The actual displacing amount of the front group frame 10 is correspondingly smaller than a normal moving amount thereof. Therefore, the accuracy in displacement of the front group frame 10 at the focusing time is greatly reduced.

Therefore, in the first embodiment, the above driving control method with respect to the items (c) and (b) and a driving control method similar thereto are used to prevent the reduction of the accuracy in displacement of the front group frame 10 at the focusing time when the front group frame 10 is moved from one starting position to the other and the focusing operation is performed after this movement.

However, when the movement resistance of the driven member is large, the clearance in mechanical transmission is caused backward from the driven member. Accordingly, it is necessary to take a measure for preventing the reduction of the accuracy in displacement of the driven member.

As mentioned above, after the supply of an electric current to the DC motor 33 is interrupted, the DC motor 33 is rotated by only its inertia. Accordingly, when the movement resistance of the driven member is large, the inertial rotation of the DC motor 33 is restricted by braking force of the driven member when the supply of an electric current to the DC motor 33 is interrupted. Therefore, a clearance in mechanical transmission is caused between the driven member and the DC motor 33 backward from the driven member by the above clearance in engagement and the above-mentioned backlash.

In the following description, it is assumed that such a clearance in mechanical transmission is caused in the front group frame 10 initially set in the starting position Ws at the wide angle time. In this case, when the DC motor 33 is rotated to move the front group frame 10 in the wide angle direction in the next wide angle photographing operation, a rotating amount of the DC motor 33 is first used to absorb the clearance in engagement between the driving lead screw 6 and the driving lead nut 15 and the backlash in the series of connection gears. Therefore, the rotating amount of the DC motor 33 is similar to that in the above case of the switching operation of the focal lengths. After the driving lead screw 6 and the driving lead nut 15 have been normally engaged with each other, the driving rotational force of the DC motor 33 is transmitted to the front group frame 10.

In other words, similar to the above-mentioned case, the DC motor 33 is uselessly rotated to absorb the clearance in mechanical transmission backward from the DC motor 33. Further, the number of useless rotations of the DC motor 33 is unexpectedly changed and cannot be estimated.

Further, such a clearance in mechanical transmission and the above clearance in transmission of the front portion of the driven member are greatly caused when the accuracy in stopping position of the DC motor 33 is improved.

In the varifocal lens in which the focusing amount of the front group frame 10 is set to be determined by the number of rotations of the DC motor 33 counted from the starting position Ws at the wide angle time, the number of rotations of the DC motor 33 required to provide this focusing amount is reduced by the number of useless rotations for absorbing the above clearance in transmission backward from the DC motor. The actual displacing amount of the front group frame 10 is correspondingly smaller than a normal focusing amount. Namely, the accuracy in displacement of the front group frame 10 at the focusing time is greatly reduced.

A varifocal lens in a second embodiment of the present invention has the following features for solving the above problems. Namely, the front group frame 10 can be stopped at a stopping timing at which the clearance in mechanical transmission can be removed when the front group frame 10 is moved and stopped in the predetermined starting position Ws or Ts from a focusing position on each of the patterns 42 and 43. The front group frame 10 can be also stopped at a stopping timing at which the clearance in mechanical transmission can be removed when the front group frame 10 is moved to one of the starting positions Ws and Ts in the switching operation of the focal lengths.

As mentioned above, the front group frame 10 begins to be displaced or moved in one of the starting positions Ws and Ts in the focusing operation and the switching operation of the focal lengths. Accordingly, it is necessary to first remove the clearance in mechanical transmission from a position of the front group frame 10 at the completing time of the focusing operation until the front group frame 10 is returned to the predetermined starting position Ws or Ts.

Therefore, in the varifocal lens in the second embodiment, driving controls of an initial setting operation for initially setting the front group frame 10 to each of the starting positions Ws and Ts and a switching operation of the focal lengths can be executed by the operation of the microcomputer 55 in a control method shown by the following items (e) to (g).

A driving control method for initially setting the front group frame 10 from the wide angle pattern 42 to the starting position Ws at the wide angle time will first be described as an example.

(e) When the sliding brush 16 is located in the starting position Ws at the wide angle time, the operation of the varifocal lens is controlled in the same method as the above control method with respect to the item (a). Namely, the operation of the varifocal lens is controlled such that no DC motor 33 is rotated even when a turning-on signal of the power switch on the camera side is inputted to the microcomputer 55.

Figure 14:
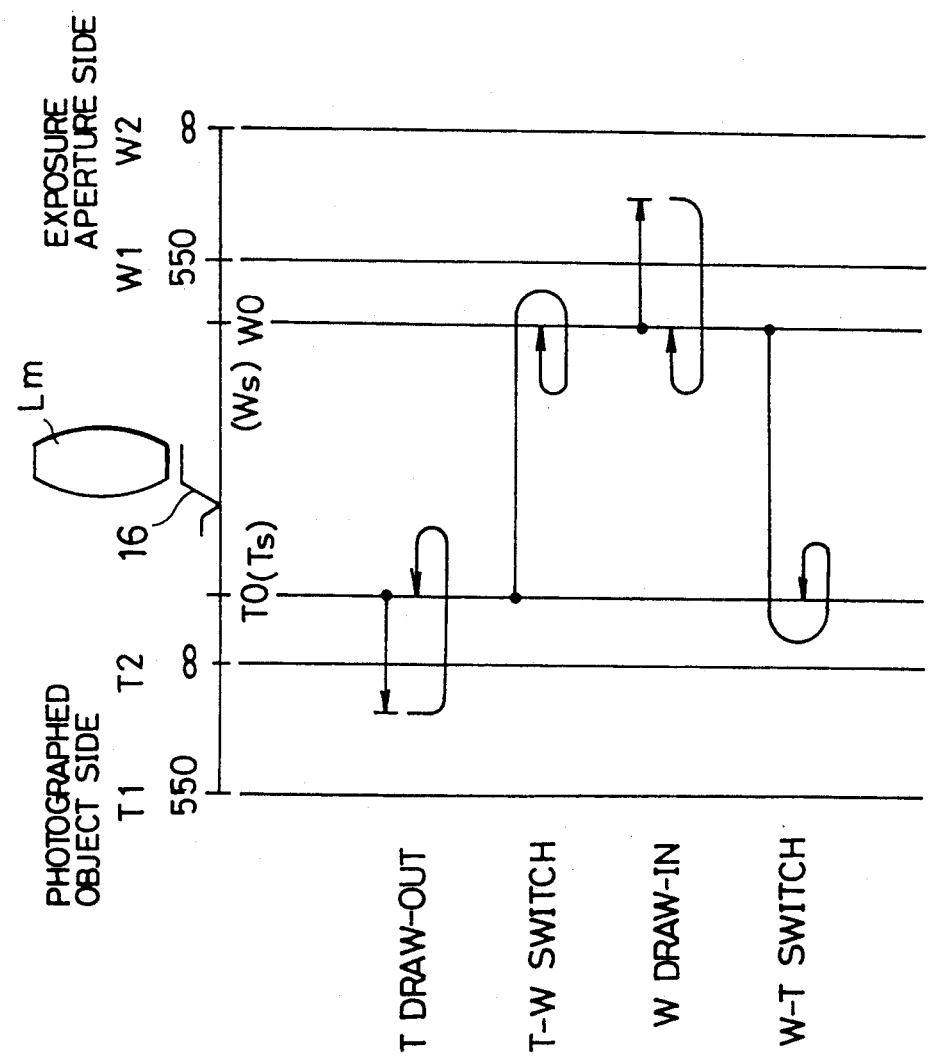
FIG. 14 is an explanatory view showing another example of the wide angle and telescopic switching controls in a varifocal lens in a second embodiment of the present invention.

(f) When the sliding brush 16 is located in a position at the completing time of the focusing operation on the wide angle pattern 42 including a left-hand edge portion W0 in FIG. 14, the DC motor 33 is rotated by the operation of the microcomputer 55 to move the front group frame 10 in the telescopic direction based on the turning-on signal of the power switch on the camera side. Thus, the sliding brush 16 is displaced from the above position at the focusing completing time to the starting position Ws at the wide angle time.

After the sliding brush 16 passes through the starting position Ws, the microcomputer 55 controls the operation of the DC motor 33 such that the DC motor 33 is reversely rotated to move the front group frame 10 in the wide angle direction. Further, the microcomputer 55 controls the operation of the DC motor 33 such that the supply of an electric current to the DC motor 33 is interrupted when the DC motor 33 is rotated by a predetermined number after the reverse rotation of the DC motor 33 is started.

In this case, a reverse driving timing of the DC motor 33 and the predetermined number of rotations thereof are set in advance such that a final stopping position of the DC motor 33 and the starting position Ws at the wide angle time are in conformity with each other. This final stopping position of the DC motor 33 is set in consideration of the above overrunning amount.

The reverse driving timing of the DC motor 33 is determined by the number of rotations thereof counted when the sliding brush 16 is separated from the left-hand edge portion W0 of the wide angle pattern 42 and a turning-off signal is outputted from the wide angle positioning switch $SW_w$. The predetermined number of rotations of the DC motor 33 is a number of rotations capable of absorbing a clearance in reverse transmission between the driving lead screw 6 and the driving lead nut 15 caused by the reverse rotation of the DC motor 33. The reverse driving timing of the DC motor 33 and the predetermined number of rotations thereof relate to a lower moving line with respect to W DRAW-IN at a third stage from an uppermost position in FIG. 14.

When the previous photographing operation is performed in the telescopic photographing mode and the front group frame 10 is initially set to the starting position Ts at the telescopic time by using the turning-on signal of the power switch on the camera side, the microcomputer 55 controls the operation of the DC motor 33 in a control method similar to that of the initial setting operation with respect to the above items (e) and (f). This control state is shown by a lower moving line with respect to T DRAW-OUT at an uppermost stage in FIG. 14.

Namely, in this control method, in the control operation with respect to the items (e) and (f), "the starting position Ws at the wide angle time" is changed to "the starting position Ts at the telescopic time". "The wide angle pattern 42" is changed to "the telescopic pattern 43". "The left-hand edge portion WO" is changed to "the right-hand edge portion T0". "The telescopic direction " is changed to "the wide angle direction". Further, "the wide angle positioning switch $SW_w$" is changed to "the telescopic positioning switch $SW_t$". The initial setting operation is controlled in accordance with these changes.

The operation of the varifocal lens is controlled on the basis of a control method similar to that in the first embodiment when the front group frame 10 is initially set to one of the starting positions Ws and Ts from a completing position of the previous photographing operation by using a winding-up completing signal transmitted at a completing time of the winding-up operation of a film on the camera side. The operation of the varifocal lens is also controlled on the basis of a control method similar to that in the first embodiment when the front group frame 10 is initially set manually to one of the starting positions Ws and Ts from the completing position of the previous photographing operation.

One example of a basic control method of a switching operation of the focal lengths in the second embodiment will next be described when the wide angle photographing mode is switched to the telescopic photographing mode.

(g) The microcomputer 55 controls the operation of the DC motor 33 such that the DC motor 33 is rotated to move the front group frame 10 in the telescopic direction based on a switching signal transmitted when the wide angle photographing mode is switched to the telescopic photographing mode.

While the front group frame 10 is moved from the starting position Ws at the wide angle time in the direction of the photographed object, the sliding brush 16 once exceeds the starting position Ts at the telescopic time and reaches the right-hand edge portion TO of the telescopic pattern 43. When the telescopic positioning switch $SW_t$ outputs a turning-on signal, the DC motor 33 is reversely rotated to move the front group frame 10 in the wide angle direction.

Further, when the sliding brush 16 passes through the starting position Ts at the telescopic time from the photographed object side, the DC motor 33 is reversely rotated again to move the front group frame 10 in the telescopic direction. Then, the supply of an electric current to the DC motor 33 is interrupted when the DC motor 33 has been rotated by a predetermined number after the second reverse rotation of the DC motor 33 is started.

In this case, the reverse driving timing of the DC motor 33 and the predetermined number of rotations thereof are set in advance such that the final stopping position of the DC motor 33 is in conformity with the starting position Ts at the telescopic time. This final stopping position of the DC motor 33 is set in consideration of the above overrunning amount.

The reverse driving timing of the DC motor 33 is determined by the number of rotations thereof counted when the sliding brush 16 is separated from the right-hand edge portion TO of the telescopic pattern 43 and a turning-off signal is outputted from the telescopic positioning switch $SW_t$. The predetermined number of rotations of the DC motor 33 is a number of rotations capable of absorbing the clearance in reverse transmission between the driving lead screw 6 and the driving lead nut 15 caused by the reverse rotation of the DC motor 33. The reverse driving timing of the DC motor 33 and the predetermined number of rotations thereof relate to a moving line with respect to W-T SWITCH at a lowermost stage in FIG. 14.

When the telescopic photographing mode is switched to the wide angle photographing mode, the rotation of the DC motor 33 is controlled by the microcomputer 55 in a control method reverse to that with respect to the above item (g). This control state is shown by a moving line with respect to T-W SWITCH at a second stage in FIG. 14.

Namely, similar to the case of the control method at the time of the initial setting operation, in the control method with respect to the item (g), "the starting position Ws at the wide angle time" is changed to "the starting position Ts at the telescopic time". "The wide angle pattern 42" is changed to "the telescopic pattern 43". "The left-hand edge portion WO" is changed to "the right-hand edge portion TO". "The telescopic direction" is changed to "the wide angle direction". "The direction of the photographed object" is changed to "the side of the exposure aperture 2a". Further, "the wide angle positioning switch $SW_w$" is changed to "the telescopic positioning switch $SW_t$". The above control operation is performed in accordance with these changes.

Finally, the driving control of a focusing operation at each of the focal lengths in the second embodiment will briefly be described.

In the second embodiment, the clearance in mechanical transmission in a focusing direction of the front group frame 10 is already removed in each of the starting positions Ws and Ts. Accordingly, each of the starting positions Ws and Ts may be set to be in conformity with the counting reference position TO of each of the positioning switches $SW_w$ and $SW_t$.

Accordingly, the focusing amount of the front group frame 10 at each of the focal lengths can be set as the number of rotations of the DC motor 33 counted from each of the starting positions Ws and Ts. Such a structure constitutes one of the features of the varifocal lens in the second embodiment. The front group frame 10 is moved along the moving lines shown in FIG. 14 in a control method of the operation of the varifocal lens in the second embodiment.

The operation of the varifocal lens in the second embodiment constructed above will next be described. A flow chart of operations of the varifocal lens in the second embodiment is similar to that in the first embodiment shown in FIG. 13.

An initial setting operation for initially setting the front group frame 10 to the starting position Ws at the wide angle time will first be described as an example. The starting position Ws is equal to the position WO in the following description.

When a power switch of the varifocal lens, etc. is turned on in a completing state of the previous photographing operation, the microcomputer 55 controls the operation of the DC motor 33 based on the above control method of the initial setting operation with respect to the items (e) and (f).

Namely, when the front group frame 10 and the sliding brush 16 are located in the starting position Ws at the wide angle time, the microcomputer 55 controls the rotation of the DC motor 33 such that no DC motor 33 is rotated. When the sliding brush 16 is located on the wide angle pattern 42, the microcomputer 55 controls the rotation of the DC motor 33 such that the front group frame 10 is first moved in the direction of a photographed object.

Therefore, when the sliding brush 16 is located on the wide angle pattern 42, the front group frame 10 begins to be moved in the direction of the photographed object. When the front group frame 10 passes through the starting position Ws at the wide angle time and is then moved until a position separated by a predetermined distance from the starting position Ws, the microcomputer 55 controls the operation of the DC motor 33 such that the DC motor 33 is reversely rotated to move the front group frame 10 in the wide angle direction. Thus, the front group frame 10 is again moved from the photographed object side toward the starting position Ws at the wide angle time.

The microcomputer 55 controls the operation of the DC motor 33 such that the supply of an electric current to the DC motor 33 is interrupted when the DC motor 33 has been rotated by a predetermined number after the reverse rotation of the DC motor 33 is started. Accordingly, the front group frame 10 is moved as shown by a lower moving line with respect to W DRAW-IN at a third stage in FIG. 14 and is stopped in the starting position Ws at the wide angle time.

In this case, the driving lead screw 6 comes in close contact with the driving lead nut 15. Therefore, the above-mentioned clearance in mechanical transmission is caused backward from the front group frame 10 in a moving direction thereof on the side of the telescopic pattern 43.

At this time, the reverse driving timing of the DC motor 33 and the predetermined number of rotations thereof are set in the control method with respect to the item (f) in advance. Further, the rear group frame 20 is simultaneously moved together with an operation for returning the front group frame 10 to the starting position Ws at the wide angle time. This movement of the rear group frame 20 is similar to that in the first embodiment and an explanation about this movement is therefore omitted in the following description.

When the front group frame 10 is initially set in the starting position Ts at the telescopic time, the microcomputer 55 controls the operation of the DC motor 33 based on a control method similar to that with respect to the above items (e) and (f).

Namely, similar to the case of the initial setting operation for initially setting the front group frame 10 to the starting position Ws at the wide angle time, the front group frame 10 is returned to the starting position Ts at the telescopic time when the sliding brush 16 is located on the telescopic pattern 43. This returning state is shown by a lower moving line with respect to T DRAW-OUT at an uppermost stage in FIG. 14. In this case, a clearance in mechanical transmission is also caused between the driving lead screw 6 and the driving lead nut 15 backward from the front group frame 10 in the movement direction thereof on the side of the wide angle pattern 43.

As mentioned above, in the second embodiment, the front group frame 10 is initially set to the respective starting positions Ws and Ts in a state in which there is no clearance in mechanical transmission between the driving lead screw 6 and the driving lead nut 15 even when the sliding brush 16 is located in any completing position of the previous photographing operation. Thus, similar to the first embodiment, the step S1 shown in FIG. 13 is completed.

Similarly, the front group frame 10 is initially set to the starting position Ws or Ts from the completing position of the previous photographing operation by using a manual operation and a winding-up completing signal transmitted when the winding-up operation of the film on the camera side has been completed. The focusing operation in the wide angle photographing mode is performed in such an operating state.

In the second embodiment, the clearance in mechanical transmission between the driving lead screw 6 and the driving lead nut 15 is removed at the wide angle and telescopic times.

Accordingly, when the DC motor 33 is rotated to move the front group frame 10 in the respective focusing directions, the driving rotational force of the DC motor 33 is instantly transmitted to the driving lead nut 15. Thus, the front group frame 10 is moved on the telescopic pattern 43 in accordance with the preset number of rotations of the DC motor 33.

The front group frame 10 is similarly moved even when the focusing amount of the front group frame 10 at each of the focal lengths is set as the number of rotations of the DC motor 33 using a turning-on signal of each of the positioning switches $SW_w$ and $SW_t$ as in the first embodiment. Further, the front group frame 10 is similarly moved even when the focusing amount of the front group frame 10 at each of the focal lengths is set as the number of rotations of the DC motor 33 counted from each of the starting positions Ws and Ts.

Accordingly, the counting value of a digital signal provided by the digital signal generating means 36 becomes more accurate even when the above focusing amount is set as the number of rotations of the DC motor 33 counted from the starting position Ws at the wide angle time. As a result, the front group frame 10 is displaced and stopped in a position corresponding to the focusing amount at the wide angle time.

Namely, the sliding brush 16 and the front group frame 10 are moved as shown by an upper moving line with respect to W DRAW-IN at the third stage in FIG. 14. Then, the sliding brush 16 and the front group frame 10 are stopped in predetermined focusing positions within the focusing region W at the wide angle time with high accuracy. This state is shown in the steps S2 and S3 in FIG. 13.

After the focusing operation is thus completely performed, the releasing operation of a shutter is performed. This releasing operation is similar to that in the first embodiment and an explanation thereof is therefore omitted in the following description.

Similar to the first embodiment, when the photographing operation is performed in the telescopic photographing mode, the T-W switching button 51 is switched from the wide angle photographing mode to the telescopic photographing mode.

When this switching operation of the T-W switching button 51 is performed, the microcomputer 55 executes the above driving control with respect to the item (g). Thus, the front group frame 10 located in the starting position Ws at the wide angle time is moved to the starting position Ts at the telescopic time.

When the front group frame 10 is moved from the starting position Ws at the wide angle time in the direction of the photographed object, the sliding brush 16 once exceeds the starting position Ts at the telescopic time and is then moved to the right-hand edge portion TO of the telescopic pattern 43. Then, the telescopic positioning switch $SW_t$ outputs a turning-on signal to the microcomputer 55. At this time, the microcomputer 55 controls the operation of the DC motor 33 such that the DC motor 33 is reversely rotated to move the front group frame 10 in the wide angle direction.

Therefore, the sliding brush 16 is reversely moved toward the exposure aperture 2a from a position slightly exceeding the righthand edge portion TO of the telescopic pattern 43. Thereafter, the sliding brush 16 again passes through the starting position Ts at the telescopic time.

When the front group frame 10 has passed through the starting position Ts, the microcomputer 55 controls the operation of the DC motor 33 such that the DC motor 33 is again rotated at a predetermined reverse driving timing to move the front group frame 10 in the telescopic direction. Thus, the front group frame 10 is moved toward the starting position Ts at the telescopic time. The supply of an electric current to the DC motor 33 is interrupted when the DC motor 33 has been rotated by a predetermined number after this second reverse rotation of the DC motor 33 is started.

As a result, the front group frame 10 is moved as shown by a moving line with respect to W-T SWITCH at a lowermost stage in FIG. 14 and is stopped in the starting position Ts at the telescopic time. This state is shown in the step S7 in FIG. 13.

After the switching operation of the telescopic photographing mode is performed as mentioned above, the focusing operation at the telescopic time is performed. In this case, as mentioned above, the focusing operation in the second embodiment is basically similar to that in the first embodiment at the wide angle and telescopic times. Accordingly, in the focusing operation in the telescopic photographing mode, the front group frame 10 is moved as shown by an upper moving line with respect to T DRAW-OUT at the uppermost stage in FIG. 14. Then, the front group frame 10 is stopped in a predetermined focusing position within the focusing region T at the telescopic time with high accuracy. This state is shown in the steps S8 and S9 in FIG. 13.

When the telescopic photographing mode is switched to the wide angle photographing mode, the varifocal lens is operated in a control method reverse to that with respect to the above item (g).

As mentioned above, in the varifocal lens in the second embodiment, the focusing region W at a first focal length is provided by only the main lens group Lm. The focusing region T at a second focal length is provided by two lens groups of the main lens group Lm and the sublens group Ls. The focusing regions W and T are set to be arranged in series with each other in the direction of the optical axis O such that the focusing starting positions Ws and Ts at the wide angle and telescopic times are located between the focusing regions W and T. The switching operation of the first and second focal lengths, inserting and separating operations of the sublens group Ls from the photographing optical axis O, and the focusing operation at each of the first and second focal lengths are performed by a motor driving means of a common lead screw driving system. The main lens group Lm (concretely, the front group frame 10) is moved and stopped in the starting positions Ws and Ts at the first and second focal lengths by rotating a drive motor to move the front group frame 10 in the focusing direction. Thus, it is possible to reliably remove a clearance in mechanical transmission caused between the driving lead screw 6 and the driving lead nut 15 in the respective starting positions Ws and Ts.

Accordingly, it is possible to accurately set a displacing amount of the main lens group Lm in the direction of the optical axis. Namely, a focusing amount of the main lens group Lm at each of the focal lengths can be accurately provided.

Similar to the first embodiment, in the second embodiment, the distance between the most proximate distance corresponding position W1 at the wide angle time and the infinite distance corresponding position T2 at the telescopic time is set to be short. Accordingly, it is possible to reduce an operating time required to switch the wide angle and telescopic photographing modes.

In addition to the above effects, the effects obtained in the first embodiment can be also obtained.

When the initial setting operation at a starting time of the photographing operation, the switching operation of the focal lengths and the focusing operation at each of the focal lengths are performed by one drive motor and one lead screw driving means, it is advantageous to move the front group frame 10 at a high speed so as to improve a photographing speed at the times of the initial setting operation and the switching operation of the focal lengths. In the focusing operation at each of the focal lengths, it is very advantageous to move the front group frame 10 at a low speed so as to improve the accuracy in stopping position of the front group frame 10.

A varifocal lens in a third embodiment of the present invention is constructed in consideration of such viewpoints and is shown in FIGS. 15 to 18.

In the varifocal lens shown in FIGS. 15 to 18, a transmission gear means such as a reduction gear means 70 is arranged between a drive motor and a lead screw driving means. The front group frame 10 is moved at a high speed by switching gear ratios of the transmission gear means at the times of the initial setting operation and the switching operation of the focal lengths. The front group frame 10 is accurately moved at a low speed by switching the gear ratios of the transmission gear means at the time of the focusing operation at each of the focal lengths.

In this third embodiment, optical constructional members of the main lens group Lm and the sublens group Ls, many mechanical and electrical constructional members 1 to 60, $SW_w$, $SW_t$ are commonly constructed by those in the above first embodiment. Accordingly, only constructional members and structures used in the third embodiment will next be described in the following description.

Figure 15:
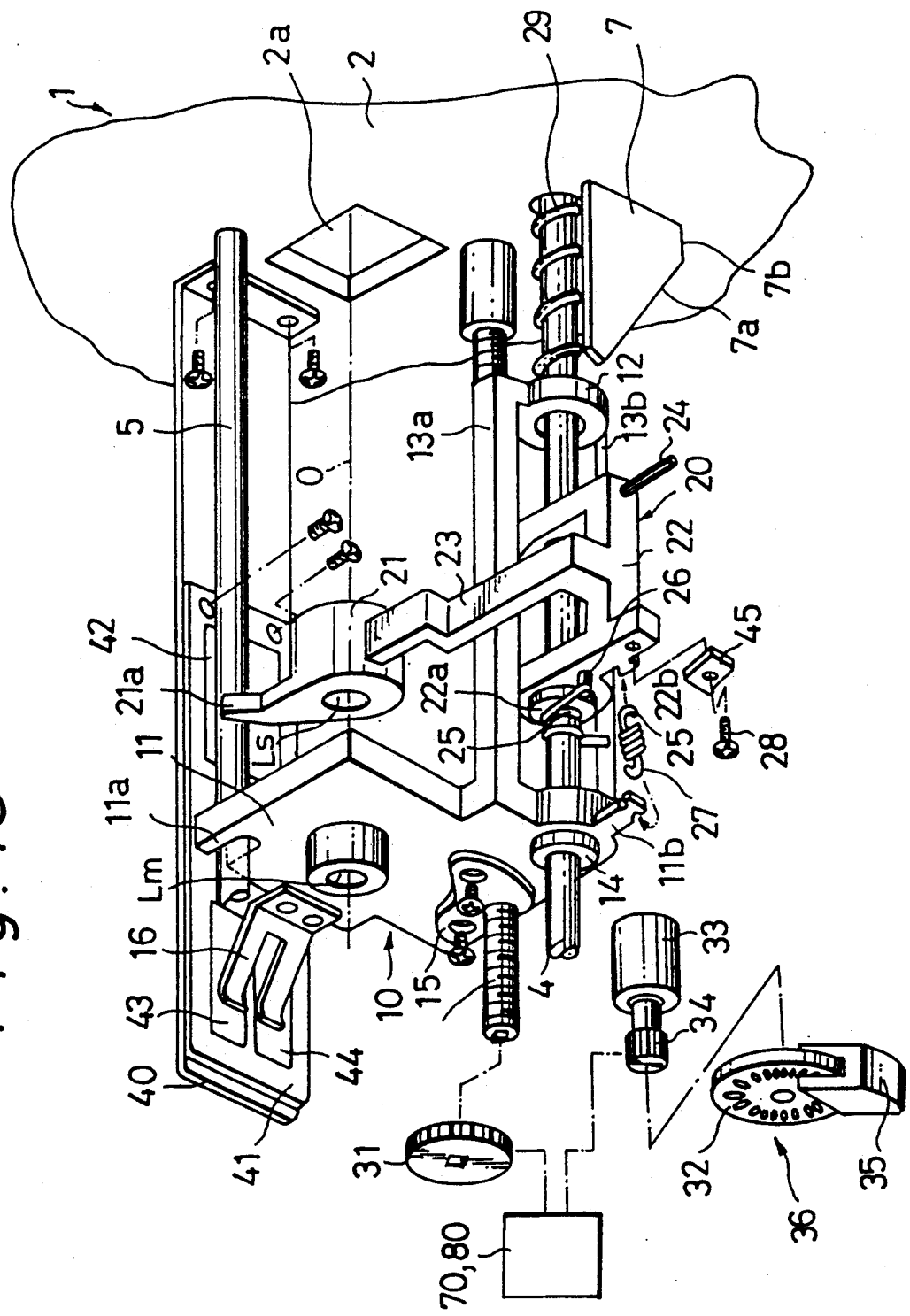
FIG. 15 is an exploded perspective view of a varifocal lens having a reduction gear means between a DC motor and a driving lead screw means at a telescopic photographing time in a third embodiment of the present invention.
Figure 16:
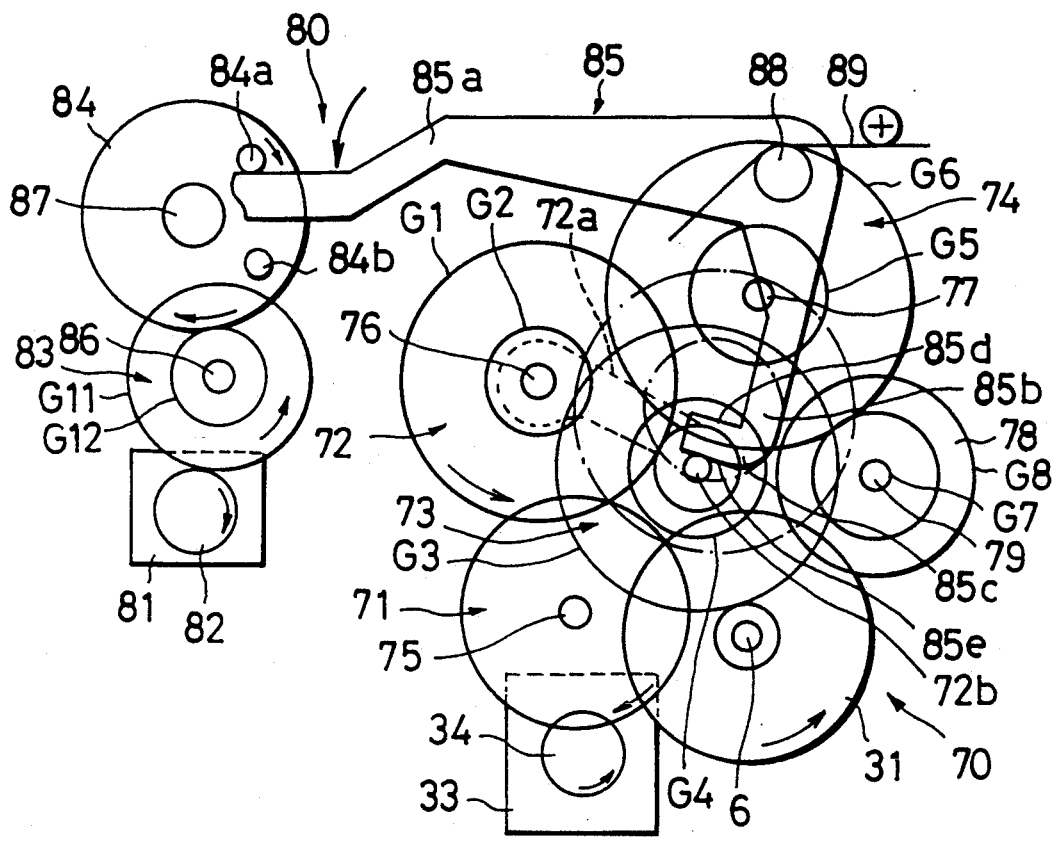
FIG. 16 is a partial schematic plan view showing the reduction gear means arranged between the DC motor and the driving lead screw means and a reduction ratio changing means for changing reduction gear ratios of the reduction gear means.

In FIGS. 15 and 16, the reduction gear means 70 is arranged between a driving gear 34 of a DC motor 33 and a driven gear 31 attached to a left-hand end portion of a driving lead screw 6. This reduction gear means 70 is constructed by a former gear series composed of an idle gear 71, a sun gear 72 and a planetary gear 73, and a latter gear series including a connection gear 74 and selectively engaged with the former gear series by a reciprocating swinging movement of the planetary gear 73.

The idle gear 71 is rotatably supported by a shaft 75 and is engaged with the driving gear 34 of the DC motor 33 at any time. The sun gear 72 is composed of large and small gears G1 and G2 and is rotatably supported by a shaft 76. The large gear G1 of the sun gear 72 is engaged with the idle gear 71 at any time. A planetary lever 72a for rotating the planetary gear 73 around the sun gear 72 is rotatably supported by the shaft 76 of the sun gear 72. The planetary gear 73 is composed of large and small gears G3 and G4 and is rotatably supported by a shaft 72b disposed in an end portion of the planetary lever 72a of the sun gear 72.

The large gear G3 of the planetary gear 73 is engaged with the small gear G2 of the sun gear 72 at any time. The large gear G3 is rotated around the small gear G2 of the sun gear 72 when the sun gear 72 is rotated in normal and reverse directions. When the large gear G3 is rotated around the small gear G2, the small gear G4 is swingingly moved between the driven gear 31 and the connection gear 74 so that the small gear G4 can be selectively engaged with the gears 31 and 74.

Engaging positions of the small gear G4 selectively engaged with the driven gear 31 and the connection gear 74 are respectively determined by two unillustrated stoppers for restricting a swinging angle of the planetary lever 72a. The connection gear 74 is constructed by small and large gears G5 and G6 rotatably supported by a shaft 77. The small gear G5 is selectively engaged with the small gear G4 of the planetary gear 73.

An intermediate gear 78 is rotatably disposed by a shaft 79 thereof within the latter gear series. The intermediate gear 78 has small and large gears G7 and G8 respectively engaged with the large gear G6 of the connection gear 74 and the driven gear 31 at any time.

At the times of the initial setting operation and the switching operation of the focal lengths, the small gear G4 of the planetary gear 73 is selectively engaged with the small gear G5 of the connection gear 74 in the reduction gear means 70 so as to provide a reduction ratio for moving the driving lead screw 6 at a high speed. For example, this reduction ratio can be set to 1/5.5. In the focusing operation at each of the focal lengths, the small gear G4 of the planetary gear 73 is directly engaged with the driven gear 31 so as to provide a reduction gear for moving the driving lead screw 6 at a low speed. For example, this reduction gear can be set to 1/20.

A reduction ratio changing means 80 performs the above selective switching operation of the planetary gear 73. The reduction ratio changing means 80 is constructed by a step motor 81 for moving a shutter, a motor gear 82 for moving the shutter, an intermediate gear 83, a switching gear 84, an engaging/releasing lever 85 and a suitable unillustrated circuit for supplying an electric current to the step motor.

The step motor 81 for moving the shutter is used in the switching operation of the planetary gear 73 since a camera for attaching the varifocal lens 1 shown in FIG. 15 thereto is provided with an unillustrated shutter device in which a shutter blade is opened and closed by a reciprocating rotation of the step motor 81.

In this case, the shutter blade is opened and closed by the shutter device within the range of a rotational angle of the switching gear 84 about 200 degrees. The switching operation of the planetary gear 73 is performed by the shutter device within the remaining range of a rotational angle of the switching gear 84 about 160 degrees.

The motor gear 82 for moving the shutter is fixed to an output shaft of the step motor 81 and is rotated in normal and reverse directions. The intermediate gear 83 is composed of large and small gears G11 and G12 rotatably supported by a shaft 86. The large gear G11 is engaged with the motor gear 82 for moving the shutter at any time.

The switching gear 84 is rotatably supported by a shaft 87 and is engaged with the small gear G12 of the intermediate gear 83 at any time. The switching gear 84 has two operating pins 84a and 84b on an upper face thereof. A predetermined operating angle of the switching gear 84 is set by these two operating pins 84a and 84b. The engaging/releasing lever 85 is rotatably supported by a shaft 88 and is biased by a spiral spring 89 in the clockwise direction.

Two arm portions 85a and 85b are disposed in this engaging/releasing lever 85. An end portion of the arm portion 85a is inserted between the above two operating pins 84a and 84b. An end portion of the arm portion 85b is formed as a bent portion 85c having an inner engaging face 85d and an outer engaging face 85e.

In the reciprocating rotation of the switching gear 84, the engaging/releasing lever 85 is swung by actions of the two operating pins 84a and 84b through the arm portion 85a. At the end of this swinging movement of the engaging/releasing lever 85, the inner engaging face 85d and the outer engaging face 85e of the bent portion 85c selectively come in press-contact with an outer circumferential face of a planetary support shaft 72b of the planetary gear 73. Thus, the above planetary lever 72a can be respectively stopped in an engaging position between the planetary gear 73 and the connection gear 74 and an engaging position between the planetary gear 73 and the driven gear 31.

Figure 17:
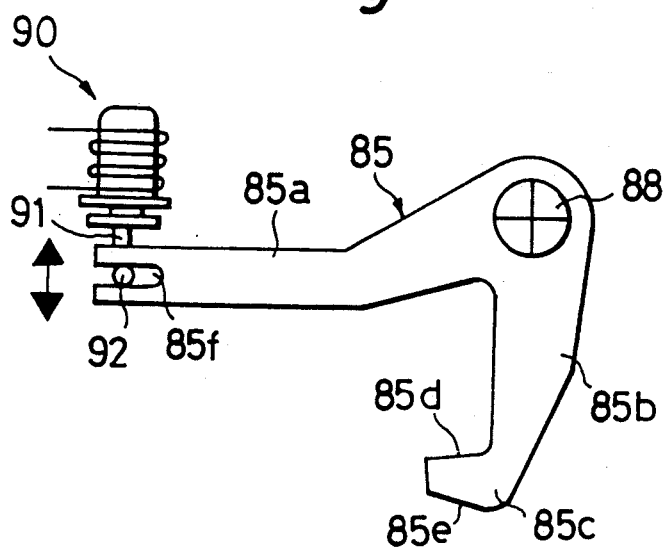
FIG. 17 is a partial schematic plan view showing another modified example of this reduction ratio changing means.

FIG. 17 shows a varifocal lens in a modified embodiment of the present invention. In this embodiment, an operation of the reciprocating rotation of the engaging/releasing lever 85 is performed by a reciprocating displacement of a plunger means 90 of an electromagnetic operating type. An engaging groove 85f is formed at an end of the arm portion 85a of the engaging/releasing lever 85. An operating pin 92 is formed in an armature rod 91 of the plunger means 90 of an electromagnetic operating type and is fitted into this engaging groove 85f and is engaged therewith.

The engaging/releasing lever 85 is swung through the operating pin 92 and the engaging groove 85f by projecting and pulling the armature rod 92 when an electric current is supplied to the plunger means 90 of an electromagnetic operating type and no electric current is supplied thereto.

A control operation for changing the reduction ratios of the reduction gear means 70 constructed above is performed as follows.

The reduction ratio changing control operation from a low speed control time to a high speed control time will first be described.

This reduction ratio changing control operation is performed by using commands from the microcomputer 55. For example, the commands from the microcomputer 55 include a command for moving the front group frame 10 from one starting position to the other by using the T-W switching button 51. Further, the commands from the microcomputer 55 include a command for initially setting the front group frame 10 to one of the starting positions Ws and Ts. This command for initially setting the front group frame 10 includes a command provided by a winding-up completing signal for automatically returning the front group frame 10 to a starting position thereof.

The reduction ratio changing control operation is performed by cooperation of a mechanical switching control operation for swinging the engaging/releasing lever 85, and an electrical switching control operation for supplying an electric current to the DC motor 33 and interrupting this supply of an electric current while this mechanical switching control operation is performed. The reduction ratio changing control operation is executed before an electric current is supplied to the DC motor 33 to move the front group frame 10.

In the reduction ratio changing control, when the microcomputer 55 gives a command for changing the gear ratios of the reduction gear means 70 from a reduction ratio at the low speed control time to a reduction ratio at the high speed control time, the above circuit for supplying an electric current to the step motor is operated to rotate the step motor 81 for moving the shutter in the clockwise direction. Rotational force of the step motor 81 is transmitted to the switching gear 84 through the motor gear 82 for moving the shutter and the intermediate gear 83. Thus, the switching gear 84 is rotated in the clockwise direction.

Accordingly, the operating pin 84a of the switching pin 84 pushes the arm portion 85a of the engaging-/releasing lever 85 downward in FIG. 16. Thus, the engaging/releasing lever 85 is rotated in the counterclockwise direction against biasing force of the spiral spring 89. When the engaging/releasing lever 85 is rotated in the counterclockwise direction, the outer engaging face 85e of the bent portion 85c formed in the arm portion 85b is moved in a direction in which the outer engaging face 85e is separated from an outer circumferential face of the planetary support shaft 72b of the planetary gear 73. Thus, the outer engaging face 85e is disengaged from the planetary support shaft 72.

In this state, when the rotation of the step motor 81 for moving the shutter is temporarily stopped and the DC motor 33 is rotated in a direction for performing the high speed control operation (i.e., in the counterclockwise direction in FIG. 16), the rotational force of the DC motor 33 is transmitted to the sun gear 72 through the driving gear 34 and the idle gear 71. Thus, the sun gear 72 is rotated in the counterclockwise direction.

Accordingly, the large gear G3 of the planetary gear 73 is rotated in the shape of an arc in the counterclockwise direction around the small gear G2 of the sun gear 72 in a state in which the large gear G3 is not rotated on its axis and is engaged with the small gear G2 of the sun gear 72. Thus, the planetary lever 72a is rotated in the counterclockwise direction around the shaft 76 of the sun gear 72. As a result, the small gear G5 of the connection gear 74 is engaged with the small gear G4 of the planetary gear 73 supported by the planetary support shaft 72b on the planetary lever 72a.

In this state, the supply of an electric current to the DC motor 33 from the motor current-supplying circuit 60 is interrupted. Further, the step motor 81 for moving the shutter is reversely rotated in the counterclockwise direction to rotate the engaging/releasing lever 85 in the clockwise direction. Thus, the outer circumferential face of the planetary support shaft 72b is pressed by the inner engaging face 85d of the bent portion 85c formed in the engaging/releasing lever 85 so that the planetary lever 72a is accurately stopped in the engaging position between the planetary gear 73 and the connection gear 74.

As mentioned above, when the step motor 81 is rotated in the counterclockwise direction, the rotational force of this step motor 81 is transmitted to the switching gear 84 through the motor gear 82 for moving the shutter and the intermediate gear 83. Accordingly, this switching gear 84 is rotated in the counterclockwise direction. Thus, the operating pin 84a of the switching gear 84 is moved in a direction in which the operating pin 84a is separated from the arm portion 85a of the engaging/releasing lever 85.

Accordingly, the engaging/releasing lever 85 is rotated in the clockwise direction by the biasing force of the spiral spring 89. The bent portion 85c formed in the arm portion 85b of the engaging/releasing lever 85 is moved into a region of the arc movement of the planetary support shaft 72b as the engaging/releasing lever 85 is rotated. Thus, the outer circumferential face of the planetary support shaft 72b is pressed by the inner engaging face 85d of the bent portion 85c. Therefore, the planetary lever 72a is reliably stopped in the engaging position between the planetary gear 73 and the connection gear 74.

Namely, the reduction gear means 70 is switched from the above connection state for directly engaging the planetary gear 73 with the driven gear 31 to a connection state for connecting the former gear series 34, 71, 72, 73 to the latter gear series 74, 78, 31. This connection state for connecting the former gear series to the latter gear series is a connection state for providing a reduction ratio such as 1/5.5 suitable for the high speed rotation of the driven gear 31.

In this state, the operating pin 84b comes in contact with a lower face of the arm portion 85a of the engaging/releasing lever 85. Thus, the operating pin 84b prevents the rotation of the engaging/releasing lever 85 in the counterclockwise direction caused by engaging and disengaging actions of the planetary gear 73 when the planetary gear 73 and the connection gear 74 are engaged with each other and are then rotated.

Accordingly, when the rotation of the step motor 81 is stopped in this state and the DC motor 33 is rotated in a predetermined direction, the front group frame 10 is displaced at a high speed toward one of the starting positions Ws and Ts at the reduction ratio 1/5.5. Thus, it is possible to perform the initial setting operation and the switching operation at each of the focal lengths at a high speed.

The reduction ratio changing control operation from the high speed control time to the low speed control time will next be described.

As described in the first embodiment, the varifocal lens is constructed such that it is possible to perform the focusing operation for a new photograph when the front group frame 10 is initially set to one of the starting positions Ws and Ts. Accordingly, in this state, it is necessary to set the connection state of the reduction gear means 70 to a connection state for providing a reduction ratio such as 1/20 at the low speed control time so as to improve the accuracy in stopping position of the front group frame 10 at the focusing time.

Namely, it is necessary to set an operating state of the reduction gear means 70 as shown by a solid line in FIG. 16. In this operating state, the bent portion 85c formed in the engaging/releasing lever 85 of the reduction ratio changing means 80 is moved into the region of the arc movement of the planetary support shaft 72b of the planetary gear 73. The bent portion 85c is then engaged with the outer circumferential face of the planetary support shaft 72b of the planetary gear 73 by the outer engaging face 85e of the bent portion 85c. Thus, the planetary gear 73 and the driven gear 31 are engaged with each other and this engaging state is maintained. In the above operating state, the reduction gear means 70 can thus provide the reduction ratio such as 1/20 at the low speed control time at which the driven gear 31 can be rotated by only the former gear series 34, 71, 72, 73.

To provide such a reduction ratio, in the third embodiment, when the front group frame 10 is initially set to one of the starting positions Ws and Ts, the reduction gear means 70 can be automatically changed from a connection state at the high speed control time to a connection state at the low speed control time.

For example, this reduction ratio changing control operation is performed on the basis of a signal showing that the front group frame 10 has been initially set completely to each of the starting positions Ws and Ts. This control operation is also performed by cooperation of the mechanical and electrical switching control operations mentioned above. Further, this control operation is executed before an electric current is supplied to the DC motor 33 to move the front group frame 10.

In the reduction ratio changing control, when the microcomputer 55 gives a command for changing the reduction ratio 1/5.5 to the reduction ratio 1/20, the step motor 81 for moving the shutter is first rotated in the clockwise direction. Thus, the engaging/releasing lever 85 is rotated against the biasing force of the spiral spring 89 in the counterclockwise direction through the operating pin 84a. As a result, the outer engaging face 85e of the engaging/releasing lever 85 is disengaged from the planetary support shaft 72b in accordance with the above-mentioned sequential operations.

In this state, when the rotation of the step motor 81 is temporarily stopped and the DC motor 33 is rotated in a direction for performing the low speed control operation (in the clockwise direction in FIG. 16), the rotational force of the DC motor 33 is transmitted to the sun gear 72 through the driving gear 34 and the idle gear 71. Thus, the sun gear 72 is rotated in the clockwise direction.

The large gear G3 of the planetary gear 73 is moved around the small gear G2 of the sun gear 72 in the shape of an arc shape in the clockwise direction in a state in which this large gear G3 is not rotated on its axis and is engaged with the small gear G2. Thus, the planetary lever 72a is rotated around the shaft 76 of the sun gear 72 in the clockwise direction. As a result, the driven gear 31 is engaged with the small gear G4 of the planetary gear 73 supported by the planetary support shaft 72b on the planetary lever 72a.

In this state, when the supply of an electric current to the DC motor 33 from the motor current-supplying circuit 60 is interrupted and the step motor 81 for moving the shutter is reversely rotated in the counterclockwise direction, the planetary support shaft 72b is pressed by the outer engaging face 85e of the bent portion 85c formed in the engaging/releasing lever 85. Thus, the planetary lever 72a is reliably stopped in the engaging position between the planetary gear 73 and the driven gear 31.

The sequential operations in this case are similar to those in the above reduction ratio changing control operation from the low speed control to the high speed control except that a face for pressing the planetary support shaft 72b is changed from the inner engaging face 85d to the outer engaging face 85e.

As a result, the reduction gear means 70 is switched from the above connection state at the high speed control time to a connection state for directly engaging the planetary gear 73 with the driven gear 31. This connection state for directly engaging the planetary gear 73 with the driven gear 31 is a connection state at the low speed control time at which the driven gear 31 is connected to the former gear series 34, 71, 72, 73 at the reduction ratio 1/20.

In this case, the biasing force of the spiral spring 89 prevents the rotation of the engaging/releasing lever 85 in the counterclockwise direction caused by engaging and disengaging actions of the planetary gear 73 when the planetary gear 73 and the driven gear 31 are engaged with each other and are then rotated.

Accordingly, when the rotation of the step motor 81 is stopped in this state and the DC motor 33 is rotated in a predetermined direction, the front group frame 10 is displaced at a low speed in the predetermined direction at the reduction ratio 1/20 for providing a high accuracy in stopping position of the front group frame 10. Thus, the reduction gear means 70 is switched to a connection state for providing an accuracy in stopping position required at the focusing time.

The timing of an electric current supplied by the microcomputer 55 from the step motor current-supplying circuit to the step motor 81 is set in advance such that the above mechanical and electrical switching controls can be realized. Further, the timing of an electric current supplied from the motor current-supplying circuit 60 to the DC motor 33 is also set in advance such that the above mechanical and electrical switching controls can be realized.

The operation of the varifocal lens in the third embodiment constructed above will next be described with reference to FIGS. 15 to 18.

It is possible to use the control methods in the first and second embodiments as they are with respect to an initial setting control operation, a switching control operation of the focal lengths, and a focusing control operation at each of the focal lengths in the third embodiment. In the following description, a case using the control method in the first embodiment is explained as an example for brevity.

Figure 18:
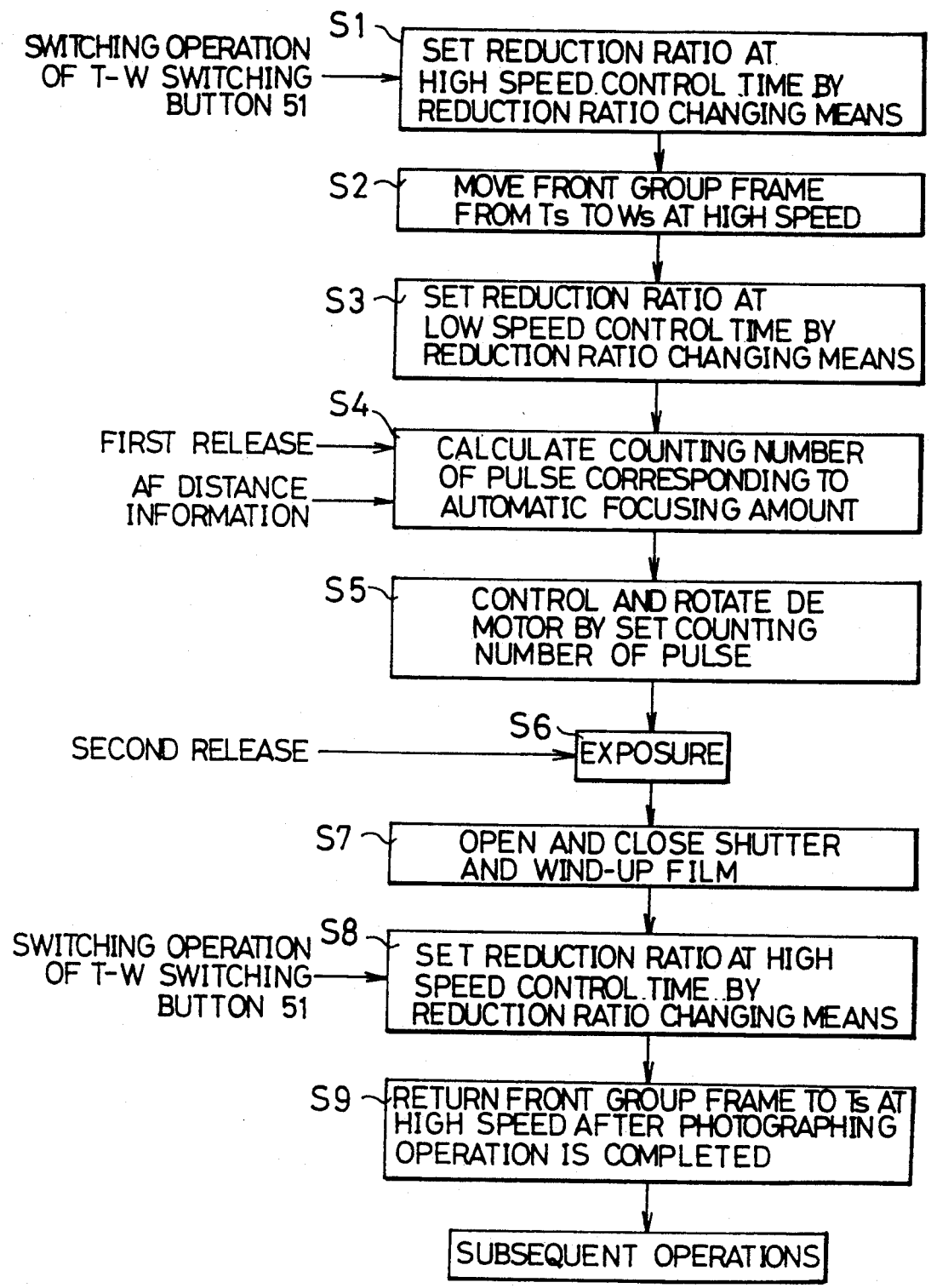
FIG. 18 is a flow chart of operations of the varifocal lens having the reduction gear means between the DC motor and the driving lead screw means in the third embodiment when a photographing operation is performed by switching a telescopic photographing mode to a wide angle photographing mode.

In this case, FIG. 18 is a flow chart with respect to a photographing operation performed by the switching operation from the telescopic photographing mode to the wide angle photographing mode. Accordingly, the front group frame 10 is assumed to be located in the starting position Ts at the telescopic time.

As mentioned above, a photographing mode at the previous photographing time is stored into the microcomputer 55. Accordingly, when the power switch is turned on, the front group frame 10 is initially set to the starting position Ts at the telescopic time from a focusing completing position on the telescopic pattern 43.

In this state, as shown in FIG. 15, the front group frame 10 is located in the starting position Ts at the telescopic time and the rear group frame 20 is moved into an optical path backward from the front group frame 10. Further, as mentioned above, the reduction gear means 70 is set to the connection state for providing a reduction ratio such as 1/20 at the low speed control time. Accordingly, when a user wants to take a photograph in the wide angle photographing mode, it is necessary to switch the T-W switching button 51 from the telescopic photographing mode to the wide angle photographing mode.

When the T-W switching button 51 is switched to the wide angle photographing mode, a command for changing the reduction ratio (1/20) of the reduction gear means 70 at the low speed control time to the reduction ratio (1/5.5) at the high speed control time is given from the microcomputer 55 to the reduction ratio changing means 80 based on a switching signal from the T-W switching button 51.

Thus, the reduction ratio changing control from the low speed to the high speed is executed by the microcomputer 55. The planetary lever 72a is swingingly moved to a position for engaging the planetary gear 73 with the connection gear 74. The reduction gear means 70 is switched to a connection state for providing the reduction ratio (1/5.5) at the high speed control time. In this connection state at the high speed control time, the former gear series 34, 71, 72, 73 in the reduction gear means 70 are connected to the latter gear series 74, 78, 31. This state is shown in a step S1 in FIG. 18.

When the reduction ratio changing control operation with respect to the reduction gear means 70 is completed, a command for moving the front group frame 10 to the wide angle starting position Ws is given from the microcomputer 55 to a control section 50. Thus, the front group frame 10 is moved at a high speed to the wide angle starting position Ws at the reduction ratio (1/5.5) at the high speed control time in accordance with the control method described in the first embodiment. This state is shown in a step S2 in FIG. 18.

The rear group frame 20 is moved to the escaping position by this movement of the front group frame 10 to provide an optical arrangement at the wide angle time in which only the main lens group Lm is located on the photographing optical axis O.

When the above movements of the front and rear group frames 10 and 20 are completed, a command for changing the reduction ratio of the reduction gear means 70 to the reduction ratio (1/20) at the low speed control time (at the focusing time) is given from the microcomputer 55 to the reduction ratio changing means 80.

Thus, the above reduction ratio changing control from the high speed to the low speed is executed. In this reduction ratio changing control, the planetary lever 72a is swingingly moved to a position for engaging the planetary gear 73 with the driven gear 31. The reduction gear means 70 is switched to a connection state for providing the reduction ratio (1/20) at the low speed control time. In this connection state at the low speed control time, the driven gear 31 is connected to the former gear series 34, 72, 73 in the reduction gear means 70. This state is shown in a step S3 in FIG. 18.

In this state, when the shutter release button 52 is pushed down, the photometric switch 56 is turned on in a first stage releasing operation of the shutter release button 52 to output automatic focusing distance information at a focal distance at the wide angle time. Thus, a focusing amount of the main lens group Lm corresponding to this automatic focusing distance information is calculated to set a comparative reference value converted to the number of rotations of the DC motor 33. This state is shown in a step S4 in FIG. 18.

Subsequently, when the shutter release button 52 is pushed down, an electric current begins to be supplied from the motor current-supplying circuit 60 to the DC motor 33 in a second stage releasing operation of the shutter release button 52. Thus, the DC motor 33 is rotated to move the front group frame 10 in the wide angle direction. The driving lead screw 6 is then rotated at the reduction ratio (1/20) at the low speed control time.

Accordingly, the front group frame 10 is moved on the wide angle pattern 42 at a low speed from the starting position Ws at the wide angle time toward the exposure aperture 2a. The front group frame 10 is then stopped by an operation of the digital signal generating means 36 in a focusing position corresponding to the above focusing amount. In this case, the accuracy in stopping position of the front group frame 10 is extremely improved since the front group frame 10 is moved at the low speed. This state is shown in a step S5 in FIG. 18.

While the front group frame 10 is displaced to perform the focusing operation, the rear group frame 20 is displaced along the holding acting face 7b of the cam plate member 7 while the escaping position of the rear group frame 20 is held. When such a focusing operation is completely performed, a releasing operation of the shutter is performed in accordance with sequential photographing operations, thereby completing the exposure operation. This state is shown in a step S6 in FIG. 18.

The shutter is opened and closed and the winding-up operation of a film is then performed after the completion of the exposure operation. After the completion of this winding-up operation, the microcomputer 55 receives a winding-up completing signal as described in the first embodiment and automatically returns the front group frame 10 to the starting position Ws at the wide angle time. This state is shown in a step S7 in FIG. 18.

After the predetermined photographing operation is completed, it is possible to stop the next photographing operation in this completing state. However, when a user again wants to take a photograph in the wide angle photographing mode, the user pushes the shutter release button 52 in this completing state to execute the next wide angle photographing operation based on new automatic focusing distance information.

In contrast to this, when the user wants to take a photograph in the telescopic photographing mode, the user pushes the T-W switching button 51 in the above completing state to switch the wide angle photographing mode to the telescopic photographing mode, thereby taking a photograph using the varifocal lens.

When the T-W switching button 51 is switched from the wide angle photographing mode to the telescopic photographing mode, an operation of the microcomputer 55 is similar to that in the case in which the T-W switching button 51 is switched from the telescopic photographing mode to the wide angle photographing mode. Namely, a command for changing the reduction gear means 70 from the reduction ratio (1/20) at the low speed control time (at the focusing time) to the reduction ratio (1/5.5) at the high speed control time is given from the microcomputer 55 to the reduction ratio changing means 80 based on a switching signal of the T-W switching button 51.

Thus, the reduction ratio changing control from the low speed to the high speed is executed by the operation of the microcomputer 55. In this reduction ratio changing control, the planetary lever 72a is swingingly moved to a position for engaging the planetary gear 73 with the connection gear 74. Further, the reduction gear means 70 is switched to a connection state for providing the reduction ratio (1/5.5) at the high speed control time. This state is shown in a step S8 in FIG. 18.

When this reduction ratio changing control operation is completed, a command for moving the front group frame 10 to the starting position Ts at the telescopic time is given from the microcomputer 55. Thus, the control operation described in the first embodiment is executed. The front group frame 10 is moved at a high speed to the starting position Ts at the telescopic time at the reduction ratio (1/5.5) at the high speed control time.

When the front group frame 10 is moved to the starting position Ts at the telescopic time, straight biasing force of the connection spring 27 and biasing rotational force of the spiral spring 25 are applied to the rear group frame 20 located in the escaping position. Thus, the rear group frame 20 is rotated in the counterclockwise direction in the movement of the front group frame 10 while the rear group frame 20 is displaced in the direction of the photographed object. The rear group frame 20 is moved as mentioned in the first embodiment and is accurately set to a predetermined position on the photographing optical axis O. Namely, the main lens group Lm and the sublens group Ls are set to positions for providing the focal length at the telescopic photographing time.

When such movements of the front and rear group frames 10 and 20 are completed, a command for changing the reduction ratio at the high speed control time to the reduction ratio at the focusing time is again given from the microcomputer 55 to the reduction ratio changing means 80. Thus, the reduction gear means 70 is set to the reduction ratio at the focusing time (at the low speed control time). In this case, the reduction ratio changing control is executed in a control method similar to that in the above reduction ratio changing control at the time of the switching operation from the telescopic photographing mode to the wide angle photographing mode.

In this state, when the shutter release button 52 is pushed down, automatic focusing distance information at the focal length at the telescopic time is outputted in the first stage releasing operation of this shutter release button 52 as mentioned above, thereby setting a focusing amount and a comparative reference value at this time. Subsequently, the front group frame 10 is moved at a low speed in the direction of the photographed object by the second stage releasing operation of the shutter release button 52. Then, the front group frame 10 is accurately stopped in a focusing position for providing this focusing amount.

Similar to the case of the wide angle photographing mode, the releasing operation of the shutter is performed when the above focusing operation is completed. Then, the shutter is opened and closed and the winding-up operation of the film is completed. The reduction gear means 70 is changed by the operation of the microcomputer 55 from the reduction ratio at the focusing time to the reduction ratio at the high speed control time based on a winding-up completing signal. Accordingly, the front group frame 10 is automatically returned at a high speed to the starting position Ts at the telescopic time at the reduction ratio at the high speed control time. This state is shown in a step S9 in FIG. 18.

A control method for moving the front group frame 10 from a position at the completing time of the previous photographing operation to each of the starting positions Ws and Ts at the focal lengths is similar to that in each of the first and second embodiments. Further, a control method for switching one focal length to the other is also similar to that in each of the first and second embodiments. In addition to the control methods in the first and second embodiments, there are the following control methods.

In the following control methods, the front group frame 10 is moved at the reduction ratio (1/5.5) at the high speed control time.

In a first control method, the front group frame 10 is initially set to the starting position Ws at the wide angle time as an example and is stopped in one of the starting positions Ws and Ts.

(h) When the front group frame 10 is located in the starting position Ws at the wide angle time, the step motor 81 for moving the shutter and the DC motor 33 are not driven.

(i) When the front group frame 10 is located on the wide angle pattern 42 including the left-hand edge portion W0, an electric current is supplied from the motor current-supplying circuit 60 to the DC motor 33 such that the DC motor 33 is rotated to move the front group frame 10 in the telescopic direction. Thus, the sliding brush 16 is displaced from a position on the wide angle pattern 42 in the direction of the photographed object.

When the sliding brush 16 has reached a position corresponding to the starting position Ws at the wide angle time, the supply of an electric current to the DC motor 33 is interrupted so that the front group frame 10 is stopped in the wide angle starting position.

In this case, a displacing amount of the front group frame 10 is determined in any position of the sliding brush 16 on the wide angle pattern 42 by the number of rotations of the DC motor 33 counted from a time point at which the sliding brush 16 is separated from the left-hand edge portion W0 of the wide angle pattern 42. Namely, the displacing amount of the front group frame 10 is determined by the number of rotations of the DC motor 33 counted from a time point at which a turning-off signal is outputted from the wide angle positioning switch $SW_w$.

(j) When the front group frame 10 is located in the starting position Ts at the telescopic time, a driving electric current is supplied from the motor current-supplying circuit 60 to the DC motor 33 so that the DC motor 33 is rotated to move the front group frame 10 in the wide angle direction.

When the front group frame 10 has reached the starting position Ws at the wide angle time, the supply of an electric current to the DC motor 33 is interrupted so that the front group frame 10 is stopped in this starting position Ws.

In this case, a displacing amount of the front group frame 10 is determined by converting the distance between the starting position Ts at the telescopic time and the starting position Ws at the wide angle time to the number of rotations of the DC motor 33 in advance.

(k) When the front group frame 10 is located on the telescopic pattern 43 including the right-hand edge portion T0, an electric current is supplied from the motor current-supplying circuit 60 to the DC motor 33 so that the DC motor 33 is rotated to move the front group frame 10 in the wide angle direction. Thus, the front group frame 10 is displaced such that the sliding brush 16 is moved toward the exposure aperture 2a from a position on the telescopic pattern 43.

When the front group frame 10 exceeds the starting position Ts at the telescopic time and has reached the starting position Ws at the wide angle time, the supply of an electric current to the DC motor 33 is interrupted so that the front group frame 10 is stopped in this starting position Ws.

In this case, a displacing amount of the front group frame 10 is determined in any position of the sliding brush 16 on the telescopic pattern 43 by the number of rotations of the DC motor 33 counted from a time point at which the sliding brush 16 is separated from the right-hand edge portion T0 of the telescopic pattern 43. Namely, the displacing amount of the front group frame 10 is determined by the number of rotations of the DC motor 33 counted from a time point at which a turning-off signal is outputted from the telescopic positioning switch $SW_t$.

A control method for initially setting the front group frame 10 to the starting position Ts at the telescopic time will next be described schematically.

This control method is constructed on the basis of an idea similar to that in the above initial setting control operation for initially setting the front group frame 10 to the starting position Ws at the wide angle time.

Namely, similar to the above control method with respect to the items (h) to (k), a control operation with respect to the starting position Ts is controlled every position of the sliding brush 16 at the completing time of the previous photographing operation. However, this control operation with respect to the starting position Ts is performed by changing the contents of the items (h) to (K) in consideration of differences between the initial setting operations for initially setting the front group frame 10 to the starting positions Ws and TS at the wide angle and telescopic times. These differences include a difference between initial setting positions, a difference between positions of the sliding brush 16 at the completing time of the previous photographing operation, and a difference between moving directions of the front group frame 10 at the initial setting time.

A control method for switching or changing one focal length to the other will next be described schematically.

As mentioned above, in the switching control of the focal lengths, it is necessary to move the front group frame 10 from a starting position at one focal length to a starting position at the other by a manual switching operation of the T-W switching button 51.

In this case, the above control method with respect to the item (j) is used when the T-W switching button 51 is switched from the focal length at the telescopic time to the focal length at the wide angle time. In contrast to this, a control method similar to that with respect to the item (j) is used when the T-W switching button 51 is switched from the focal length at the wide angle time to the focal length at the telescopic time.

As mentioned above, in the varifocal lens in the third embodiment, more than one group of movable lenses such as the front and rear group frames 10 and 20 are displaced to provide at least two kinds of focal lengths such as the focal lengths at the wide angle and telescopic photographing times. The initial setting operation, the switching operation of the focal lengths, and the focusing operation at each of the focal lengths are commonly performed by one drive motor and one lead screw driving means. One set of transmission gear means are arranged between the drive motor and the lead screw driving means. Gear ratios of the transmission gear means are composed of at least gear ratios at high and low speed control times such that these gear ratios can be switched. At the initial setting time and the switching time of the focal lengths, the movable lens group can be displaced at a high speed by high speed control by switching the above gear ratios. At the focusing time, the movable lens group can be accurately displaced at a low speed by low speed control by switching the above gear ratios. Accordingly, it is possible to rapidly perform the switching operation of the focal lengths and improve the accuracy in focusing operation by using the advantages of a lead screw driving system. Further, it is possible to simplify the structure of the entire varifocal lens and reduce the cost thereof.

In the third embodiment, known mechanisms can be used in the varifocal lens when the gear ratios of the above gear transmission means are mechanically changed by using the reciprocating rotation of a motor for moving a shutter in a camera provided with the varifocal lens. In this case, there are advantages with respect to the structure of the varifocal lens.

Further, in the third embodiment, when the above gear ratios are changed by using a reciprocating displacement of a plunger means of an electromagnetic operating type, it is possible to increase a degree of freedom with respect to designs in arrangement position of the drive motor and the lead screw driving means. Further, in the third embodiment, the above-mentioned effects in the first and second embodiments can be also obtained. In the third embodiment, it is possible to change the gear ratios of the transmission gear means in a method except for the planetary gear mechanism and the plunger means of an electromagnetic operating type mentioned above.

The varifocal lens in each of the first to third embodiments is described in the above-mentioned explanation, but the present invention is not limited to the varifocal lens in each of the first to third embodiments. It is possible to change the varifocal lens in various kinds of modifications within the scope of features of the present invention. For example, in the above embodiments, the photographing optical system is composed of the main lens group and the sublens group. However, the present invention can be applied to a varifocal lens having a photographing optical system composed of more than three lens groups.

As mentioned above, in the varifocal lens in the present invention, it is possible to reduce a time for switching the focal lengths by solving the above first and second problems with respect to the general varifocal lens. Further, it is possible to solve the irrational problems in human engineering in the focusing operation.

Further, the above third problem with respect to the general varifocal lens is solved to remove the influence of a clearance in mechanical transmission of the motor driving means tending to be caused in the initial setting operation and the switching operation of the focal lengths for a new photographing operation. Further, the accuracy in movement of the movable lens group can be improved by accurately setting a counting starting point of a digital signal in the focusing operation.

Further, the following effects can be obtained by solving the above fourth problem with respect to the general varifocal lens. Namely, three operations composed of the initial setting operation, the switching operation of the focal lengths, and the focusing operation at each of the focal lengths for the new photographing operation are commonly performed by one drive motor and one lead screw driving means. The initial setting operation includes an operation for automatically returning the front group frame to a starting position thereof. The gear ratios of the transmission gear means arranged between the drive motor and the lead screw driving means are switched in accordance with necessity when the above three operations are performed by the drive motor and the lead screw driving means. Thus, the initial setting operation and the switching operation of the focal lengths can be performed at a high speed by the high speed control. The focusing operation at each of the focal lengths can be accurately performed at a low speed by the low speed control.

Many widely different embodiments of the present invention may be constructed without departing from the spirit and scope of the present invention. It should be understood that the present invention is not limited to the specific embodiments described in the specification, except as defined in the appended claims.

What is claimed is:

1. A varifocal lens having a photographing optical system for providing at least first and second focal lengths by displacing more than one group of movable lenses, said varifocal lens comprising:

a position setting portion for setting a position of said movable lens group in a predetermined position, said position setting portion being disposed along a photographing optical axis, and having a first focusing region in which said movable lens group is displaced so as to perform a focusing operation over a photographing distance range from infinity to a most proximate distance at a time of taking a photograph at said first focal length, and a second focusing region in which said movable lens group is displaced so as to perform a focusing operation over a photographing distance range from infinity to a most proximate distance at a time of taking a photograph at said second focal length, said first focusing region and said second focusing region being spaced apart from each other on said position setting portion along said photographing optical axis, said movable lens group being so set as to start a displacement thereof from a first focusing starting position at a time of performing a focusing operation with respect to said first focal length, and as to start a displacement thereof from a second focusing starting position at a time of performing a focusing operation with respect to said second focal length, said first focusing starting position and said second focusing starting position being spaced apart from each other within a region of said position setting portion defined between said first and second focusing regions, an initial setting position of said movable lens group being set to one of said first and second focusing starting positions when an operating state of said varifocal lens is set to a state capable of taking a photograph, and said movable lens group being movable from one of said first and second focusing starting positions to the other when a focal length of said varifocal lens is switched from one of said first and second focal lengths to the other.

2. A varifocal lens as claimed in claim 1, wherein said first and second focal lengths are respectively set to short and long focal lengths, and a focusing position corresponding to the most proximate photographing distance at said first focal length is set in proximity to said first focusing starting position, and a focusing position corresponding to the infinite photographing distance at said second focal length is set in proximity to said second focusing starting position.

3. A varifocal lens as claimed in claim 1, wherein said photographing optical system comprises a main lens system arranged to be displaced along the photographing optical axis, and a sublens system arranged such that the sublens system can be moved into an acting position on the photographing optical axis and can be moved from this acting position to an escaping position outside the photographing optical axis, and said first focal length can be provided by locating only said main lens system on the photographing optical axis, and said second focal length can be provided by moving said sublens system to a predetermined fixed position on the photographing optical axis while said main lens system is displaced along the photographing optical axis.

4. A varifocal lens as claimed in claim 1, further comprising a common lens group driving means for displacing said movable lens group from one of said first and second focusing starting positions to the other and performing a focusing operation in each of said first and second focusing regions, said lens group driving means including motor driving means having one lead screw rotated by operation of a motor.

5. A varifocal lens as claimed in claim 4, wherein a first counting reference position of a focusing amount of the movable lens group in said first focusing region is set to a position most proximate to said first focusing starting position within the first focusing region;

wherein a second counting reference position of a focusing amount of the movable lens group in said second focusing region is set to a position most proximate to said second focusing starting position within the second focusing region;

wherein a clearance in mechanical transmission of said lens group driving means can be absorbed by displacing said movable lens group from the respective focusing starting positions to the respective counting reference positions of the focusing amounts;

wherein said varifocal lens further comprises digital signal generating means for generating digital signals for determining the focusing amounts of said movable lens group at the respective focal lengths, and digital signal counting means for counting the number of digital signals generated by this digital signal generating means; and wherein a counting operation of said digital signal counting means can be started on the basis of a signal showing that the movable lens group reaches said counting reference positions at the respective focal lengths in the focusing operations in the respective focusing regions.

6. A varifocal lens as claimed in claim 5, wherein said motor driving means is operated in reverse after said movable lens group has passed once through said predetermined counting reference positions when one of the first and second focal lengths is switched to the other; and wherein said movable lens group passes through said counting reference positions in reverse and the operation of the motor driving means is then stopped after the motor driving means has been operated by a predetermined amount.

7. A varifocal lens as claimed in claim 5, wherein said focusing starting position and said counting reference position are set to be equal to each other with respect to the first focal length, and said focusing starting position and said counting reference position are set to be equal to each other with respect to the second focal length.

8. A varifocal lens as claimed in claim 5, wherein said motor and said digital signal generating means are adapted so that a cogging period $T_m$ of said motor and pulse signal generating period $T_p$ of said digital signal generating means satisfy the following relation:

$$T_p = 2 \cdot n \cdot T_m.$$

wherein n is a natural number.

9. A varifocal lens as claimed in claim 5, wherein said lens group driving means moves the movable lens group between said two focusing starting positions and performs the respective focusing operations in the focusing regions through transmission gear means of a gear ratio changing type;

wherein said transmission gear means of a gear ratio changing type has a low speed gear series for operating the lens group driving means at a gear ratio at a low speed, a high speed gear series for operating the lens group driving means at a gear ratio at a high speed, and gear ratio changing means for switching these two gear series;

wherein said movable lens group is displaced in the focusing regions at the respective focusing lengths by using the low speed gear series of said transmission gear means; and wherein said movable lens group is displaced from the focusing positions in the respective focusing regions to the respective focusing starting positions and is displaced between said two focusing starting positions after said transmission gear means is changed from an operating state using the low speed gear series to an operating state using the high speed gear series.

10. A varifocal lens as claimed in claim 9, wherein said low and high speed gear series can be changed by using an additional rotation of a reciprocating rotation of a motor for moving a shutter in a camera provided with said varifocal lens.

11. A varifocal lens as claimed in claim 10, wherein said low and high speed gear series can be changed by using a reciprocating displacement of plunger means of an electromagnetic operating type.

12. A varifocal lens as claimed in claim 10, wherein said lens group driving means displaces the movable lens group between said two focusing starting positions and performs the respective focusing operations in the focusing regions through transmission gear means of a gear ratio changing type; and said transmission gear means of a gear ration changing type has a low speed gear series for operating the lens group driving means at a gear ratio at a low speed, a high speed gear series for operating the lens group driving means at a gear ratio at a high speed, and gear ratio changing means for switching these two gear series.

* * * * *